(12) United States Patent
Palahnuk

(10) Patent No.: US 9,324,078 B2
(45) Date of Patent: Apr. 26, 2016

(54) DYNAMIC SOCIAL NETWORK SYSTEM

(75) Inventor: Samuel Louis Palahnuk, Burbank, CA (US)

(73) Assignee: SMOOTH PRODUCTIONS, Inc., Wilmington, DE (US)

( * ) Notice: Subject to any disclaimer, the term of this patent is extended or adjusted under 35 U.S.C. 154(b) by 1270 days.

(21) Appl. No.: 12/141,101

(22) Filed: Jun. 18, 2008

(65) Prior Publication Data

US 2009/0157693 A1    Jun. 18, 2009

Related U.S. Application Data

(60) Provisional application No. 61/051,339, filed on May 7, 2008, provisional application No. 61/014,422, filed on Dec. 17, 2007.

(51) Int. Cl.
| | | |
|---|---|---|
| G06F 7/00 | (2006.01) |
| G06Q 30/00 | (2012.01) |
| G06Q 30/02 | (2012.01) |
| G06F 17/30 | (2006.01) |

(52) U.S. Cl.
CPC ............ *G06Q 30/00* (2013.01); *G06Q 30/0252* (2013.01); *G06Q 30/0273* (2013.01); *G06F 17/30056* (2013.01); *Y10S 715/963* (2013.01)

(58) Field of Classification Search
USPC .................................. 707/706, 687, 791, 609
See application file for complete search history.

(56) References Cited

U.S. PATENT DOCUMENTS

| | | |
|---|---|---|
| 6,182,050 B1 | 1/2001 | Ballard |
| 6,369,840 B1 | 4/2002 | Barnett et al. |
| 6,480,830 B1 | 11/2002 | Ford et al. |
| 6,590,568 B1 | 7/2003 | Astala et al. |
| 6,647,269 B2 | 11/2003 | Hendrey et al. |
| 6,654,789 B1 | 11/2003 | Bliss et al. |
| 6,694,353 B2 | 2/2004 | Sommerer |
| 6,820,204 B1 | 11/2004 | Desai et al. |
| 6,978,246 B1 | 12/2005 | Ruvolo et al. |
| 7,103,563 B1 | 9/2006 | Voisin et al. |
| 7,117,254 B2 | 10/2006 | Lunt et al. |
| 7,194,424 B2 | 3/2007 | Greer et al. |

(Continued)

FOREIGN PATENT DOCUMENTS

| | | |
|---|---|---|
| KR | 10-2005-0055657 | 6/2005 |
| WO | WO 2009/079609 | 6/2009 |

OTHER PUBLICATIONS

WO 2009-079609 International Search Report of PCT/US2008/087293 published Jun. 25, 2009.

(Continued)

*Primary Examiner* — Eliyah S Harper
(74) *Attorney, Agent, or Firm* — Andrew Bodendorf

(57) ABSTRACT

The system service provider automatically spawns a custom website for any group created using the system. The group may be created from a user interface and a groups lozenge provided by the interface. Messages may be sent between group members using a multi-user chat provided by the custom website. In addition, video and images and other digital media and content may be shared with group members. The website associated with the group stores any messages sent to the group, any multi-user chat between group members, any shared videos or images, and any shared files. As a result, group members may access this information at any time; however, others people beyond the group are unable to access this information.

17 Claims, 42 Drawing Sheets

(56) References Cited

U.S. PATENT DOCUMENTS

| | | | |
|---|---|---|---|
| 7,383,254 B2 | 6/2008 | Wen et al. | |
| 7,441,194 B2 | 10/2008 | Vronay et al. | |
| 7,519,663 B1 | 4/2009 | Bostick et al. | |
| 7,526,762 B1 | 4/2009 | Astala et al. | |
| 7,565,344 B1* | 7/2009 | White | G06Q 50/10 |
| 7,567,977 B1* | 7/2009 | White | G06Q 10/10 |
| 7,673,248 B2 | 3/2010 | Narayanaswami | |
| 7,680,786 B2 | 3/2010 | Koran | |
| 7,721,210 B2 | 5/2010 | Mansikkaniemi et al. | |
| 7,747,966 B2 | 6/2010 | Leukart et al. | |
| 7,788,598 B2 | 8/2010 | Bansal et al. | |
| 7,797,318 B2* | 9/2010 | Torres | G06Q 10/10 707/736 |
| 7,930,640 B2 | 4/2011 | Dong et al. | |
| 8,015,049 B1 | 9/2011 | Tam et al. | |
| 8,051,380 B2 | 11/2011 | Knapp et al. | |
| 8,086,676 B2 | 12/2011 | Palahnuk et al. | |
| 8,161,419 B2 | 4/2012 | Palahnuk et al. | |
| 8,341,184 B2 | 12/2012 | Bonev et al. | |
| 8,510,123 B2 | 8/2013 | Bonev et al. | |
| 8,510,137 B2 | 8/2013 | Bonev et al. | |
| 2002/0016729 A1 | 2/2002 | Breitenbach et al. | |
| 2002/0055880 A1 | 5/2002 | Unold et al. | |
| 2002/0063732 A1 | 5/2002 | Mansikkaniemi et al. | |
| 2002/0065109 A1 | 5/2002 | Mansikkaniemi et al. | |
| 2002/0065881 A1 | 5/2002 | Mansikkaniemi et al. | |
| 2002/0120498 A1 | 8/2002 | Gordon et al. | |
| 2002/0154178 A1 | 10/2002 | Barnett et al. | |
| 2003/0014296 A1 | 1/2003 | Meine | |
| 2003/0023463 A1 | 1/2003 | Dombroski | |
| 2003/0131023 A1 | 7/2003 | Bassett et al. | |
| 2003/0177190 A1 | 9/2003 | Moody et al. | |
| 2004/0073615 A1 | 4/2004 | Darling | |
| 2004/0093317 A1 | 5/2004 | Swan | |
| 2004/0119760 A1 | 6/2004 | Grossman et al. | |
| 2004/0267585 A1 | 12/2004 | Anderson et al. | |
| 2005/0005249 A1 | 1/2005 | Hill et al. | |
| 2005/0015710 A1* | 1/2005 | Williams | 715/500 |
| 2005/0039142 A1 | 2/2005 | Jalon et al. | |
| 2005/0171954 A1* | 8/2005 | Hull | H04L 51/32 |
| 2005/0171955 A1* | 8/2005 | Hull | G06Q 50/01 |
| 2006/0048059 A1* | 3/2006 | Etkin | 715/745 |
| 2006/0085392 A1 | 4/2006 | Wang et al. | |
| 2006/0143066 A1* | 6/2006 | Calabria | G06F 17/30867 705/7.29 |
| 2006/0167747 A1 | 7/2006 | Goodman et al. | |
| 2006/0195472 A1 | 8/2006 | Cadiz et al. | |
| 2006/0195474 A1 | 8/2006 | Cadiz et al. | |
| 2006/0218111 A1* | 9/2006 | Cohen | 706/45 |
| 2006/0218153 A1* | 9/2006 | Voon et al. | 707/10 |
| 2006/0229941 A1 | 10/2006 | Gupta | |
| 2006/0230137 A1 | 10/2006 | Gare et al. | |
| 2006/0282319 A1 | 12/2006 | Maggio | |
| 2006/0287919 A1 | 12/2006 | Rubens et al. | |
| 2007/0064920 A1 | 3/2007 | Ruckart | |
| 2007/0088801 A1 | 4/2007 | Levkovitz et al. | |
| 2007/0130221 A1 | 6/2007 | Wong et al. | |
| 2007/0136430 A1 | 6/2007 | Qureshi et al. | |
| 2007/0162328 A1 | 7/2007 | Reich | |
| 2007/0180377 A1 | 8/2007 | Gittleman et al. | |
| 2007/0192333 A1 | 8/2007 | Ali | |
| 2007/0214180 A1* | 9/2007 | Crawford | G06F 17/30693 |
| 2007/0233736 A1* | 10/2007 | Xiong et al. | 707/104.1 |
| 2007/0250645 A1 | 10/2007 | Meadows et al. | |
| 2007/0266003 A1* | 11/2007 | Wong | G06Q 90/00 |
| 2008/0010297 A1 | 1/2008 | Goldfarb et al. | |
| 2008/0033797 A1 | 2/2008 | Chickering et al. | |
| 2008/0046311 A1 | 2/2008 | Shahine et al. | |
| 2008/0052162 A1 | 2/2008 | Wood | |
| 2008/0059297 A1 | 3/2008 | Vallier et al. | |
| 2008/0109376 A1 | 5/2008 | Walsh et al. | |
| 2008/0114737 A1* | 5/2008 | Neely et al. | 707/3 |
| 2008/0115088 A1 | 5/2008 | Frankel et al. | |
| 2008/0120396 A1 | 5/2008 | Jayaram et al. | |
| 2008/0129835 A1 | 6/2008 | Chambers et al. | |
| 2008/0133677 A1 | 6/2008 | Pattabhiraman et al. | |
| 2008/0140650 A1* | 6/2008 | Stackpole | G06F 17/3087 |
| 2008/0141145 A1 | 6/2008 | Klausmeier | |
| 2008/0141247 A1 | 6/2008 | Saravanan | |
| 2008/0148181 A1 | 6/2008 | Reyes et al. | |
| 2008/0155547 A1 | 6/2008 | Weber et al. | |
| 2008/0162260 A1 | 7/2008 | Rohan et al. | |
| 2008/0177609 A1 | 7/2008 | Grieb et al. | |
| 2008/0183694 A1* | 7/2008 | Cane | G06F 17/30867 |
| 2008/0215426 A1 | 9/2008 | Guldimann et al. | |
| 2008/0222127 A1 | 9/2008 | Bergin | |
| 2008/0235078 A1 | 9/2008 | Hong et al. | |
| 2008/0235681 A1 | 9/2008 | Barnett | |
| 2008/0244425 A1 | 10/2008 | Kikin-Gil et al. | |
| 2008/0244666 A1 | 10/2008 | Moon et al. | |
| 2008/0250334 A1 | 10/2008 | Price | |
| 2008/0281665 A1 | 11/2008 | Opaluch | |
| 2008/0294655 A1* | 11/2008 | Picault et al. | 707/100 |
| 2008/0294994 A1 | 11/2008 | Kruger et al. | |
| 2008/0301112 A1* | 12/2008 | Wu | G06Q 30/02 |
| 2008/0319818 A1 | 12/2008 | Gurdin et al. | |
| 2009/0037806 A1 | 2/2009 | Yang et al. | |
| 2009/0055435 A1* | 2/2009 | Kiviluoto | G06Q 30/02 |
| 2009/0070219 A1* | 3/2009 | D'Angelo et al. | 705/14 |
| 2009/0094093 A1 | 4/2009 | Phan | |
| 2009/0100347 A1 | 4/2009 | Schemers et al. | |
| 2009/0150346 A1* | 6/2009 | Soderstrom | G06Q 10/10 |
| 2009/0150489 A1 | 6/2009 | Davis et al. | |
| 2009/0152349 A1* | 6/2009 | Bonev et al. | 235/383 |
| 2009/0157513 A1 | 6/2009 | Bonev et al. | |
| 2009/0157658 A1 | 6/2009 | Bonev et al. | |
| 2009/0157717 A1 | 6/2009 | Palahnuk et al. | |
| 2009/0158173 A1 | 6/2009 | Palahnuk et al. | |
| 2009/0158186 A1 | 6/2009 | Bonev et al. | |
| 2009/0158200 A1 | 6/2009 | Palahnuk et al. | |
| 2009/0216569 A1 | 8/2009 | Bonev et al. | |
| 2009/0313299 A1 | 12/2009 | Bonev et al. | |
| 2010/0057559 A1 | 3/2010 | Wilf et al. | |
| 2010/0198684 A1 | 8/2010 | Eraker et al. | |

OTHER PUBLICATIONS

First page of free calendar Website "www.famundo.com" copyright 2008 by Famundo LLC.

* cited by examiner

PEOPLE

Jennifer S.     500 Main Street
Cindy Cole     123 Oak Ave
Larry K.     5446 Round Circle Drive
Robert B.     56 Central Park Circle
Marisa D.     44556 J St. Apt 456
Faith P.     546 David Street
Heather J.     990 Divide Ave
Arnold S.     12 ½ High Line Ave
Steve S.     4990 Venice Blvd.
Roger H.     112 Fromage Blvd
Shannon D.     One Edge Plaza, Suite 345
Susan K.     19002 42nd Street
Nick     5446 Round Circle Drive
Sandy     446 J St. Apt 486
Howard     546 David Street
Mister T     997 Divide Ave
Miss T

ACTIVITIES

Lunch
Dinner
Bowling
Poker Run search/add

To-Do

☑ Fix Sprinkler
☐ Oil Change
☐ Anniversary search/add

Shopping
Read 1 bowling, Bob

Send

Chat    Share

LOCATIONS

Chili's
Denny's
Café Del Sol
TGI Fridays
McDonalds
Joe's Café
Donut World search/add

MAPS

CALENDAR    1501

May 08

| M | T | W | T | F | S | S |
|---|---|---|---|---|---|---|
|   |   |   | 1 | 2 | 3 | 4 |
| 5 | 6 | 7 | 8 | 9 | 10 | 11 |
| 12 | 13 | 14 | 15 | 16 | 17 | 18 |
| 19 | 20 | 21 | 22 | 23 | 24 | 25 |
| 26 | 27 | 28 | 29 | 30 | 31 |   |

AGENDA

TODAY
12PM Staff Meeting 1515
7PM Dinner with Family
TOMORROW
No events
THURSDAY
9AM Breakfast Meeting
11AM Plumber Here
12PM Lunch with Jessica
3PM Wine Tasting
FRIDAY
All day – Flight to Maui

| < May 08 > Today | | | | | | |
|---|---|---|---|---|---|---|
| Sun | Mon | Tue | Wed | Thr | Fri | Sat |
| 28 breakfast | 29 | 30 staff dinner | 1 | 2 | 3 meeting | 4 |
| 5 | 6 | 7 | 8 | 9 dinner | 10 | 11 |
| 12 | 13 cheese | 14 | 15 | 16 | 17 | 18 |
| 19 shop mow | 20 | 21 Vegas trip | 22 | 23 | 24 Remodel bath | 25 |
| 26 | 27 | 28 resume | 29 | 30 | 31 | 1 |

Week View · Week View · Week View · Week View · Week View

Bob Henderson

! You can drag a person's name to any other lozenge

User Photo Slideshow

HUBkap  Internet

Customer "Glad" and Logo Area hub kap

Entertainment

Who

PEOPLE
- Me
- Paul Jones
- Maria Davis
- Charles Miller
- Ruth Parker
- Sarah Baker
- Jeff White
- Donald Lewis
- search/add

GROUPS
- Bowling Pals
- Work Buddies
- Siblings
- Wife's Family
- Support Group
- Biker Club
- Poker Friends
- search/add

3101

What

ACTIVITIES
- Breakfast
- Lunch
- Dinner
- Bowling
- Poker Run
- search/add

To-Do

Shopping
- ☑ Ketchup
- ☐ Ground Beef
- ☐ 4 oz Tuna
- ☐ Soy Milk
- ☐ Veggie Yum
- ☐ Ham
- ☐ Cheddar
- search/add

Where

LOCATIONS
- Chili's
- Denny's
- Café Del Sol
- TGI Fridays
- McDonalds
- Joe's Café
- Donut World
- search/add

MAPS

When

< May 08 >  Today

✓ Personal  Family
  Friends  Business

| | Monday | Tuesday | Wednesday | Thursday | Friday | Saturday | Sunday |
|---|---|---|---|---|---|---|---|
| Week View | April 28 | 29 | 30 | May 1 | 2 | 3 | 4 |
| Week View | 5 | 6 | 7 | 8 | 9 | 10 | 11 |
| Week View | 12 | 13 | 14 | 15 | 16 | 17 | 18 |
| Week View | 19 | 20 | 21 | 22 McDonalds | 23 | 24 | 25 |
| Week View | 26 | 27 | 28 | 29 | 30 | 31 | June 1 |

3401

Read  Send  Chat  Share

? Help   Recycle

DYNAMIC SOCIAL NETWORK SYSTEM

CROSS-REFERENCE TO RELATED APPLICATIONS

This application claims the benefit under 35 U.S.C. § 119 (e) of U.S. Provisional Application No. 61/014,422, titled "Communications System" filed on Dec. 17, 2007 in the U.S. Patent and Trademark Office and U.S. Provisional Application No. 61/051,339, titled "Dynamic Communications, Data, and Marketing System" filed on May 7, 2008 in the U.S. Patent and Trademark Office, both of which are herein incorporated by reference in their entirety for all purposes.

TECHNICAL FIELD

The following description relates generally to an integrated web-based communications service, and in particular to a dynamic social networking system.

BACKGROUND

Internet social networking websites are actually much like dating websites. A user creates an account, uploads personal pictures and description hoping to attract other people with similar interests much in the way a person tries to attract dates on a dating website. A problem with such web sites is the flood of unwanted solicitations among the few genuinely interest parties seeking new friends. Any images that are shared on these websites are soon downloaded and otherwise copied from the website at which point the poster loses any control over the distribution of the images. The images may end up posted in undesired places or "photo-shopped" with unwanted modifications. As a result, many users are disappointed by their experiences while others avoid the whole situation due to the potential negative consequences of sharing information and dealing with volumes of junk messages and unwanted propositions. Therefore, an improved social networking technologies, processes, and system are needed to overcome these and other difficulties experience during social networking.

SUMMARY

In one general aspect, an automated process implemented in dynamic social network system includes: receiving an indication from a user to create a social network; automatically creating a group with members from a plurality of contacts previously associated with the user and stored in a user database of the system; automatically spawning a website customized for the group; providing a dynamic link to each of the plurality of contacts; and providing access to the custom spawned website in response to activation of the link.

Wherein receiving an indication may include receiving an input of a group name from a user interface. Automatically creating a group may include providing an indication of the group name within a group lozenge of the user interface, providing a list of contacts including the plurality of contacts to a people lozenge of the user interface, and receiving an indication from the user interface to add the plurality of contacts to the group name by receiving an indication from a user input device of the user dragging the plurality of contacts from the people lozenge to the group name. The system may automatically associate names of the plurality of contacts to the group name in response to receiving the dragging indication in addition to storing the association within the user database.

Providing the dynamic link also may include creating a message with the dynamic link for a member of the group and providing an indication of the message for a read lozenge of the member.

The spawned website is a custom webpage just for members of the group to facilitate communications and exchange of data between the group members.

The group members who are system users are notified of the creation of the group webpage via a message provided in conjunction with their read lozenge. In addition, the system automatically generates an electronic communication to any group members who are non-system users that includes a dynamic link to access a system server providing the spawned custom group website.

The method also may include maintaining the custom group website as long as the group exists. In addition, the system monitors access of the custom group website to determine whether to maintain an instance of the custom group website and removes the dynamic link after a predetermined period of time without access by any member of the group.

The method also may include granting group members access to the custom group website and providing access to digital content associated with the group members via the granted access or providing a forum style messaging window for member to engage in a chat session with other members of the group. The method also may include granting group members access to the custom group website and providing access a group calendar via the granted access.

In another general aspect, a method providing a social matching service for a user of a dynamic social network system includes automatically creating a group with members from a plurality of contacts previously associated with the user and stored in a user database of the system; receiving an indication to activate the matching service for the group; automatically determining a social interest associated with the group from group data and interests of group members; searching a profile database for all system users to identify all users with a social interest stored their profile that matches the determined group social interest; and introducing each identified user who is not already a group member.

Identifying a user may include identify user within the specified vicinity of a group location. Introducing may include making an introduction between the identified user and the group member by providing a message to the identified user and one or more group members requesting approval for further contact.

The method also may include receiving an affirmative answer from the user and the members and automatically adding the contact information of the user to a people lozenge of each member.

The method also may include receiving an affirmative answer from the user and the members and automatically adding the contact information to the list of members in the group.

Automatically determining may include identifying any interests of the members in the group for which a matching service is activated and comparing the identified interests to group to determine if a correlation exists. A correlation between the group interest and the member interest may be determined and the system may store the member interest as the group interest.

Other features will be apparent from the detailed description, drawings, and claims.

DESCRIPTION OF DRAWINGS

FIG. 15 is an exemplary illustration of the user interface with a extra large people lozenge and a large calendar lozenge.

FIG. 20 is an exemplary illustration of the WHO strip with the calendar lozenge in the Month view.

FIG. 22 is an exemplary illustration of the WHO strip with the calendar lozenge in the Expanded Day view.

FIGS. 23, 24, and 25 illustrate an exemplary sequence of selecting and dragging to add a contact to an existing group.

FIGS. 26, 27, 28, 29, and 30 illustrate an exemplary sequence of selecting items from multiple lozenges to drag to create an event.

FIGS. 31, 32, 33, and 34 illustrate an exemplary sequence of create an event by dragging a location to the calendar lozenge.

Throughout the drawings and the detailed description, like reference numerals refer to the like elements.

DETAILED DESCRIPTION

The following describes a system and methods that provide integrated web-based graphic user interface to manage communications for a variety of WEB-accessible mobile devices, computers, and other consumer electronic devices. The graphical interface provides a number of services to provide for the creation of social or networking groups. In addition, user communications and the exchange of information between members of groups is facilitated via uniquely spawned custom group websites. Social matching also is provided to facilitate meeting users of with similar interests and the formation of custom websites as needed and on demand. However, the service provider system described herein avoids common problems plague existing social networks by providing the user with greater control over the sharing of their information and adding members to their groups.

The system service provider maintains a contact list of "People" within the system. The user is free to create groups at any time by simply making collections of "people." When a group is created by the user, the system automatically creates a custom, private, and safe social networking website that may only be accessed by members of the group. The system service provider automatically spawns a website for any "group" created using the system. The group may be created from the user interface and the groups lozenge. Users may communicate via a multi-user chat room provided by the website. Videos and images or any other digital media or content may be easily shared with group members. In addition, the website associated with the group stores any messages sent to the group, any multi-user chat between group members, any shared videos or images, any shared files. As a result, group members may access this information at any time; however, other people beyond the group are unable to access this information. The user interfaces, website, system, and various processes are described in further detail below.

System Architecture

Figure 1:
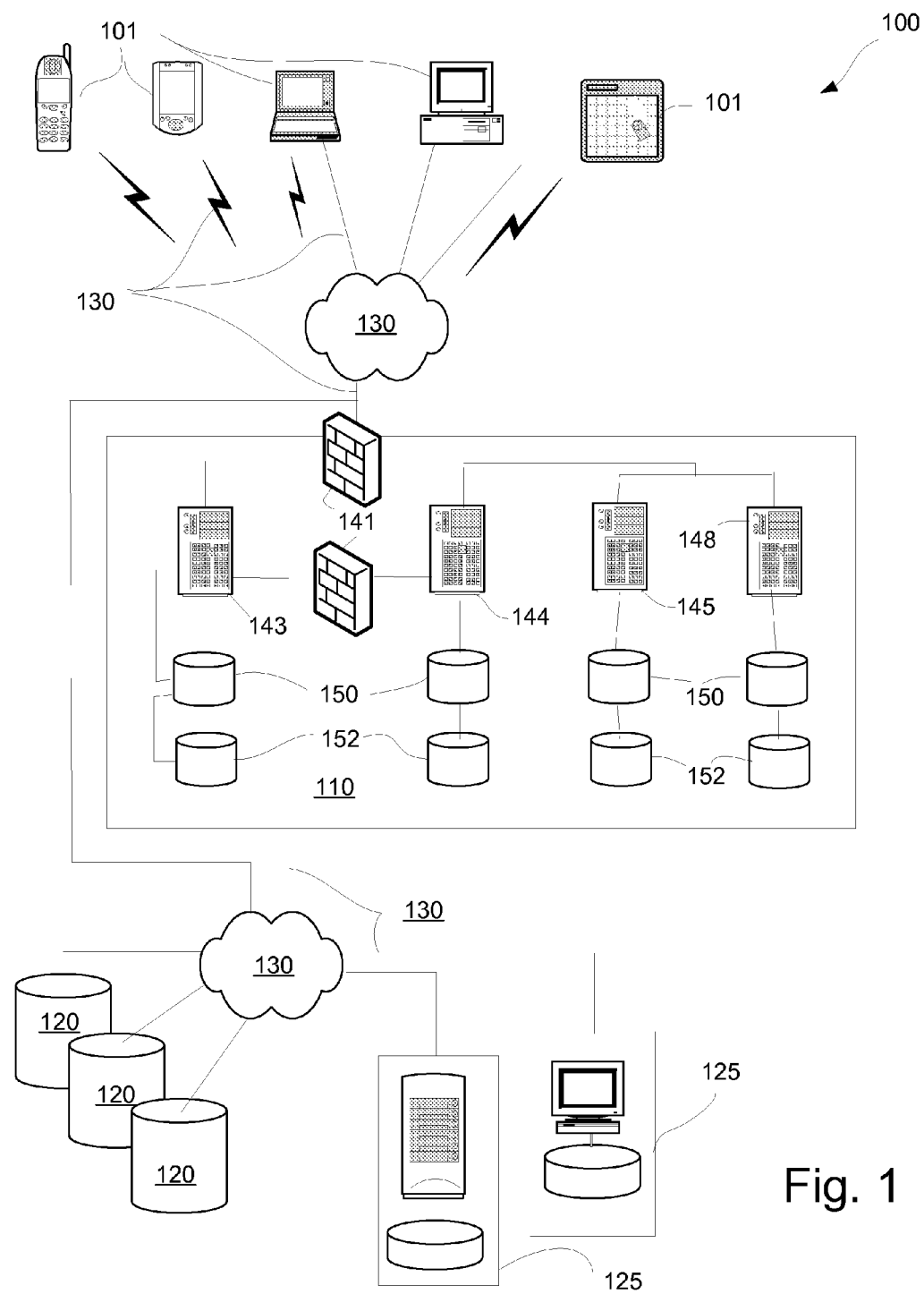
FIG. 1 shows one exemplary block diagram of a communications system.

FIG. 1 shows one block diagram of an exemplary communications system 100. The communications system 100 includes one or more user devices 101, a service provider system 110, other Internet Service Providers and websites 120, system partners 125, and various communication paths 130. As the communications system 100 is device and source agnostic, the communications system 100 is designed to work with any web-accessible user device, as explained in further detail below.

The user device 101 may be any type of electronic device that presents content received from the service provider system to the user. For example, the user device 101 may be a consumer electronics device, a mobile phone, a smart phone, a personal data assistant, a digital tablet/pad computer, a hand held/mobile computer, a personal computer, a notebook computer, a work station, a vehicle computer, a game system, a set-top-box, or any other device that can implement a user interface and/or browser to communicate with and present content from the service provider system 110.

The user device 101 may include a processing device, one or more storage devices, and one or more communications interfaces. A user device 101 also may include additional elements, such as, for example, one or more displays or screens, one or more speakers, one or more user input devices, and a microphone. A user device 101 also may include one or more associated peripheral devices, such as, for example, a display, a memory, a printer, an input device, an output device, and speakers.

The processing device may be implemented using any general-purpose or special purpose computer, such as, for example, a processor, a digital signal processor, a microcomputer, a field programmable array, a programmable logic unit, a microprocessor or any other device capable of responding to and executing instructions in a defined manner. The processing device may run one or more software applications that communicate with the service provider system 110 and present content received from the server provider system 110 to the user. The processing device also may access, store, manipulate, process, and create data in response to the applications. The software applications may include a computer program, a piece of code, an instruction, or some combination thereof, for independently or collectively instructing the processing device to operate as desired. Examples of software applications include: a browser, a mini browser, or other programs that interact with a front end interface application (FEIA) provided by the service provider system 110 to provide content, a login/signup, a user interface, and email among other features. Other examples of applications, include a mobile front end interface applications (e.g., for a cell or a smart phone) that allow the user device to communicate with the system service provider 110.

The applications, content, and data may be embodied permanently or temporarily in any type of machine, component, physical or virtual equipment, storage medium or device, or propagated signal wave capable of providing instructions or data to or being interpreted by the processing device. In particular, the applications or data may be stored by a storage medium or a memory including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, an SRAM, DRAM, PROM, EPROM, OPTROM, EEPROM, NOVRAM, or RAMBUS), such that if the memory is read or accessed by the processing device, the specified steps, processes, and/or instructions are performed and/or data is accessed, processed, or stored. The memory may include an I/O interface, such that data and applications may be loaded and stored in the memory allowing the applications, programming, and data to be updated, deleted, changed, or augmented. The memory may be removable, such as, for example, a card, a stick, or a disk that is inserted in or removed from the unit.

The communications interface may exchange data and content with the service provider system 110 using various communications paths 130. The interface allows the processing device to send and receive information using the communications paths 130. The communications interface may be implemented as part of the processing device or separately to allow the processing device to communicate using the communications paths 130. The interface may include two or more types of interfaces, including interfaces for different types of hardware and/or software to interact with different types of communications media and protocols and to translate information/data into a format that may be used by the processing device. Similarly, the interface may translate information/data received from the processing device to a format that may be transmitted to the service provider system 110 via a communications path 130.

The communications paths 130 may be configured to send and receive signals (e.g., electrical, electromagnetic, or optical) that convey or carry data streams representing various types of analog and/or digital data including content for presentation to a user. For example, the communications paths 130 may be implemented using various communications media and one or more networks comprising one or more network devices (e.g., network interface cards, servers, routers, switches, hubs, bridges, repeaters, blades, processors, and storage devices). The one or more networks may include a local area network (LAN), a wide area network (WAN), a global area network (GAN), a plain old telephone service (POTS) network, a digital subscriber line (DSL) network, an integrated services digital network (ISDN), a synchronous optical network (SONNET), Passive and Active Optical Networks (PON or AON), or a combination of two or more of these networks. In addition, the communications paths 130 may include one or more wireless links (e.g., microwave, radio, and satellite) that transmit and receive electromagnetic signals, such as, for example, radio frequency, infrared, and microwave signals, to convey information/data signal. In one example, a communications path 130 may include the Internet or World Wide Web.

The service provider system 110 facilitates communication by, organization of, and presentation of content to users. The service provider system 110 also stores and manages user associated information in a centralized location. In particular, the service provider system 110 implements a user interface to aggregate, consolidate, organize, and simplify a user's daily communications, such as email and instant messaging into a central point for one-stop organization, data, and content management.

The service provider system 110 includes one or more communications devices, processors, memories/storage devices, communications interfaces, network devices, and communications paths to store, process, manipulate, organize, consolidate, maintain, and present content and data for a user. In the example shown in FIG. 1, the service provider system 110 may include a one or more security devices 141 (e.g., firewalls), web servers 142, an application server 144, an SQL server 145 and a mirror SQL server 148, and associated memory 150 and backup memory devices 152. It is understood, however, that the example given in FIG. 1 is for illustrative purposes only, and that different configurations, combinations of devices, and numbers of devices may be provided for any particular service provider system 110. For example, the system service provider may include multiple banks of servers as need to supply adequate bandwidth for the number of users supported by the system. In addition, the system 110 may be geographically distributed.

In one example, the web server 143 may be implemented using a Dell PowerEdge 1900 2-Socket, Quad-Core Tower Server with a Red Hat Enterprise Linux 5 operating system using an apache HTTP server programming language to provide JavaServer Pages (JSP). The web server 143 may run a FEIA to aid in login, signup, and creation of a user account, and receive information from the first time wizard. The application server 144 may be implemented using a Dell PowerEdge 1900 2-Socket, Quad-Core Tower Server with a Red Hat Enterprise Linux 5 operating system using programming languages YoLinux Java, Eclipse C/C++ IDE. The application server 144 The application server may run system applications, such as, for example, the contact importer, harvester, and maintainer, calendar maintainer and syncer, mail fetcher/sender, threader, glad logic, glad placement applications, route mapper, item finder, client communicator, and user interface. The SQL Server 145 may be implemented using a Dell PowerEdge 1900 2-Socket, Quad-Core Tower Server with a Red Hat Enterprise Linux 5 operating system using an Oracle Database 11g Enterprise Edition for Linux (or equivalent) to maintain various databases, such as, for example, a contact database (DB). The mirror SQL 148 server mirrors the SQL Server 145. to maintain a user DB and a glad, advertisement, or customer incentive database, a store DB, a item DB, a contact DB, a message DB, among other described herein. The user database may include a user profile, user events, shopping lists, to-do lists, user groups and contact DB, and user locations DB. The mirror SQL server mirrors the SQL Server. The term database DB includes not only the data but may include the programming of the database application for maintaining the data.

In order to interact with the service provider system 110, a user needs to establish an account. The user must activate the account from a user device 101 running an application allowing the user device 101 to communicate with the service provider system 110, such as a browser. A browser may include any application that communicates with a web server primarily using hypertext transfer protocols HTTP (e.g., HTTP/1.1) to fetch content or provide a portal to service provided by the service provider system 110. HTTP allows the browser to submit information to servers in addition to fetching content from them. Content may be located by the browser using a uniform resource locator (URL) as an address. Many browsers also support a variety of other URL types and their corresponding protocols, such as Gopher (a hierarchical hyperlinking protocol), file transfer protocol (FTP), real-time streaming protocol (RTSP), and an SSL encrypted version of HTTP (HTTPS). Content may be provided in a hyper-text markup language (HTML) that is identified using a MIME content type. Most browsers natively support a variety of formats in addition to HTML, such as the JPEG, PNG, and GIF image formats, and can be extended to support more through the use of plugins and/or scripts. The combination of HTTP content type and URL protocol specification allows images, animations, video, sound, and streaming media to be embedded in the content.

The browser may include coding that interacts with the FEIA. The initial code that is run in the browser may be downloaded from the service provider system 110 (e.g., with purchase of an account) or retrieved from a storage medium (e.g., a CD promotional gift). The browser running on the client device 101 connects with the FEIA application run by the service provider system 110 web server 143 to initiate login, account activation, and provide a first-time questionnaire. During the initial account setup, the user may create a password and/or user identification (ID). In addition, the service provider system 110 may configure settings and data on the user device 101 (e.g., set cookies). The service provider system 110 also provides the user with a user profile questionnaire.

Figure 2:
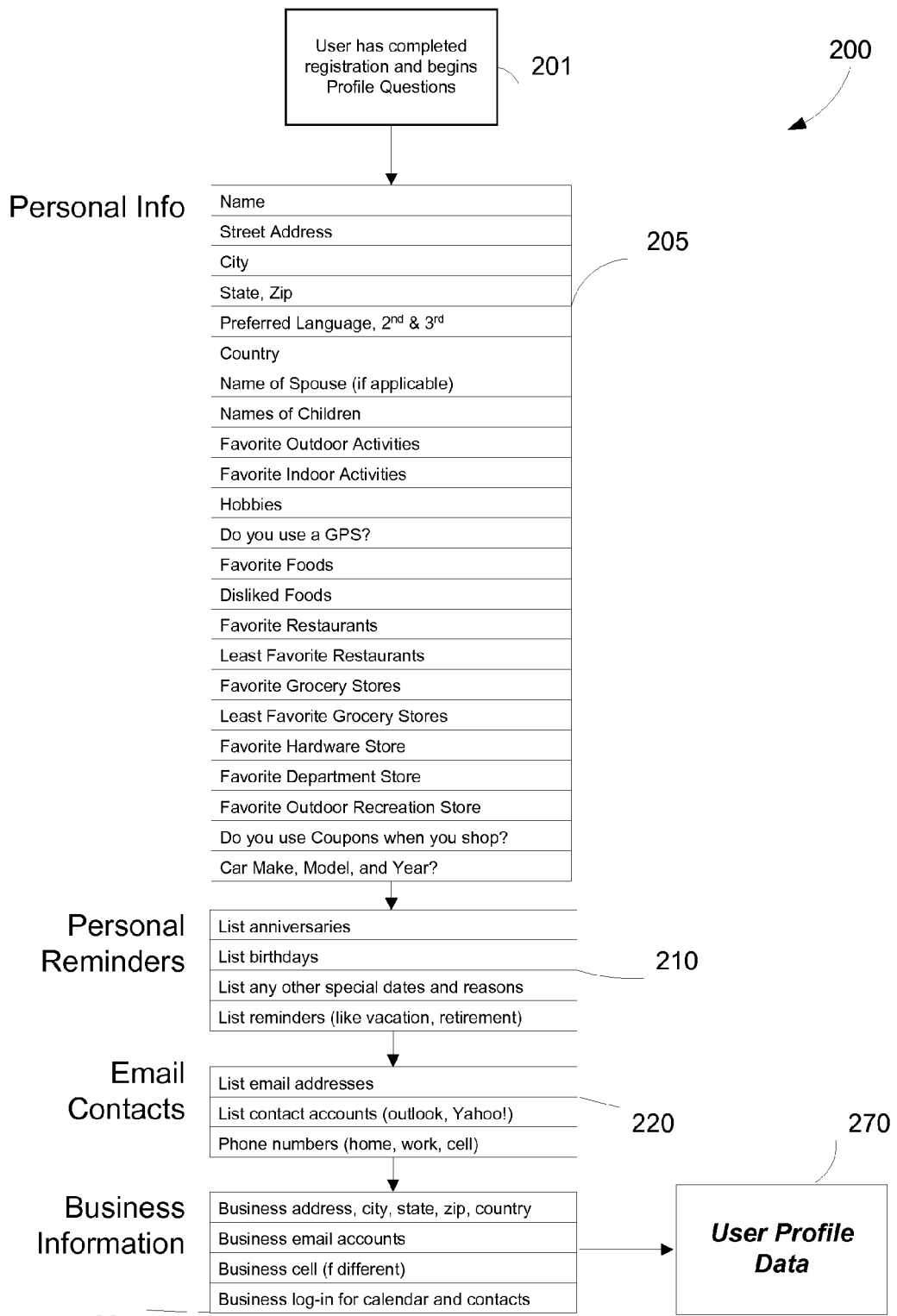
FIG. 2 is an exemplary process for a user profile questionnaire.

FIG. 2 illustrates an example 200 of how the service provider system 110 conducts the initial user profile questionnaire. As shown in FIG. 2, when the user login is first initiated 201, the service provider system 110 asks the user several questions to help tailor the content and services that are delivered to the user. After the initial questionnaire is completed, an edit function provided by the user interface allows the user to update their profile information at any time. After the user completes their initial registration, the user then responds to the questionnaire provided by the user interface, which may be updated or changed at any time. The questionnaire may be provided in any number of formats that allow a user to provide information to the service provider system 110. For example, the questionnaire may be a webpage that includes content, such as a series, list, or groups of questions for the user to answer. Various windows, fields, boxes, lists, or drop down menus may be provided to solicit and receive information from a user. Some examples of questions asked or information requested may include personal information 205, personal reminders 210, email contacts 220, and business information 225.

Examples of the personal information 205 may include: a user name, a zip code, a name of spouse, and the names of children. The user also may provide their address/contact data or the system can automatically provide address data.

The service provider system 110 also collects information about personal reminders 210 so the service provider system 110 may remind the user of important dates, such as, anniversaries; birthdays (e.g., spouse, kids, relatives, and friends); an unlimited number of special dates and names of those events; and reminders (e.g., such as vacation, appointments, activities, or retirement). The personal reminders may be used as a source of greeting events, as explained in further detail below.

The user also is prompted to input email addresses 220 (e.g., family, friends, business contact, and relatives, among other important contacts). The user is asked to input their user names/aliases/IDs/account numbers and passwords for any online accounts, such as Yahoo!, Google, MySpace, kut, Hi5, Facebook, Friendster, Linked In, XING and Twitter. The user also is asked for any other important contact information, such as phone numbers (e.g., work, cell, and home).

Business Information 225 also may be collected by the service provider system 110, such as business zip, business email account(s), business cell phone (if different), business log-in (user name and password) for contacts and calendar.

Once this information is collected, the information is stored in the user profile database 270.

Figure 3:
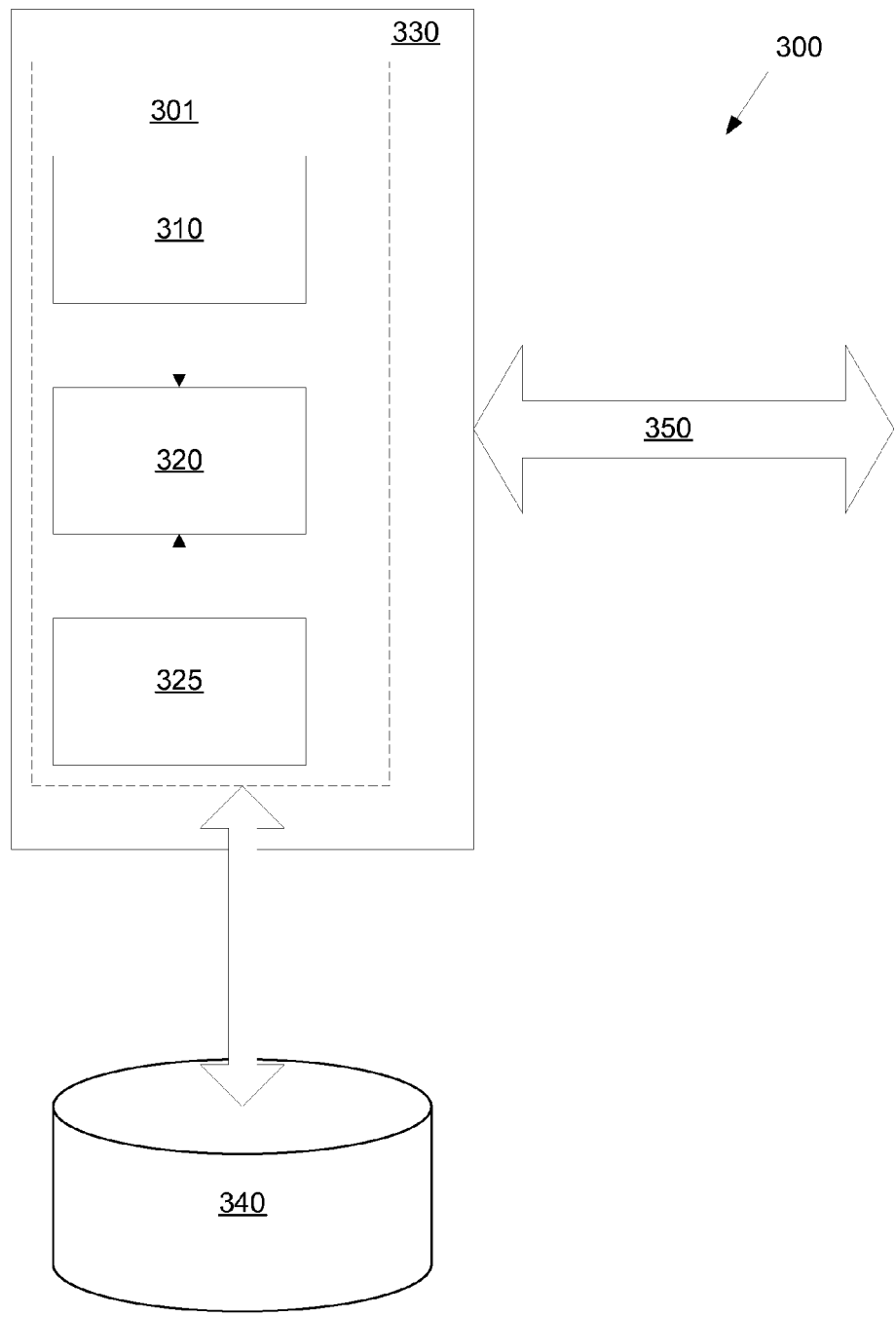
FIG. 3 is an exemplary block diagram of a contact aggregator system.

As shown in FIG. 3, the service provider system 110 works to collect, harvest, organize, and maintain contact information through the use of a contact aggregator system 300. The contact aggregator system includes a content aggregator 301. The content aggregator includes a suite of software/applications including a contact importer 310, a contact harvester 320, and contact maintainer 325 run by one or more servers 330 of the service provider system 110 that runs applications in conjunction with maintaining the client contact DB and a one or more storage devices 340. In one example, the server 330 may be implemented using the applications server 144 and associated hard disk 150 and shadow storage 152. The server 330 communicates with the rest of the service provider system 110 through communications path 350 (e.g., a communications path 130 secure link to the web server 143 and the SQL server 145).

The contact importer 310 imports contacts from various user client devices 101 and any other accounts, software, and systems associated with the user that store user contact information. The contact importer 310 also uses various user accounts information, such as the user names, the IDs, the aliases, and the passwords gathered during the initial account set up to masquerade as the user and download the user's contact information associated with or stored by any portal and/or social networking websites that user might belong to.

Using the passwords provided by the user during account setup, the contact maintainer 310 implements an automated process to login as the user on all supported address book/contact storage accounts, such as Yahoo!, Google mail, and Outlook. Any contacts that are identified from these accounts are imported into a temporary database. All imported contacts are compared against each other, and, if possible, the data is merged, the duplicates are deleted, and a final list of contacts and their associated information is created and placed in the user contact DB, which stores all of the user contacts.

For each contact associated with a user's account stored in contact DB, the contact DB may include a number of datafields to store information regarding the contact. For example, the data fields may include a contact name, one or more email addresses, a fax number, one or more mobile phone numbers, a voice phone number, a business phone number, a home number, a home address, a business address, and various IM IDs. The contact importer 310 also captures any user avatar images when available. During the automated import process, the contact importer 310 merges the data collected from various sources and eliminates any duplicate information. For each contact the importer finds in one the user's existing contact formats, the contact importer attempts to populate as many the fields provided by the contact DB as possible with the information available from the importation process. Any contacts that are missing information may be provided to the contact harvester 320 in an attempt to retrieve the missing information. The contact importer then writes this information stored in a temporary database to the Contact DB.

The contact harvester 320 is an application that is used to retrieve, supplement, and/or update contact information that may be incomplete, out of date, or in error. The service provider system 110 examines the contact DB after initial setup and periodically thereafter. As part of the examination, the service provider system 110 provides the contact harvester 320 with contacts that have information fields that are missing information, are incomplete, or may be suspected of being incorrect or out of date. The contact harvester 320 spawns a web page for such contacts to solicit missing or information in need of updating. The web page may be hosted by the web server 143. The web page may be populated with all or a portion of the existing information for the contact stored in the contact DB. In addition, information associated with one or more fields that are blank, incomplete, or missing may be requested or solicited. The web page may include window, boxes, fields, menus that may be used by a contact to provide the missing information in conjunction with a browser. The contact harvester 320 generates an email that is sent to the contact at one or more of the email addresses stored for the contact in the contact DB. The email contains a link to this spawned webpage which may then be filled out by the user. To assure the contact being solicited of the authenticity of the web page and the email with the link to the webpage, a personal message from the user may be included or other information known to the contact may be provided. For example, a photo or avatar of the user and/or a portion of the user's personal information may be included with the message and/or website.

The contact harvester 320 also may interface with a telephony based, or web-telephony based device with voice prompts and voice recognition capability. As a result, the contact harvester 320 may get in touch with a contact at a provided phone number and use automated voice recognition technology and/or automated menus to request the missing contact information directly from the contact. This is especially helpful for tracking down contact information for contacts without valid email addresses. The automated voice system translates answers from the contact into digital data that is stored in the contact DB. The contact harvester 320 may then provide a spawned website and email to the contact to verify the information received by the automated voice system. The contact harvester 320 provides a report to the user if the contact harvester 320 is unable to contact a user and/or determine missing information.

When the service provider system 110 spawns a custom website for a contact to fill out their contact information, all known contact information may be filled out in the spawned form. The contact is then asked to fill in any missing info or update and change information that may be incorrect. Certain items or fields having missing or incomplete information that can be looked up with high accuracy may are filled in automatically by contact harvester 320. For example, if the contact information contains an address with the word "Calgary" in the city field, the contact harvester safely fills in the State/Province field with "Alberta" and the country field with "Canada." If the contact includes an address field of "503 Aniston Place, Apt 43," a city field of "Salisbury," and a State/Province field of "WI," the contact harvester safely fills in the Zip Code/Postal Code field with 91234 and the country field with "USA." A sample spawned webpage which may be used by a contact to fill in missing information is shown in FIG. 4.

Figure 4:
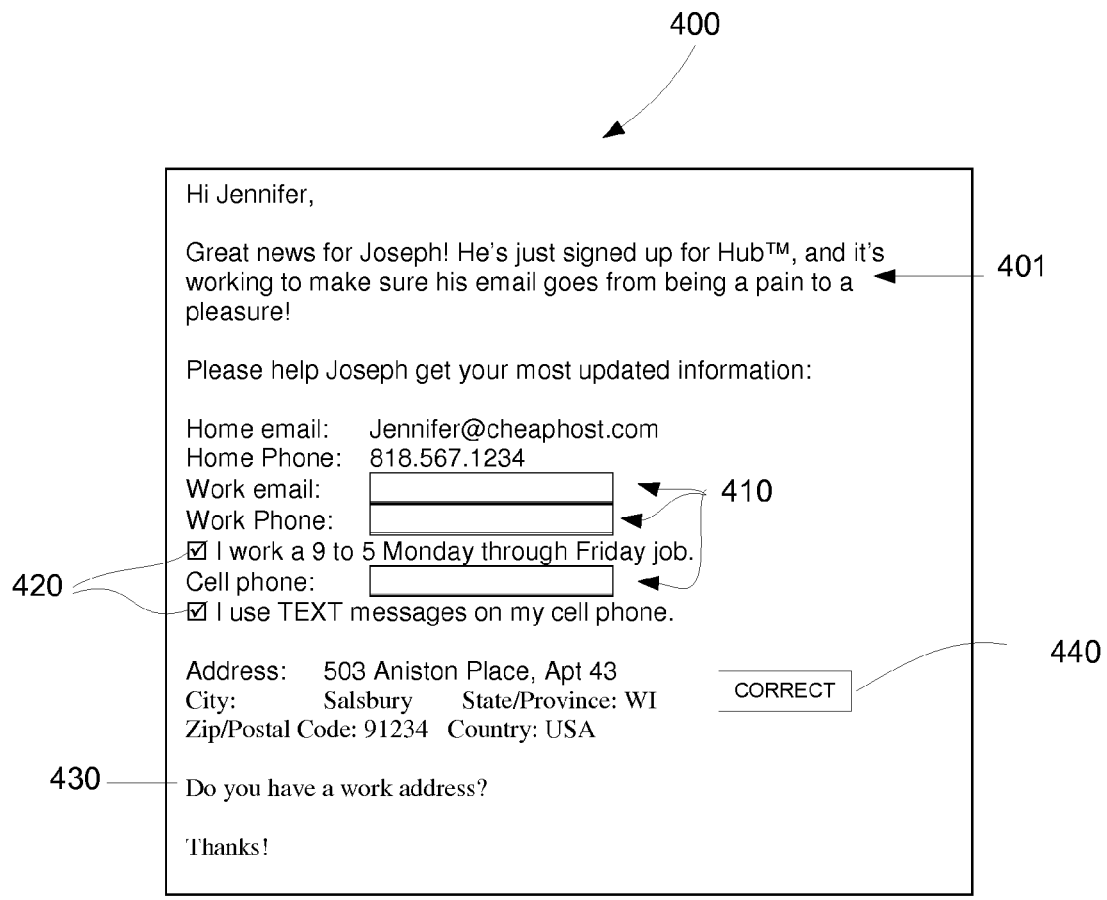
FIG. 4 is an exemplary contact fill-in form.

As shown in FIG. 4, the webpage 400 may include a personal greeting 401 and a listing of the contact data stored in the contact DB for the contact. Missing elements may include an entry field 410 for the contact to supply the missing information through use of a user input device. Check box 420 may be provided to toggle features on and off. In addition, there may be a solicitation for additional information 430 which can spawn additional web pages to supply the requested information. In addition, the webpage may include a verification 440 for the existing information. No response or a yes indication does not trigger any change; however a negative indication may spawn an additional webpage to correct and/or supplement the contact information displayed. Alternatively, the user may be able to change the information directly in the webpage by using a user input device and selecting the user information to change and change the information.

The contact maintainer 325 is an application that helps to maintain the integrity of contact information stored in the contact DB. For example, the contact maintainer 324 keeps track of failed email deliveries associated with the user account. If the contact maintainer 325 suspects that a contact has changed their email address (thereby accounting for the failed email deliveries), the contact maintainer 325 provides the information contact to the contact harvester 320. The contact harvester 320 may then generate a spawned webpage and/or use the automated phone system to determine correct contact information and/or update the contact information in the contact DB.

The contact maintainer 325 also scans or reviews user emails to detect key words and/or phrases, such as "my new phone number is," "we're moving," and "my new address is." If such key words, phrases, or combinations of key words are detected, the contact maintainer 325 parses the text to determine if the email is a change of address/email/phone message or is otherwise updating/change information associated with contact. If the contact maintainer 325 determines with a predetermined level of confidence that the email does contain such information, the contact maintainer prompts the user with a message, for example, like this:

"Hi, we think that Cynthia Alvarez might be changing her phone number from 310.234.1234 to 818.334.4456. Select here to make this change, or select here to read the email."

The user may then select to update the user information or make further inspection of the information to determine if the contact information should be updated. The message may be provided in any number of formats including email, instant messages, or directly through a user interface of the user device 101.

As described above, the service provider system 110 also gathers personal reminder information for users, such as contact birthdays. The contact maintainer 324 uses the personal reminder information as greeting events to automatically send greetings to contacts. Examples of greeting events include birthdays, anniversaries, and holidays, among others. The contact maintainer 325 uses the greeting event as an opportunity to periodically contact all members of the contact list. When the contact maintainer 325 determines the occurrence of a greeting event, the contact maintainer 325 sends a greeting to one or more contacts, such as "Happy New Year!" The greeting may be an email or instant message. The greeting may include a question for the contact, such as "Do you have new contact info?" If the user responds in the affirmative, the contact harvester 320 may spawn a webpage for the contact to review their stored contact information and update/ change information as necessary. As a result, the greeting provides an opportunity to the contact to update their contact information and for the service provider system 110 to spread this information. More importantly, the contact maintenance is done without any additional effort or input required by the user.

The contact aggregator is described in further detail in co-pending U.S. patent application Ser. No. 12/141,097, titled "Contact Aggregator" filed Jun. 18, 2008, which is herein incorporated by reference in its entirety for all purposes.

Figure 5:
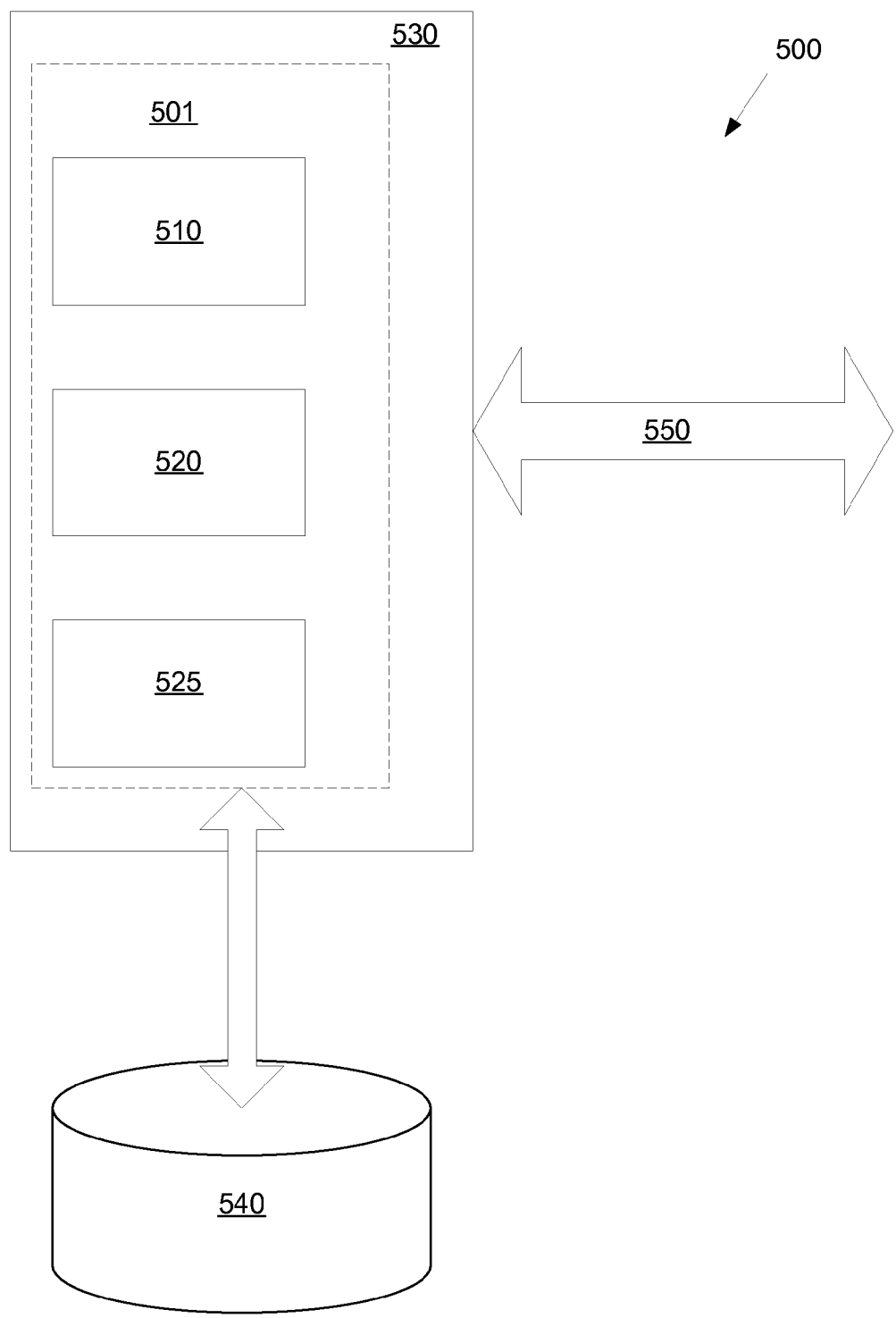
FIG. 5 is an exemplary process for message threading.

As shown in FIG. 5, the service provider system 110 works to collect, harvest, organize, and maintain a user's calendar information through the use of a calendar aggregator system 500. The calendar aggregator system 500 includes a calendar aggregator 501. The calendar aggregator includes a suite 501 of software/applications including a calendar importer 510, a calendar harvester 520, and calendar maintainer 525 run by one or more servers 530 of the service provider system 110 that runs applications in conjunction with maintaining the client calendar DB and a one or more storage devices 540. In one example, the server 530 may be implemented using the applications server 144 and associated hard disk 150 and shadow storage 152. The server 530 communicates with the rest of the service provider system 110 through communications path 550 (e.g., a communications path 130 secure link to the web server 143 and the SQL server 145).

The calendar importer 510 imports calendar data from various user client devices 101 and any other accounts, software, and systems associated with the user that store user calendar data and information. The calendar importer 510 also uses various user accounts information, such as the user names, the IDs, the aliases, and the passwords gathered during the initial account set up to masquerade as the user and download the user's calendar information associated with or stored by any portal and/or social networking websites that the user might belong to.

Using the passwords provided by the user during account setup, the calendar importer 510 implements an automated process to login as the user on all supported calendar storage accounts, such as Yahoo!, Google calendar, and Outlook. Any calendar items or data that are identified from these accounts are imported into a temporary database. All imported calendar items are compared against each other, and, if possible, the data is merged, the duplicates are deleted, and a final set of calendar data calendar is created and placed in the user calendar DB, which stores all of the user calendar information. The calendar importer 510 and its processes may be run in conjunction with the contact importer 510.

The calendar DB may include a number of data-fields to store information regarding the user's calendar. For example, the data fields may include a years, months, weeks, days, a timeline of hours and minutes during a day, and events, reminders, meetings, tasks, to-do items, shopping items, and there associated data and information. During the automated import process, the calendar importer 510 merges the data collected from various sources and eliminates any duplicate information. For each calendar the importer finds in one the user's existing calendar formats, the calendar importer 510 attempts to populate as many the fields provided by the contact DB as possible with the information available from the importation process. The calendar importer 510 then writes this information stored in a temporary database to the calendar DB.

The calendar harvester 520 is an application that is used to retrieve, supplement, and/or update calendar information by periodically logging into the users various calendar accounts to retrieve information and update the user's calendar information. The calendar harvester 520 is an application that is used to retrieve, supplement, and/or update calendar information by periodically checking these other calendar account databases either by accessing their data APIs, or by logging into these accounts utilizing user log on information (user name and password) provided by the user during setup. The calendar harvester has the ability to masquerade as the user, log onto their other calendar accounts, and harvest the data.

Depending on the type of access (API or masquerade) the frequency of the checking varies. With an API checking can happen very often, whereas masquerading may happen only a few times a day.

The calendar harvester reads the information from the user's other accounts, interprets that data thus converting it to a compatible format with the system, and then installs that data into the user's calendar.

The calendar manager 525 receives user input provided through the user interface to manage the user's calendar. The calendar manager provides calendar information and data to the user interface and receives use input to setup, schedule, and maintain user events. The calendar manager also has access to all system user calendars which allow to instantly providing information about a user's other contacts maintained by the system service provider.

In addition, to maintaining a user's contacts and calendar information, the system also manages a user's various dialogs with other users. For example, emails sent to a user account are stored by the service provider system 110 in an archive database that is associated with a user account. The archive database stores the communications in their original form (e.g., STMP). The archive database also store threads of previous user communications. The threads are chronically arranged communications between two or more individuals that have a common subject. The threads contain the actual body copy of the communication with other non-essential information removed, such as, for example, headers, signatures, boiler plate or legal disclaimers, text history, wallpaper, animations, avatars, demarcations, line or extraneous characters.

Figure 6:
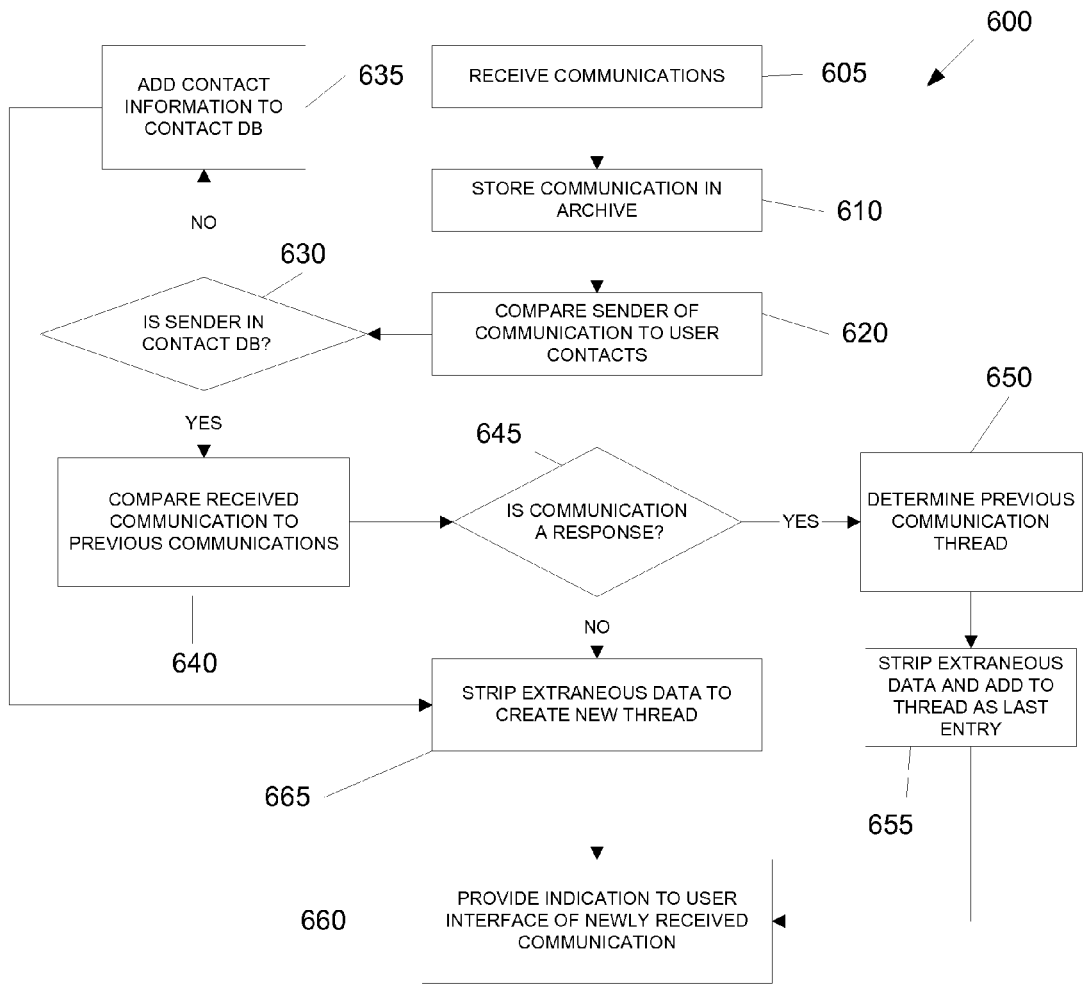
FIG. 6 is an example of a message thread.

FIG. 6 shows one example 600 the service provider system 110 processing of emails. As emails are received by the system service provider 110 (605), the emails are stored in the archive database (610). The address of the email sender is compared to the recipient's contact data to match the identification or name of the contact sending the email with information in the contact DB (620). For example, the server compares the text string in the FROM or SENDER fields with all of the contacts stored in the contact DB that are associated with a user. The system service provider determines if the user is in the contact DB 630. The service provider system 110 scans the archive DB of all current and previous communications sent or received by the user. The service provider system 110 identifies those communications between the user and the identified contact. By examining the text history in the email (i.e., the content displayed at the bottom of emails preceded by the ">" characters) and by examining the subject line, the service provider system 110 determines whether or not the email is a response to a previous communication stored in the archive DB 640.

If the email is a response, the service provider system determines a probability of which communication it is a response to 645. The service provider system 110 examines the subject, text history, and key words in the list of current conversation threads database, to determine which conversational thread the communication belongs to 650. Once a thread is determined, the system service provider 110 strips all data from the email except the actual body copy that was last typed by the contact sending the email 655. When stripping the email, the system removes all header information, all text history, signature boxes, wallpaper, avatars, animations, legal boilerplate, demarcations, lines, and extraneous characters to leave only the body copy or new communications characters sent by the contact. The body copy is then placed as a last entry to the communications thread. The updated thread is stored and an indication is provided by the user interface, as explained in further detail below 660.

If the communications is not determined to a response a new thread is created 665. When creating the new thread, the system includes only the actual body copy of the communication stripping all other data, as explained above. The new communication thread is stored in and an indication is provided by the user interface 660.

User Interface

As the number of technological advances in daily communications grows, many users find themselves overwhelmed by the sheer amount of information and content available to them. In addition, many of the user devices providing this information and content have a substantial number of functions associated with them to view and manipulate this content. As the amount of content and number of functions have grown, a typical user does not use many of the functions provided because it is difficult to access or utilize the information or the functions provided are only useful to a relatively small number of users. Therefore, a new user interface is provided to facilitate user access and manipulation of content and services provided by the service provider system 110.

The user interface provides a primary point of interaction between the user and service provider system 110. The web server 143 provides content and services to the user through a browser operating on the user device 101. The user device 101 establishes a connection to a web server 143 of the service provider system 110 using a communications path 130. After the connection is established, the primary interface is presented as screen rendered by a browser on a display of the user device 101. The screen may be a dynamic webpage provided by the web server 143 that is supplemented by additional programs, applications, and plugins operating on the user device.

The user interface provides electronic content generated by the applications, servers, and databases of the system service provider 110. The once the use device establishes a link with the service provider system 110, the user device and system exchange data. Data is transmitted from the system 110 to the browser in a markup language used by a client application or browser resident on the user device 101 and its operating system to render the page and present the user interface screen. Data also is transmitted from the user device 101 to the system 110 to provide indications of user interaction with the user interface. The data sent to the user device may be in any markup language that may be interpreted by the client application or browser running on the user devices that is presenting the system webpage. In one application, Flash technologies may be used and AJAX technologies may be used to provide the webpage of the user interface using the hypertext markup language (HTML), the JavaScript programming language, Cascading Style Sheets (CSS) and/or the eXtensible Markup Language (XML).

In one example, data may be transferred between the service and the user device using an HTML and/or XML format to render the page. Within the data of the markup language for the page, an instant messaging protocol application may be provided. The markup language is interpreted by the browser to run/assemble the instant messaging protocol application.

Once operating in the browser, the instant messaging application may be used to establish an instant message link between the client application or browser and the system server. This may be done by providing the system server with connection information (e.g., an IP address and number of the port assigned to the client user device). In addition, the client device also is provided with the connection information (e.g., an IP address and number of a port on the system server). Because the client device and server both have the IP address and port number of the other, the two devices may be considered "linked." As a result, certain user interactions with the browser while manipulating the user interface are sent directly to, and received directly from the server in real time. The direct "link" may be used to provide certain information directly to and from the server and client. For example, any information for calendar events may be provided directly without, for example, the need for any page refresh between the browser and the server in order to display the associated information. In addition, all online system users have this link established. As a result, when one person updates their calendar to add an event, the calendar of another system user may appear to be updated almost instantly or in real time. Similarly other items inputted by on the interface, such as tick boxes may be updated in this manner.

The user interface may include one or more areas, portions, boxes, windows, scroll/slider bars, tools, menus, buttons, and tabs; however, the numbers and arrangement of these items is selected so as to not overwhelm a user with functionality. The functionality of the user interface may be accessed or activated through use of one or more user inputs of the user device 101. For example, items and content on the screen may be selected and manipulated using one or more screen position indicators or visual effects (e.g., a pointer, a cursor, a highlighting, a transparency, a color, an animation, or an effect) controlled by one or more user input devices (e.g., a key, a keyboard/pad, a touch screen/pad, a mouse, a joystick, a track ball, and a stylus) as is common in graphical user interfaces (e.g., a pointer controlled by a mouse to click and double-click to activate, select, and drag items within a window, browser, or desktop environment).

In most cases, items in lists can be: selected, clicked, or tapped to designate, activate, or expand the item; double-selected, clicked, or tapped to edit an item; dragged within a list to reprioritize the item; dragged from a window, a list, a tab, or a button and dropped to another to convert an item to another type of item or to activate a function; and a special selection process, such as holding down a specific key (e.g., the Ctrl key or shift key) to allow multiple items on a list to be selected and/or dragged.

Characters and text may be entered in specific locations (e.g., a text box or entry field) using a keyboard, a keypad, a number pad, or a virtual keyboard/keypad (e.g., provided through a touch screen).

As the user interacts with items, functions, and content presented by the user interface, the items, functions, and content may be focused based on their interaction. Further examples of the user interface and its functionality are given in greater detail below.

As pointed out above, many users find the number, type, and functionality of the many different user interfaces to be overwhelming or at a minimum burdensome. Accordingly, the user interface described herein presents content in manageable portions for a user. Each portion includes items, data, functions, and content concerning an area of interest to the user. In particular, the data and content of most interest to a user may be distilled into four basic areas of interest which govern their daily communications: who, what, when, and where. In addition, the user interface automatically focuses information provided within these areas to the information that is most likely desired by the user at any given moment. To aid the user and avoid confusion, all contacts, messages, and appointments may be color coded or otherwise visually distinguished to indicate which category they belong to (e.g., Red=Personal, Green=Family, Purple=Friends, and Blue=Business). As a result, items belonging to these groups may be shown in, bordered, highlighted or otherwise visually distinguished with these colors. Finally, because the user interface data, items, content, and functionality are provided by the service provider system 110, they may be accessed by the user using any web accessible device with a browser. As a result, the user has access to their information from virtually anywhere and because the information is presented consistently, the user does not need to re-familiarize themselves with different operations and functionality even when accessing the information from different user devices. Nor does the user have to worry about a lost or stolen device resulting in lost information or having it compromised.

Figure 7:
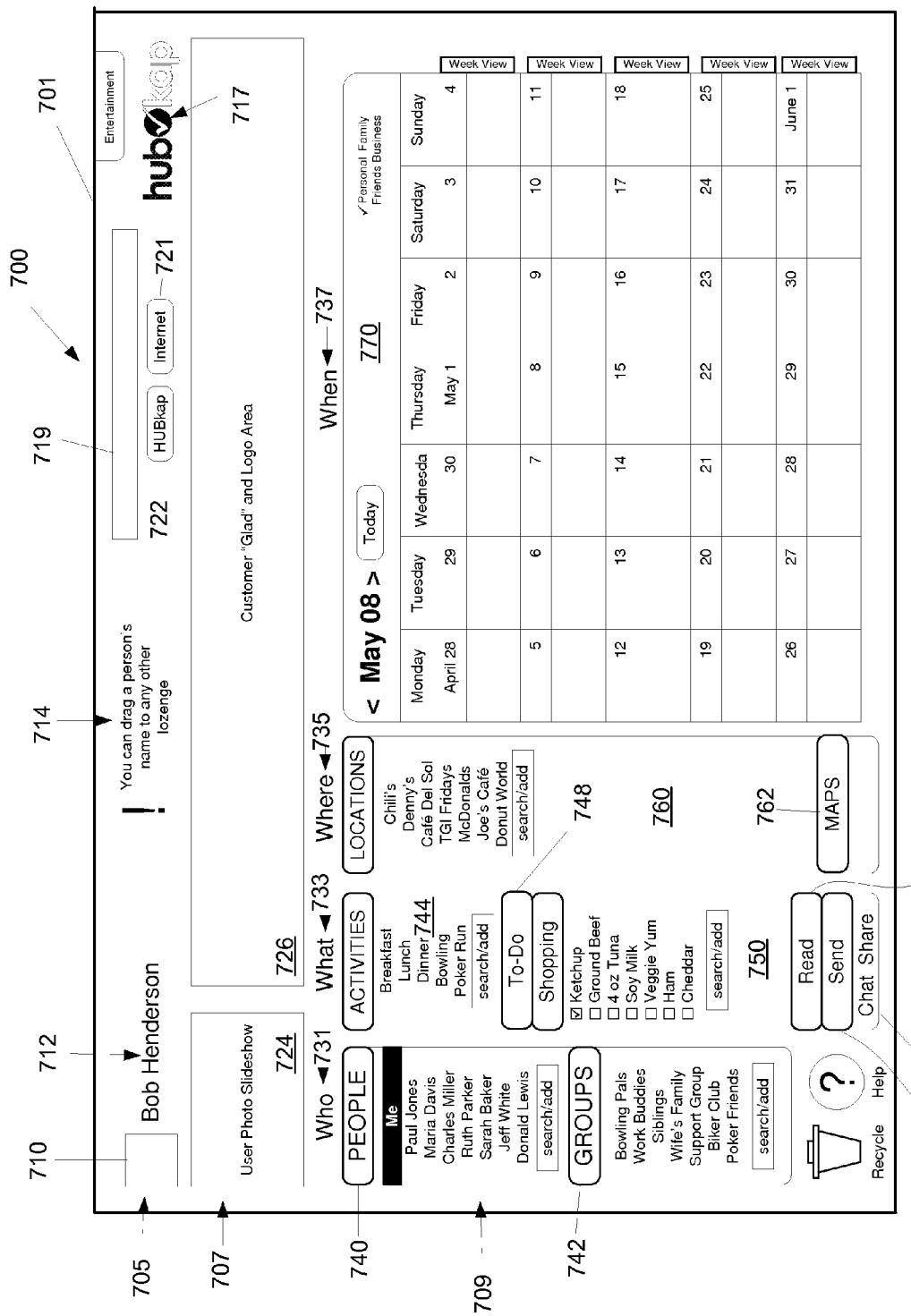
FIG. 7 is an exemplary screen map of a user interface including examples of dynamic WHO, WHAT, WHERE, and WHEN strips.

FIG. 7 shows a screen map 700 or layout of a user interface window 701. The screen map 700 of the user interface is implemented by the service provider system 110 in conjunction with a browser and other applications and plugins of the user device 101. Screen resolutions may be dimensions that are proportional to screen width and resolution used depending on type of display associated with the client device 110. The display also may be fully scaleable. As such, the screen dimensions and resolution shown in the figures is merely for illustration purposes only.

The user interface window 701 is divided into three primary areas: an information bar 705, a graphic bar 707, and a user organizer 709. As shown in FIG. 7, the first portion includes an information bar 705 that may be used to present various information pertaining to a particular user, such as, for example, a user avatar 710, a user name 712, any high-level alerts 714 (e.g., tips or message "3 new events"), and a system logo 717. In addition, a custom web search input field 719 may be provided to allow a user into input information (e.g., key words) through use of an associated user input device. The input information is supplied to a search engine to perform a query and present a response in a separate browser window. Searches of the web may be performed using Google, Yahoo, AltaVista, or any other web-based search engine. However, the service provider system 110 may automatically narrow or focus the search based on the user's personal profile stored in the user DB. In addition, the system service provider 110 may use its own propriety search engine to perform a search. Two buttons are provided, an Internet search button 721 and a system search button 722, to select where the search is to be performed. The search features are described in further detail below.

A second area 707 includes a graphic bar that provides a space or window 724 for a user photo gallery to display user photos (e.g., stored in the user database). The graphic bar also may include a products and services branding area 726 to display advertising (i.e., glads) and logos for business clients 120 (e.g. a system sponsor). This area 707 also may be customized or used to promote a business for a sponsored user interface. The area may include identification of the business, such as a name, symbol, or logo. Selecting the business logo causes the user interface to open an additional browser to present the user with a website or other online content associated with the business. This area 707 of the user interface also may provide advertising content including coupons. The advertising display and glads are described in further detail below.

A third portion 709 of the user interface provides a user organizer that organizes a user's daily communications, contacts, appointments, content and other information in several key contexts to facilitate the user's access to and manipulation of the information. As shown in FIG. 7, the user organizer is divided into four general themes, contexts, or strips: a WHO strip 731, a WHAT strip 733, a WHERE strip 735, and a WHEN strip 737. Each strip provides data, content, and functionality to a user in manageable portions based on a general aspect, context, or theme. The WHO strip 731 provides content and functionality regarding a user's contacts including people and groups of people. The WHAT strip 733 provides content and functionality regarding a user's daily activities, communications, shopping, and to-do items, and other events of a user's daily life. The WHERE strip 735 provides information about locations and points of interest to a user, such as addresses, points of interest, information related to points of interest, and maps associated with those locations. The WHEN strip 737 provides access to scheduled activities, events, appointments, and any other time sensitive data associated with the user. Each of the strips also dynamically focuses content and information based on user interaction with the strips. The strips also are automated such that simple manipulation of item between and within the strips causes the system to provide certain functions and service automatically. Each of the strips, their functionality, and focusing are described in further detail below.

Figure 8:
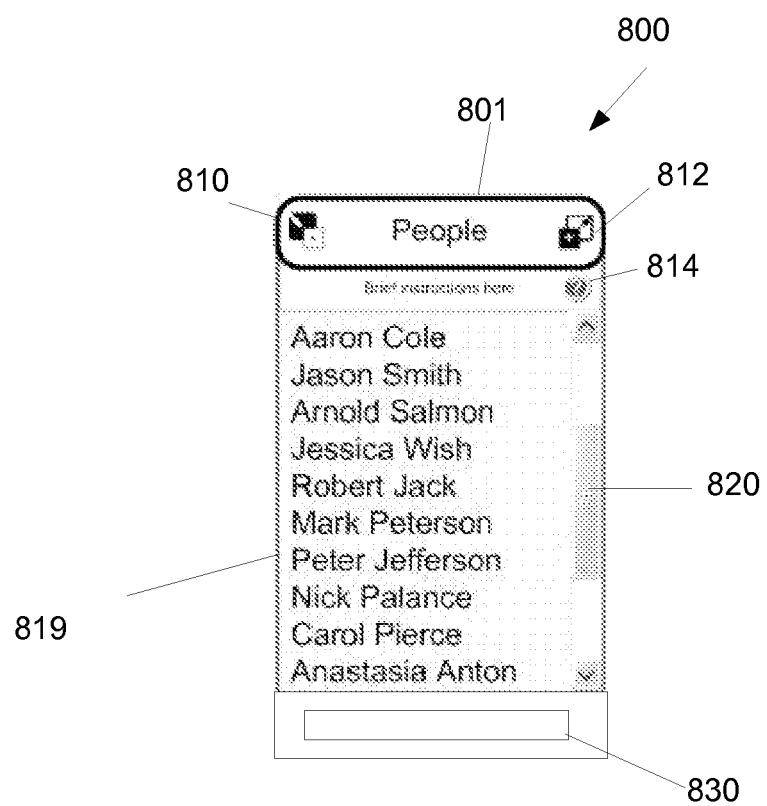
FIG. 8 is an example of a lozenge for use in a strip of the user interface.

The information and functionality provided by each strip are accessed through manipulation of one or more lozenges provided in each of the strips. FIG. 8 shows an example 800 of a lozenge. The lozenge 800 is an interactive, dynamic window that provides content and functionality to a user. Each lozenge allows a user to quickly arrange and display information and functionality within the theme or context of the strip. The lozenge may include one or more of the following: a title bar 801 including an expand icon 810 and a contract 812 icon, a information/item area 819, navigation aids (e.g., a scroll or slider bar) 820 and a search/add field 830. The area or window occupied by the lozenge 800 within a strip expands and/or contracts based on a user request or via automatic processes. Generally the lozenges may be presented as: small, medium, large, and extra large. In addition, the size of one lozenge may automatically and reciprocally affect the size of the one or more other lozenges within a strip based on user interaction with the strips.

A small lozenge generally occupies a minimal area of a strip, for example, less than 15% of the area of a strip and provides minimal information and functionality. For example, a small lozenge may include a title bar and some additional information, such as a minimal alert or counters. A medium lozenge provides a portion of the overall content associated with a lozenge focused generally, for example, on the most used or most needed content or functionality associated with the lozenge, such as alerts and/or counters. In one example, a medium lozenge occupies approximately up to half of a strip. A large lozenge may be considered full size providing multiple ways to view data while providing all the functionality associated with the lozenge. In one example, a large lozenge occupies a majority of the strip. Finally, an extra large lozenge provides additional space with an emphasis on editing data, adding/reordering items, and viewing of additional information provided by the lozenge. In one example, the extra large lozenge occupies a space larger than a strip, for example, the space of up to three large lozenges or additional strips. The individual lozenges are described below within the context of their strips.

At the bottom of a lozenge a data search/add field 820 (e.g., a text box) may be provided in which a user enters characters using user input device. As a user enters characters into the field, the system performs a character-by-character analysis to determined items featuring the letters the user is typing. The system displays in or next to the field any items that correspond with the characters. At any time the user may select one of the displayed items. If the user types in a character string that is not present in the database, and selects the items using a user input device (e.g., pressing ENTER), then the item is added to the database. The field may be used, for example, to add an item to the list or perform a search within the context of the lozenge.

The WHO strip 731 includes two lozenges: people 740 and groups 742. The WHAT strip 733 includes six lozenges: activities 744, to-do 748, shopping 750, buy (not shown), read 752, and send 753. The WHERE strip 735 includes two lozenges: locations 760 and maps 762. The WHEN strip 737 includes one lozenge: dynamic calendar 770. Expanding a lozenge causes a corresponding reduction in the size of one or more other lozenges within a strip, as explained in further detail below. Similarly, expanding a strip to accommodate an extra large lozenge, causes a correspond reduction in the size of one or more other strips. Any strips or lozenges that are shrunk may be done so in order of the oldest to the most recently used.

Figure 9:
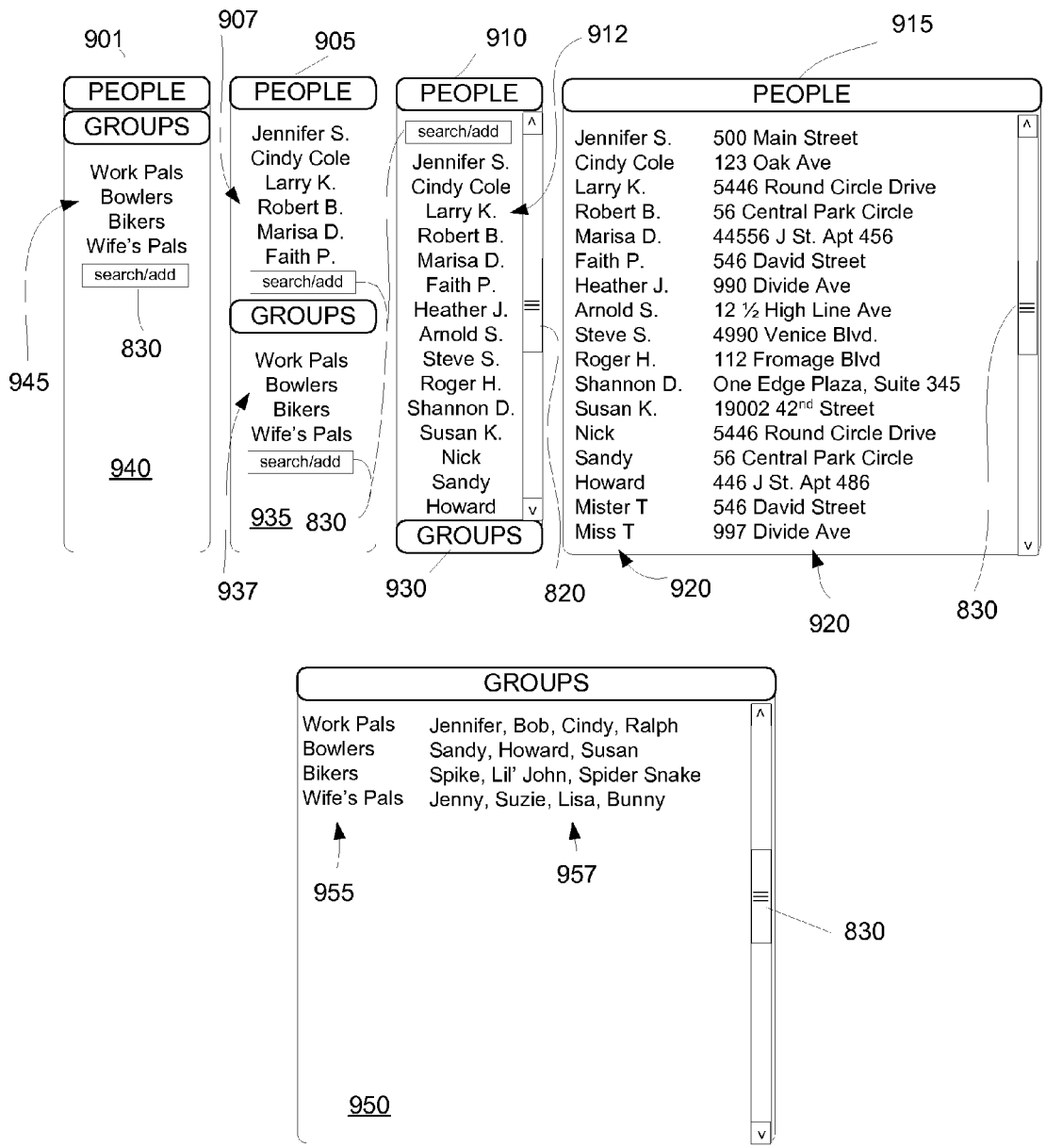
FIG. 9 is an exemplary illustration of the WHO strip.

FIG. 9 shows examples of the WHO strip 731 of the user interface which is used to create, maintain, and access a user's contact information. In FIG. 9 the reciprocal relationship between a small, a medium, and a large people and a small, a medium, and a large groups lozenge is shown.

The small people lozenge 901 includes a title bar "People."

The medium people lozenge 905 includes a list 907 of a subset of a user contacts. In one example, the medium lozenge includes a list of the most popular and/or the contacts most recently communicated with. The list of contacts may include a visual indicator and label, such as stars and the word popular (not shown). The list 907 may include up to ten contacts; however, other numbers of contacts may be provided. While connected to the service provider system 110, the web server 143 in conjunction with the applications server 144 monitors the user's interaction with the user interface to populate the list with the most relevant contacts of interest to user. The medium people lozenge 905 also includes a search/add data entry field 820. The search/add field 820 may be used to search for a contact within the user's contact database. As a user enters characters within the field, the system automatically provide a list of contacts (not shown) matching those letters typed by the user. The user may select any contact from the list at any time or continue adding characters. If a contact entered in the field is not in the database, the system asks the user if they wish to add the contact to the database.

The large people lozenge 910 includes a configurable list 912 of a user's contacts. A navigation aid 830 (e.g., a scroll bar or slider) may be provided for use in conjunction with a user input device to configure, manipulate, and/or sort the contacts displayed by the list 912. For example, the configurable contact list 912 may be sorted by: recently accessed contacts, a first name, a last name, those contacts with whom a user is currently communicating, those contacts with whom a user has planned events, appointments or activities on the calendar, those contacts for whom a user has extended an invitation, those contacts with whom a user owes a response to a message, a specific letter in a contact name, and those contacts in order of proximity to a location selected on or inputted to the "Where" strip. The desired sort option may be selected from a menu or corresponding input (e.g., a button or check box). If there are more names in a list than may be displayed within the area provided by the people lozenge, a navigation aid (e.g., a scroll bar, a slider bar, direction arrow keys, grab and move pointer, or a pointing device) may be used to navigate through or see the remaining portion of the list. Items within the list also may be rearranged by a user selecting a name with a user input device and dragging the name within the list. The large people lozenge 910 also includes a search/add field 820.

The extra large people lozenge 915 includes a full list 920 of all user contacts with a navigation aid 830 (e.g., scroll or slider bar) that may be sorted by: a contact first name and a contact last name. In addition, inputs (not shown) may be provided to jump to a specific letter of a contact's name in the list. A number of fields of data for each contact are also displayed. For example, fields for a contact address 921, a contact phone number, and a contact email address may be provided for each contact. Information in the displayed fields also may be edited. The extra large people lozenge 915 occupies roughly three times the size of a normal strip.

Four additional inputs (not shown) are provided to interact with the displayed lists of the extra large people lozenge 915: select, edit, add, and aggro. Using the "select" input or directly selecting a name from a list using a user input device (e.g., using a mouse to single click on any contact name) causes the name to be visually indicated (e.g., highlighted, bolded, outlined, etc.). In addition, selecting a name causes the other strips to focus on or present content associated with the selected contact, as explained in further detail below. Selecting the "edit" input or a name directly from a list using a user input device (e.g., by double-clicking on the name) allows the user to update the contact information. Selecting edit provides a pop-up area (not shown) with information fields populated with a selected contact's information that is stored in the contact DB. The user may edit any of the fields and save the edited contact information. Selecting the "add" input creates a pop-area including a number of blank data fields which may be populated with a new contact's information. Selecting the "aggro" input causes the contact aggregator to verify the contact information stored for the selected contact in the contact DB.

A number of symbols and indicators (not shown) may be used in association with the names listed in the people lozenge to provide additional information to a user. For example, a tiny email envelope next to a contact name may be used to indicate, at a glance, that a new message has been received from the contact. A tiny calendar/clock icon next to a contact name may be used to indicate a new calendar event has been established for the contact. A tiny clock next to a contact name may be used to indicate that the contact aggregator is in the process of aggregating this contact's information. Colors (e.g., red, blue, purple, or green) may be used to display the contact name of the list to indicate the type of contact if the contact has been indicated to be one of personal, work, friend, or family contact.

FIG. 9 also shows examples of a small, a medium, a large, and an extra large "groups" lozenge of the WHO strip 731. The groups lozenge allows the user to define and select groups in order to organize their communications with multiple contacts. A color (e.g., red, blue, or green) may be associated with each group name to indicate the type of group based on the types of contacts the group is composed of, such as, for example, personal, work, or family. A group name listed in black indicates a group of contacts from multiple groups. If there are more group names than space in the tab a scroll bar or slider may be provided to navigate the list.

The small groups lozenge 930 includes a title bar "Groups."

The medium lozenge 935 includes a list 937 of a subset of a user groups contacts. In one example, the medium groups lozenge 935 includes a list of the most popular and/or the groups most recently communicated with. The list 937 may include the names of the top ten groups; however, other numbers of groups may be provided. While connected to the service provider system 110, the web server 143 in conjunction with the applications server 144 monitors the user's interaction with the user interface to populate the list with the most relevant group names of interest to user. The medium groups lozenge 935 also includes a search/add field 820.

The large groups lozenge 940 includes a full list 945 with a navigation aid 830 (e.g., a scroll bar or slider) that may be sorted by: the most recently selected group, a group name, a groups with whom the user is currently communicating with, a group with items that are on the calendar, a group that has been invited to an event, a group size (e.g., number of members), a group's creation date, and an RSVP or a not RSVP group. Any person, group, or activity may be tagged by the user as an RSVP. This means that any activity that includes the RSVP person or RSVP group must have all contacts or groups of contacts tagged as RSVP agree to attend the activity before the service provider system 110 identifies the activity as booked. If a person, a group, or an activity is not so tagged, then the activity may be booked regardless of how many invitees agree to attend. The large groups lozenge 940 also includes a search/add field 820.

The extra large groups lozenge 950 includes a full list of all groups names 955 associated with the user and a navigation aid 830. For each group a list of contacts 957 in the group is provided. In addition, a number of fields associated with each group may be presented, such as, for example, a first name, a last name, an email address, an address (e.g., house number and street name) 958, a city, a state/province, a zip code/postal code, a country, a home land line phone number, a mobile phone number, a work land line phone number, a relationship to the user (e.g., friend, family, or business), and a RSVP flag (either yes or no). All fields may be selected and edited by the user. Five additional inputs (not shown) are provided on extra large groups lozenge 950: select, edit, create a group, add a person, and aggro. Using the "select" input or directly selecting a group name from the list using a user input device (e.g., using a mouse to single click on any group name) displays the names of all contacts within the group (e.g., highlighted, bolded, outlined, etc.). In addition, selecting a group name causes the other strips to focus on or present content associated with the selected group. Focusing is described in further detail below. Selecting the "edit" input or a group name directly from the list using a user input device (e.g., by double-clicking on the name) allows the user to edit the contacts listed in the group. Selecting the "create a group" input allows a user to create or define a group. Selecting the input "add a person" allows the user to add a new contact to an existing group. Selecting the "agro" input causes the contact aggregator to verify the contact information of the contacts listed in the group.

A user also may create a group using the add/search field 820. The user may type in a new group name in the field 820 using a user input device. The new group name is then displayed in the list of groups 937 or 945. The user may then drag and drop one or more names of contacts from the people lozenge to the group name in the groups lozenge to automatically add those people to their groups. Similarly, a user may automatically add a new contact to any existing group by dragging a name of a contact from the people lozenge to the group name in the groups lozenge.

In addition, the size of the people and groups lozenges have a reciprocal relationship with each other. For example, when the people lozenge is small, the groups lozenge is large. When either the people or groups lozenges are medium the other lozenge also is medium. When the group lozenge is small, the people lozenge is large. When either the people or groups lozenges are extra large, the lozenge occupies the entire WHO strip 731.

The WHAT strip 733 provides content and functionality regarding a user's daily communications and activities. The WHAT strip 733 helps the user manage and organize these communications and activities through use of five lozenges: activities, to-do, shopping, read, and send.

Figure 10:
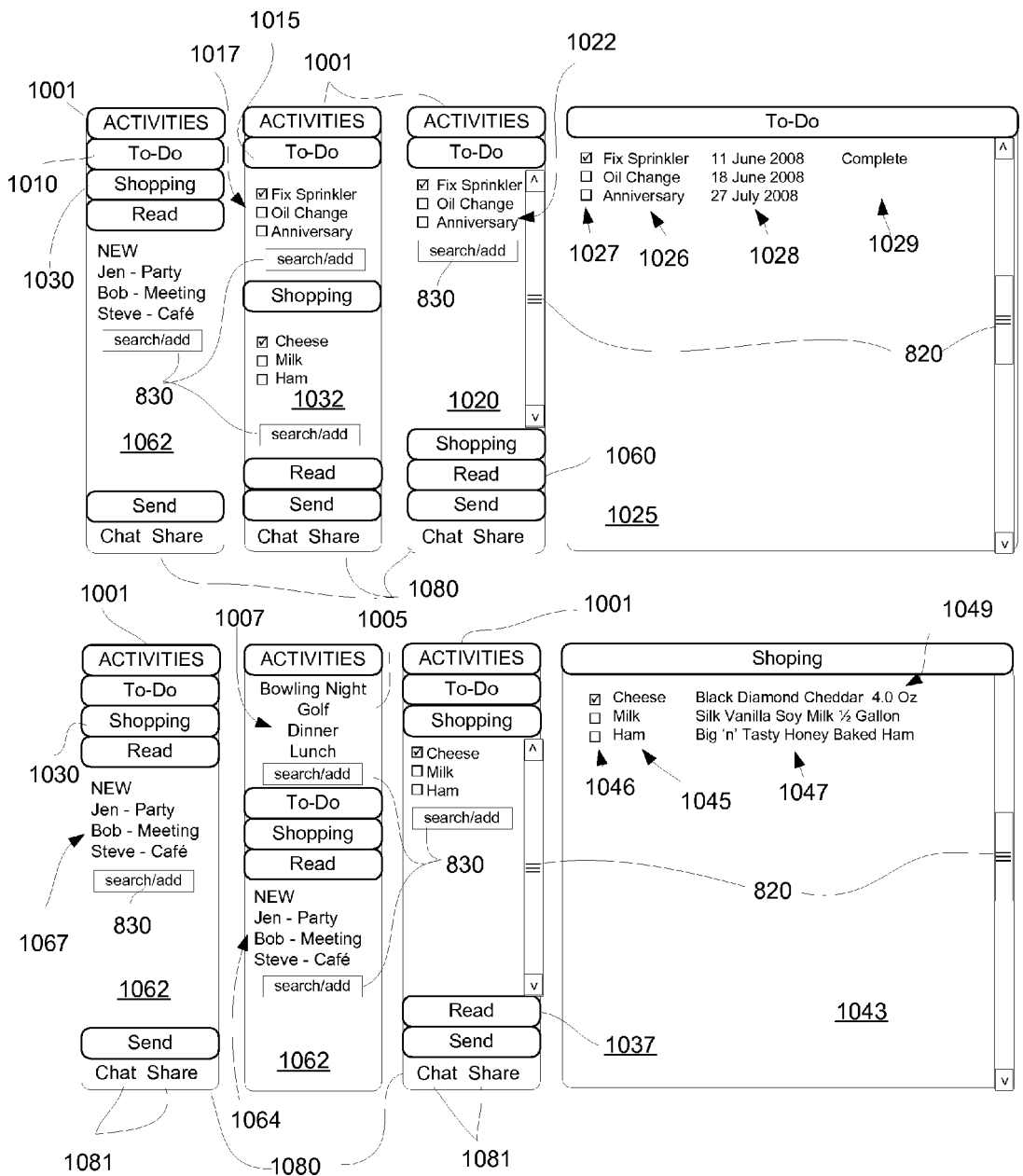
FIG. 10 and FIG. 11 are exemplary illustrations of the WHAT strip.

As shown in FIG. 10, the activities lozenge provides a list of activities that a user frequently engages in order to help a user plan events. The activities lozenge may be small or medium. The small activities lozenge 1001 just includes a title "Lozenge." The medium activities lozenge 1005 includes a list of activities 1007, for example, a top-ten list of activities. The top-ten list is automatically populated based on a combination of the most recently used user activities combined with activities that have been most frequently repeated. A search/add data 820 entry field also is provided. The data entry field 820 may be used to search through a list of a user's prior activities or add a new activity to the list. Adding a new activity causes a pop-up window to be shown with fields that the user may choose to fill to further define the activity.

In addition, the user interaction with the other lozenges affects the list of activities provided through focusing. For example, when a person or group's name is selected on the people or groups lozenge, the activities lozenge shows the top-ten activities that have been scheduled in the past with that person or group. When a location is selected from the locations lozenge, the activities lozenge is populated with up to ten activities that have most frequently occurred at or in the vicinity of the location. When a calendar date is selected, the activities lozenge is populated by the most common activities that occur on that date. For example, if a user selects Sunday morning, "Go to Church" might appear in the activities list. If the user selects the evening of February 14th, then "Valentines Day Dinner" may appear in activities list. If a user selects their own name from the people lozenge, then the activities lozenge is populated with the top ten activities attended by the user. A user may select an activity from the list 1007 with a user input device, and drag the activities onto the calendar lozenge to a particular day and/or time to create a calendar event for that activity, as explained in further detail below.

FIG. 10 also shows an example of a small, a large, and an extra large a To-Do lozenge. The To-Do lozenge helps keep of list of items that a user wants to complete and keep track or be reminded of.

The small To-Do lozenge 1010 just includes the title "To-Do." The medium To-Do lozenge 1015 includes a list of up to the ten oldest To-Do items 1017. Each To-Do item on the list 1017 may include a user selectable input to indicate completion of the item, such as a check or tick box. Using a user input device the user may select the input to cause a visual mark to appear in the box (e.g., a check mark or x) to indicate that an item has been completed. In addition, the marked item may be visually distinguished (e.g., highlighted or low lighted or grayed out) moved to the end of the list and marked as "done." A search/add data field 820 may be provided to search for a particular To-Do item from the list and to add a new item to the To-Do list.

The large To-Do lozenge 1020 includes a complete list 1022 of all a user's To-Do items. In addition, a navigation aid 830 is provided to navigate or scroll through the entire list if there are more items on the list than may be displayed in the space provided. A search/add data field 820 also is provided.

The To-Do items may have associated with them information fields about chores and/or tasks that a user wishes to remember and complete, such as a name field, a description field, a start date/and or time field, a reminder field, and an indication of completion of the item (e.g., "Done" or a completion date and/or time). When open to the large or extra large lozenge, To-Do items may be created by the user directly typing a new item in the list. The To-Do list items may be re-ordered, edited, checked off by the user. Items may be reordered simply by selecting an item and dragging it to another position on the list. Each item may include a user selectable input to indicate completion of the item, such as a check box. Using a user input device the user may select the input to cause an indication to appear in the box (e.g., a check mark or x) to indicate that an items has be completed. In addition, the checked item may be visually distinguished (e.g., highlighted or low lighted or grayed out), moved to the end of the list and marked as "done."

The extra large To-Do lozenge 1025 also includes a complete list 1026 of all To-Do items and the various information fields, such as, a completion indicator 1027, a date added 1028, a date completed 1029, and a reminder date (not shown). The items may be re-ordered, edited, checked off. The list may be sorted by: due date, reminder date, when added, letter or alphabetically, and done and/or completion date.

FIG. 10 also shows examples of the shopping lozenge. The shopping lozenge may be used to keep track of all items to be purchased by a user. FIG. 10 shows a small, a medium, a large, and an extra large shopping lozenge. The small shopping lozenge 1030 just includes the title "Shopping." The medium shopping lozenge 1032 includes a list 1034 of up to ten oldest shopping or highest priority shopping items. Each shopping item on the list 1034 may include a user selectable input (e.g., a check or tick box) to indicate the item has been purchased. Using a user input device the user may select the input to cause a visual mark to appear in the box (e.g., a check mark or x) to indicate that an item has been purchased. In addition, the marked item may be visually distinguished (e.g., highlighted or low lighted or grayed out) moved to the end of the list and/or removed. A search/add data field 820 may be provided to search for a particular shopping item from the list and to add a new item to the list.

The large shopping lozenge 1040 includes a complete list 1042 of all a user's shopping items. The complete shopping list 1042 may be re-ordered, edited, checked off. Items may be reordered simply by selecting an item and dragging it to another position on the list. Each item may include a user selectable input to indicate purchase of an item, such as a check box. Using a user input device the user may select the input to cause an indication to appear in the box (e.g., a check mark or x) to indicate that an items has been purchased. Alternatively, purchased items may be removed from the list. In addition, a navigation aid 830 is provided to navigate or scroll through the entire list if there are more items on the list than may be displayed in the space provided. A search/add data field 820 also is provided to add items or items may be added by directly typing them in the list.

The extra large shopping lozenge 1043 also includes a complete list 1045 of all shopping items in addition to various information fields, such as, a user selectable input to indicate purchase of an item 1046, a description 1047, a date added, a date purchased, and an amount 1049. Shopping items may be created and added to the shopping list by the user directly typing a new item in the list. The items may be re-ordered, edited, checked off. The list may be sorted by: description, date purchased, amount, date added, and by letter or alphabetically.

FIG. 10 also shows an example of a small, a medium, a large, and an extra large read lozenge. The read lozenge also a user to receive and manipulate various communications directed to the user.

The small read lozenge 1060 just includes the title "Read."

The medium read lozenge 1062 includes a list of identifiers 1064 for the most recent, unopened, new messages and/or threads that have been received by the service provider system 110 directed to the user. The list may include an indicator of the contact from whom the message was sent and a subject indication.

The large read lozenge 1065 includes a complete list 1067 of identifiers for all new messages and/or threads stored by the service provider system 110 which have not yet been responded to by the user. The identifiers may include a name of the contact sending the message and a topic of the thread. In addition, an indication (not shown) of the number of new messages associated with the thread or topic may be provided. If there are more message indicators than may be displayed in area of the lozenge a navigation aid 830 (e.g., a scroll bar, a slider bar, direction arrow keys, grab and move pointer, or a pointing device) may be used to navigate through or see the remaining portion of the list. In addition, search/add field 820 may be provided to search for a message.

Figure 11:
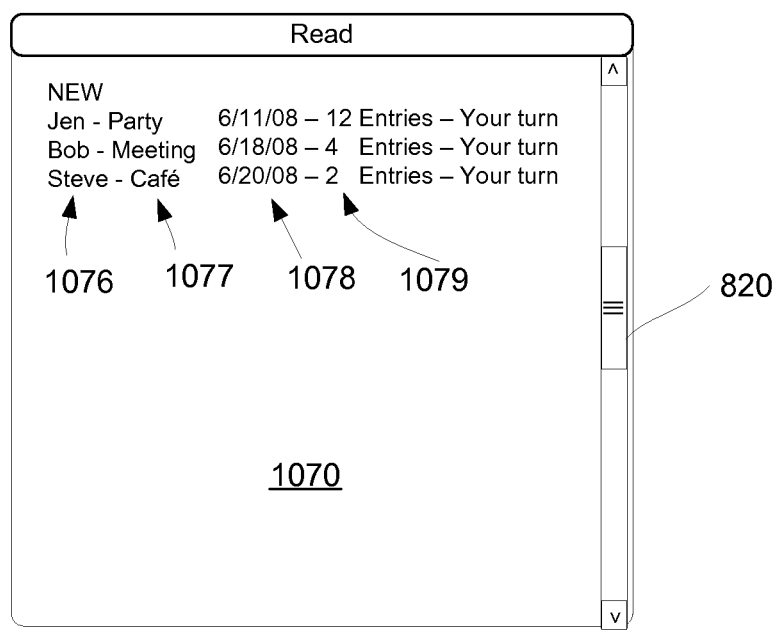

FIG. 11 shows and example of the extra large read lozenge 1070. The extra large read lozenge 1070 includes a complete list 1075 of identifiers messages and/or threads stored by the service provider system 110 in addition to various information fields, such as, a contact sending the message 1076, a topic of the message 1077, a date the message was received 1078, a number of entries in the message thread 1079, and who is to respond to the message 1080. Next to each identifier (not shown) an indication of how long (e.g., minutes, hours, days) the sender of a message has been waiting for a response. The user may select any identifier of any thread to read, edit responses, add responses, and perform other actions. Five input filtering options selections are provided for these threads: current subjects, by person, by date, by lateness, and archived. The current subjects input may be selected to display indicators of threads that are current. Current may be defined as a period of time set by the user's preferences and/or may include indicators of threads that have not been responded too. The by person input sorts the list of thread indicators alphabetically by contact name. The by date input sorts the list of threads indicators by date listing the newest threads first. The by lateness input sorts the list of thread indicators by respondent lateness. The archived input opens a complete list of indicators of archived threads that have previously been closed by the user.

Figure 12:
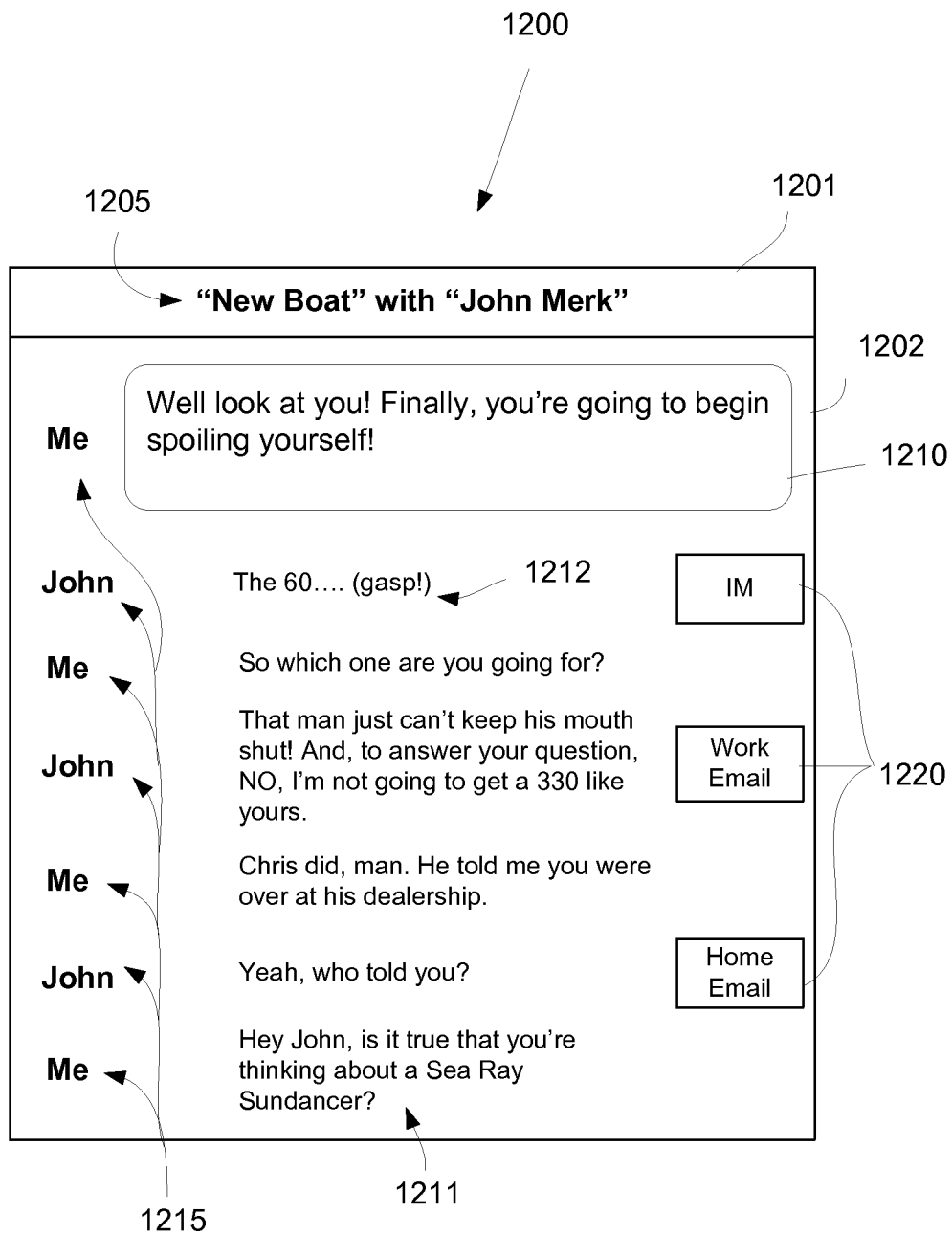
FIG. 12 is an exemplary illustration of a message pop-up window.

As shown in FIG. 12, selecting any thread or message indicator from either the list with a user input device (e.g., using a cursor or pointer or highlighted area controlled by a mouse, keypad/board, pointing device, touch-screen/pad to select the thread indicator) opens the thread in a popup window 1200 for viewing by the user. The window 1200 may include an informational area 1201 and a message area 1202. The informational area 1201 includes the type of message (e.g., personal, business, group) (not shown), the message thread identifier 1205, a start time of the message thread (not shown), and a time of last response (not shown). The message area 1202 includes an area 1210 (e.g., a rounded box) at the top of the message thread 1211 where the user may enter or type their response to the latest received message 1212. Below the box is the text of each piece of the message thread 1211 and an indicator 1215 of whom the piece text of the thread was generated by. A message type/link icon 1220 may be provided in the window next to each received text which notifies the user which account or media type (e.g., POP3 work, POP3 home, virtual fax, IM, SMS, site specific email, etc.) that was used to send the text associated with the message. Selecting the icon 1220 with a user input device opens another window (not shown) to display the original message in its full original format.

FIG. 10 also shows an example of the send lozenge. The send lozenge is used to send messages to contacts. The send lozenge may be locked at the end of the WHAT strip 733 and is provided in only as a small send lozenge 1080. In one example, the small send lozenge 1080 may be slightly larger than other small lozenges to accommodate one or more inputs 1081. In one example, the inputs are share, chat, and organize (not shown).

To send a message the user simply selects a name of a contact from the people lozenge, or the name of a group from the group lozenge of the WHO strip 731 using a user input device. After selecting the name, the user drags the name from the list of the WHO strip 731 onto any one of the buttons: share, chat, and organize. Alternatively, the user may select one of the inputs 1081 with a user input device. Selecting one of the send inputs 1081 causes the service provider system 110 to create a pop-up window for display as a screen on the user device. The screen (not shown) includes the message "Who shall I send the message to?" The screen also includes a window in which the user may type the contact or group name or select a name from a drop down menu.

The share button may be used to share pictures, videos, web sites, computer documents (e.g., PDF, MS Word, etc.), FYI, change of address, newsletter, and a vacation notification) and other content with contacts and groups. The chat button may be used for personal talk, group talk, polls, and event creation. The organize button may be used to create an event (one-time or repeating), such as, an appointment, a meeting, a party/group event; an RSVP party (e.g., a wedding or a birthday), a potluck or any other gathering of contacts. Each input causes a popup window to request information typically specific to that type of communication. If the name of the group or contact is dragged to the button, the popup window is automatically populated with the contact information for the type of message. Once the user enters the requested information, the message is sent by the service provider system 110 using the selected format and/or protocol for the type of message. In addition, the threader adds the message to the message archive.

Figure 13:
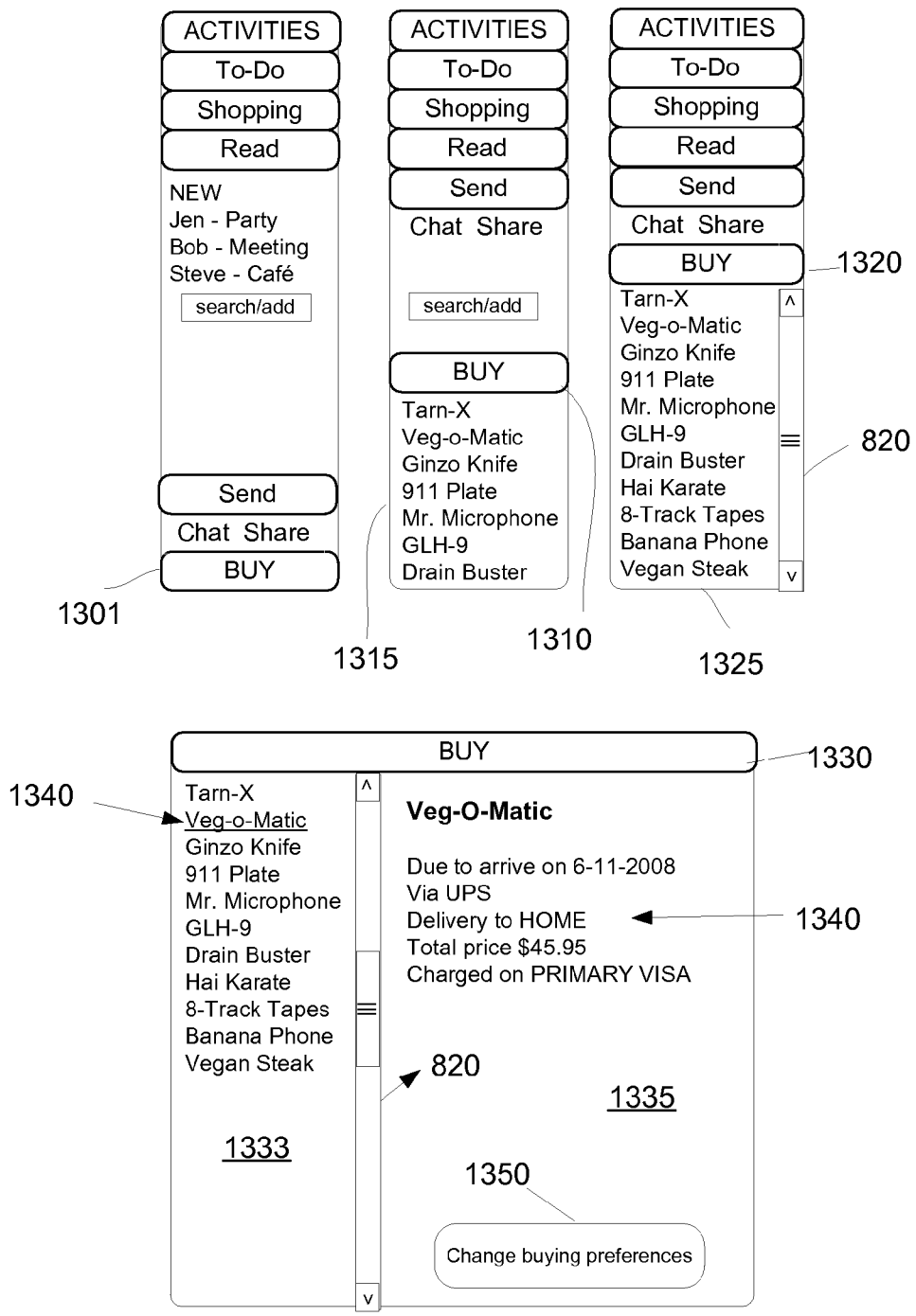
FIG. 13 is an exemplary illustration of the WHAT strip.

The WHAT strip 733 also may include a buy lozenge as shown in FIG. 13. The buy lozenge may be small, medium, large or extra large. The WHAT strip 733 also may include a buy lozenge. FIG. 13 shows examples of the small, medium, large or extra large buy lozenge. The small buy lozenge 1301 just includes the title "buy." The user can drag any item to the buy lozenge to instruct the service provider system 110 to purchase the item. The medium buy lozenge 1310 includes a list 1315 of the top five items that the system is currently trying to buy for a user. The large buy lozenge 1320 includes a complete list 1325 of all items being purchased by the system. The extra large buy lozenge 1330 provides a complete list 1333 of all items being purchased by the system. If there are more items that can be displayed, a navigation aid 820 is provided. A description area 1335 provides information 1340 about a selected item 1345 from the list. The information may include a name, delivery date, delivery location, total price, account payment was made by. In addition, a change buying preferences button 1350 is provided to access various fields that store user preferences allowing a user to specify price ranges for products, payment information, delivery addresses and other instructions pertinent to making a purchase.

The personal profile allows a user to specify specific items and types of items the system service provider 110 may automatically buy for the user. The user may specify what price ranges (e.g., a maximum, a minimum or both) that are okay for the system service provider to user in determining whether to make a purchase. The user profile buy information may include payment information, such as credit card, debit card, paypal, online banking information, a single purchase spending limit, a monthly purchase spending limit, and a card balance limit. The user also may specify shipping preferences, such as carrier preference (e.g., UPS, Fed-X, USPS, etc.), transit preference (e.g., overnight, 2 day, "slow and cheap"), shipping address, special shipping instructions (e.g., doorbell inoperative), and instant delivery preferences.

The buy lozenge may be withheld or not appear on the WHAT strip 733 until a user provides their user buy information. Once set up, the user can drag any item to the buy lozenge to instruct the system service provider to purchase item. For example, a user has a To-Do item that identifies "Replace flapper valve." The user drags the item to the BUY button. The service provider system 110 determines the best price available online for a toilet flapper valve, orders it using the provided customer buy information, and places an item or event on the user's calendar with the expected arrival date.

In another example, the user has an item, or items on the shopping list that they are unable to find time to buy, or would prefer not go shopping for the item at this time. The user drags the entire shopping list, or individual items to the BUY button, and the service provider system then buys those items for the user. In another example, a user has a calendar appointment, such as BBQ. In this example the user drags that item to BUY causing the service provider system 110 to look up a user profile and determine a user's identified foods associated with an event, such as a BBQ. The service provider system 110 then purchases the user's identified BBQ foods. Similarly, a calendar appointment "ski trip" causes the service provider system 110 to book transportation (flight from local air port to destination), lodging (e.g., hotel for nights specified by trip event in calendar), and activities (e.g., advance purchase of lift tickets for closest ski resort). In yet another example, the user drags a contact name onto the BUY button. The service provider system 110 identifies any dates, events, or activities associated with the contact (e.g., birthday, Christmas, retirement party). The service provider system 110 may purchase a gift for the specified contact. If the contact is a user of the service provider system 110, the system may use receiver's profile in determining a suitable gift.

Figure 14:
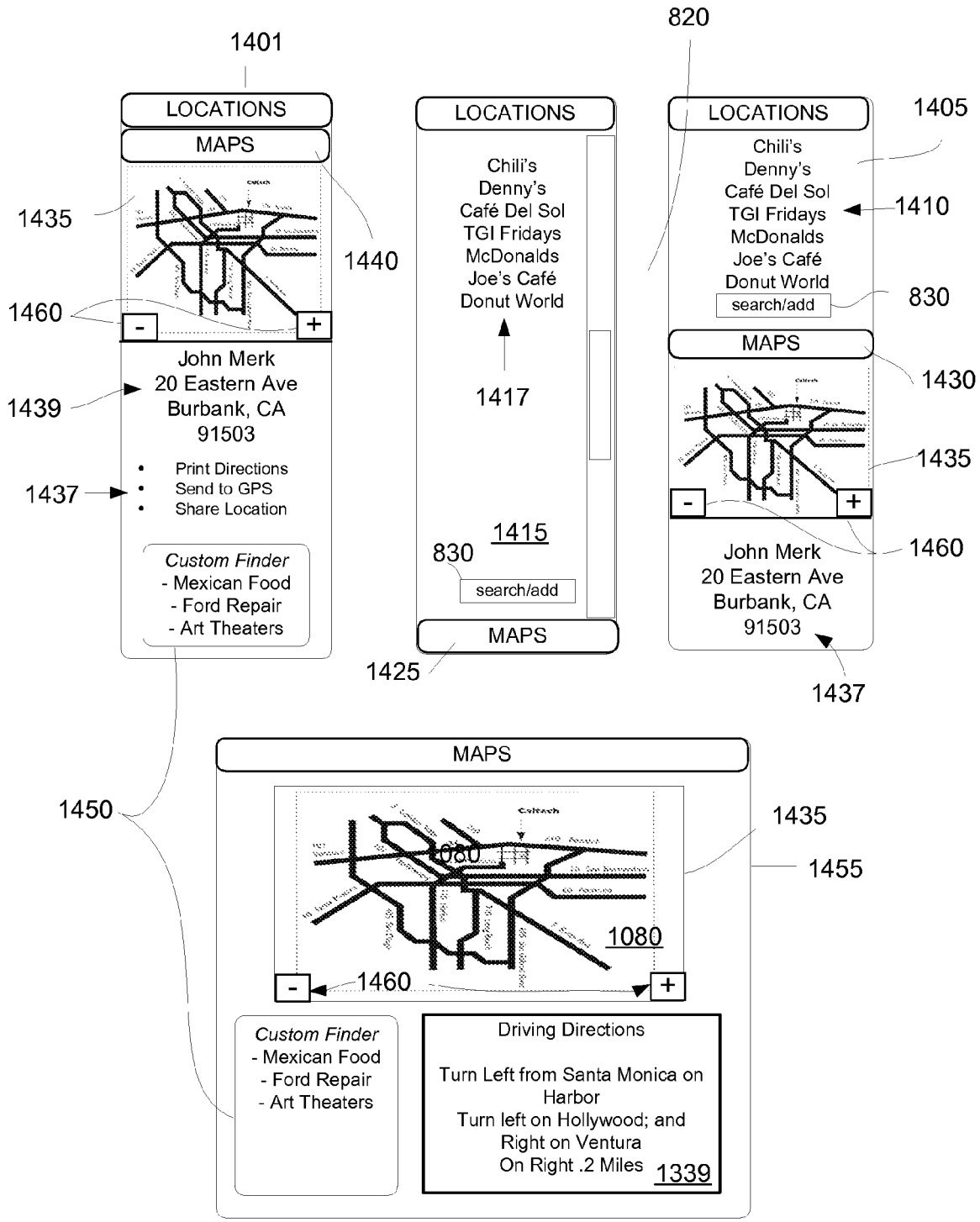
FIG. 14 is an exemplary illustration of the WHERE strip.

The WHERE strip 735 provides information above a user's favorite places (e.g., restaurants), locations, destinations, addresses, and other information such as maps and navigation aids. The user may look at or create instant maps to link any locations together and/or receive point-to-point directions. The WHERE strip 735 includes two lozenges: maps and location. FIG. 14 shows examples of small, medium, large and extra large maps and locations lozenges.

The locations lozenge includes locations of interest to a user. The small locations lozenge 1401 just includes a title "locations." The medium locations lozenge 1405 includes a short locations list 1410 of up to ten locations that may be interest to a user at any particular moment. Examples of locations: may be restaurants, businesses the user frequents (stores, malls, markets), contact's address, institutions frequented by the user (schools, DMV, church, parks). In particular, the system service provider 110 focus the locations provided in the list 1410 based on the user's interaction with the other lozenges of the user interface. For example, when the user selects a contact from the people lozenge, the list 1410 is populated with the "Top Ten" locations associated with that person. When a user selects a group from the group lozenge, the list is populated with the "Top Ten" locations associated with that group. When an activity from the activities lozenge is selected, the list 1410 is populated with the "Top Ten" locations associated with that activity. When any time and date in the calendar is selected, the list 1410 is populated with the "Top Ten" locations associated with that day at that time. The medium locations lozenge 1401 also includes a search/add data entry field 820. The search/add field 820 may be used to search for a location within the user's database of locations associated with the user. As a user enters characters within the field, the system automatically provide a list of locations (not shown) matching those letters typed by the user. The user may select any location from the list at any time or continue adding characters. If a location entered in the field 820 is not in the database, the service provider system 110 asks the user if they wish to add the location to the database. If so, the system saves the location in a database of locations associated with the user.

The large location lozenge 1415 includes a complete list of user locations 1417. If there are more locations than may be displayed in area provided by the lozenge, a navigation aid 830 (e.g., a scroll bar, a slider bar, direction arrow keys, grab and move pointer, or a pointing device) may be used to navigate through or see the remaining portion of the list. In addition, search/add field 820 may be provided to search for or add a location.

FIG. 14 also shows the maps lozenge. The maps lozenge provides an easy to use interface to allow a user to search for and find information about a location.

The small maps lozenge 1425 just includes a title "locations." The medium maps lozenge 1430 includes small map window 1435 for a selected location. An address 1437 for the location also may be displayed along with several inputs (not shown), such as print directions, send to mobile device, and share location.

The large maps lozenge 1440 also includes a map window 1435, a location address area 1437, user inputs 1439, and a custom finder 1450. The extra large maps lozenge 1455 has the same functionality as the large map lozenge but includes a larger map window 1435 and a driving directions window.

The map window 1435 shows a map of a location. The maps lozenge location is focused based on a person selected from the people lozenge or an activity selected from the activities lozenge, or as a result of selection a location or using the input field 820 to look up an address on the locations lozenge. The map displayed by the map window 1435 may be scalable to zoom in and out from a birds-eye-view using a user input device. For example, user inputs (not shown) neighborhood, city, county, state, and region may be provided to adjust the area displayed by the map, a slider bar may be selected to zoom in and out, or buttons 1460 may be selected to increase or decrease the scale of the map. In addition, the user input device may be used to control the zoom feature (e.g., a scroll wheel provided on a mouse). The map may include an indicator of the location within the context of the map.

Using a screen position indicator (e.g., a cursor or a pointer) in conjunction with a user input device (e.g., a key pad/board/buttons or a mouse) or using input directly from a user input device (e.g., a stylus or finger touching a touch screen) the user may select a point on the map. Maintaining selection on the map, the user may manipulate the position indicator or stylus in along one or two axis to draw a box or rectangle on the map. After drawing the box, the system automatically populates the area outlined by the box with information and/or indicators of all contacts and/or events that have addresses stored by the system databases that correspond to the location on the map within the user drawn box. Position of a cursor or pointer on the indicators causes a pop address (not shown) to appear associated with the indicator.

The maps lozenge includes several user selectable inputs 1537: directions to this location, find near this location, and transfer data to GPS/Smartphone. Selecting directions to this location provides directions to the selected location from a current location of the user (as determined from the user database or GPS data provided by the user device 101). Additionally, the user may provide a start location to manually configure a desired route.

The find near this location inputs include a dynamic list of a number of inputs that are most likely to be desired by a user viewing the location information. The service provider system may determine the dynamic list based on data stored in the user profile (e.g., favorites and dislikes provided by the user) and/or empirical information of data found most useful by users. For example, the inputs fuel stations, restaurants, and WIFI hotspots may be selected. Selecting any one of the inputs causes a visual indicator to appear on the map of the locations associated with the selected input. Placing a cursor, a pointer, or other user controllable selection mark over the indicator causes a small popup to display in association with the indicator giving more details and a dynamic hyperlink to a webpage for the entity represented by the indicator. In addition, selecting the indicator allows the user to obtain directions to the address associated with the displayed entity.

The transfer data to GPS/SMART phone input allows a user to transfer information, such as directions or files stored by the system service provider 110 to a user's mobile device. As a result, the user may access the directions or files using the mobile device.

The custom map finder 1450 provides a window that includes a number of inputs 1466 that may be selected by the user to populate the map with information. The service provider system 110 automatically populates the list with inputs based on the user's profile and interaction with the system. The list shown in the example of FIG. 14 includes inputs for Mexican food, pizza, Ford parts, and Art Theatres. Selection of in input, for example, fuel stations, causes the map to display indicators for fuel stations within the displayed area of the map window. The list of inputs is dynamic and is automatically populated at any particular time by the system to display those inputs to be of most use to a user. For example, the system may use time of day (e.g., lunch time or diner time) to display inputs for food choices based on the user profile stored in the system DB. Other inputs may be chosen based on information provided by the user questionnaire and user profile stored in the database, for example, indicated interests and hobbies of the user. The system may also search a user's upcoming events to populate the list with inputs. For example, if a task on the To-Do list includes "Get oil changed for Car" the dynamic list may be populated with the input service stations. If the user has an event scheduled, the list may provide an input "hotels" to suggest places to stay based on the event location.

The search/add window 820 may be provided to allow a user to manually enter in a location, name, contact, or business using a user input device. The input is provided to the system (e.g., by selecting an enter button or selecting an icon such as a magnifying glass). The system performs a search based on the input information and displays a result. The user selects an item from the list. The address is then displayed as the location and the map is automatically adjusted to display the location based on the selection.

The WHEN strip 737 keeps track of time sensitive or related information for the user. The WHEN strip 737 includes a single lozenge: a calendar lozenge. The calendar lozenge displays information for a user including indicators, identifiers, and data for all activities, to-do items, appointments, and other data items having a time based element that the system 110 tracks for the user to allow a user to manage and organize their daily events. The size of the days and weeks dynamical adjust based on user interaction with the calendar lozenge, as explained in further detail below. The calendar lozenge may be large and extra large. FIG. 15 shows an example of the large calendar lozenge 1501. The large calendar lozenge 1501 provides an agenda area 1510 and a mini calendar 1515. The agenda area 1510 shows a list of the user's next ten events. The mini calendar is a smaller calendar that shows busy and free times but no details. The large calendar is two columns wide.

Figure 16:
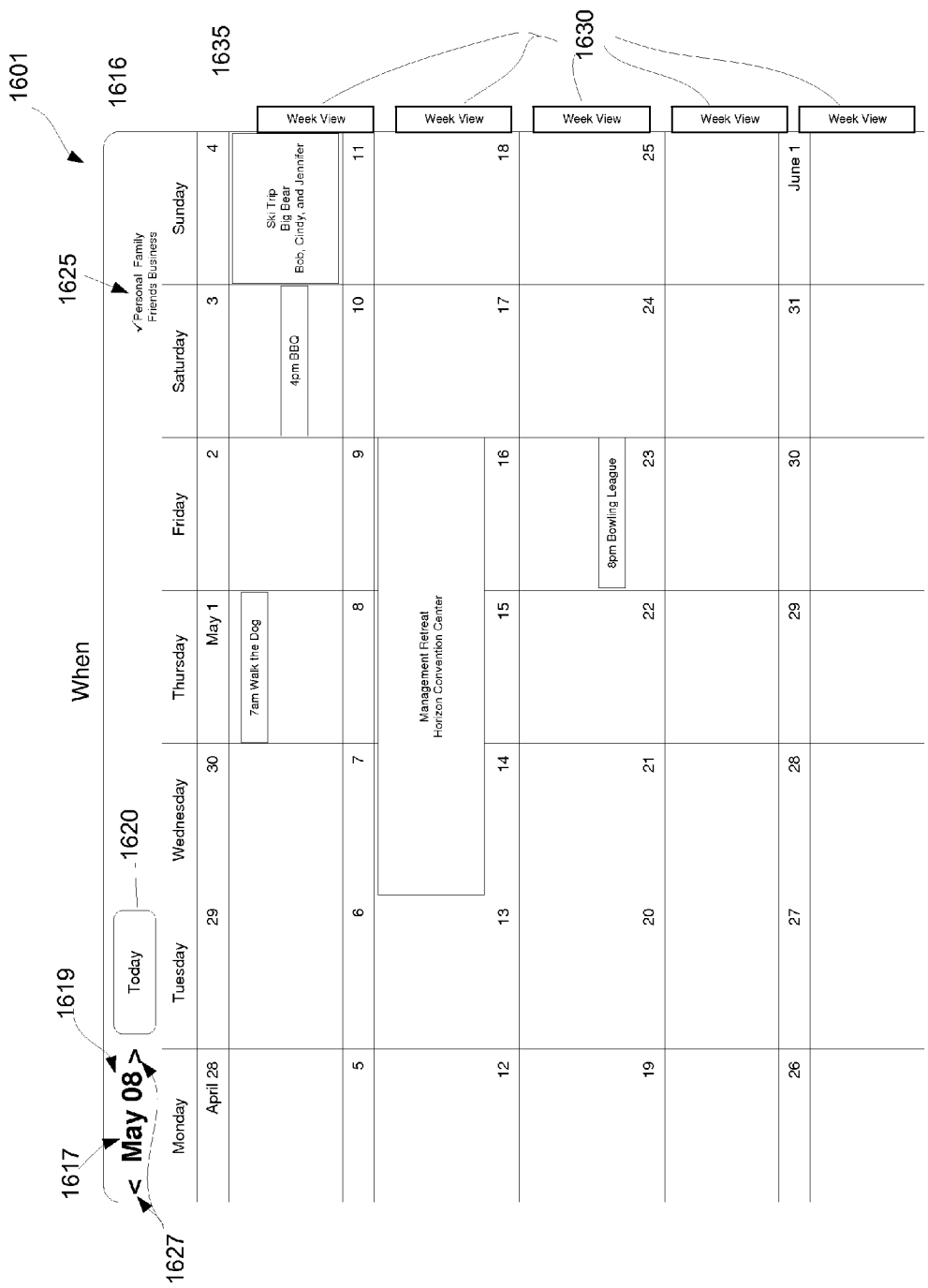
FIG. 16 is an exemplary illustration of the WHEN strip.

FIG. 16 shows the extra large calendar lozenge 1601. The extra large calendar lozenge 1501 is approximately three columns wide. The extra large calendar lozenge 1601 includes a calendar indication days of the week (e.g., Sunday-Saturday) and days of the month (e.g., 1-28, 1-29, 1-30, and 1-31). The calendar also includes an information bar 1615. The information bar 1615 includes an indicator of the month 1617, the year 1619, a today button 1620, and inputs 1625 personal, family, friends, and business to control display of items within the calendar to present events associated with a selected input. The month indicator 1617 displays the month (e.g., May) currently displayed by the calendar. The month may be changed by selecting the arrow inputs 1627 to either side of the month indicator 1617 to move to the next or previous month from the month displayed. The year indicator may be selected to change the year displayed. Additional inputs week view 1630 may be used to adjust the size of any week displayed, as described below. One or more the inputs 1625 may be selected at anytime to toggle the display of events associated with the selected event category (e.g., personal, family, friends, and business). For example, selecting personal and family causes the calendar to display user events of type personal and family. Unselecting an input removes those corresponding events. In this example, unselecting family causes all events of family type to be removed leaving only personal events displayed.

Within each day displayed on the calendar are indicators for any calendar events stored by the system associated with that date for a user. As shown in FIG. 16, the calendar is focused on personal calendar events of the user. The calendar events may include To-do items or reminders (e.g., 7 am May 1$^{st}$ "walk the dog"), shopping items (not shown), activities (e.g., 8 pm May 16$^{th}$ "Bowling League" and "Ski Trip"), and appointments, seminars, engagement, and meetings (e.g., 4 PM may 3$^{rd}$ "BBQ" and "Management Retreat"), and coupons and/or advertisements from the glad bar (not shown).

The user may create an event by selecting an item from any lozenge with a user input device and dragging the item from the originating lozenge to a date and/or time within the calendar lozenge. For example, a user can drag a name from the people or the group lozenge, an activity from the activities lozenge, a to-do item form the to-do lozenge, an email from the read lozenge, a shopping item from the shopping lozenge, and address from the maps lozenge, a location from the locations lozenge, to a calendar date to create an event. For example, the user may select contacts "Bob", "Cindy", and "Jennifer" from the people lozenge, "Ski Trip" from the activities lozenge, and "Big Bear" from the locations lozenge, and drags them all to the Sunday May 4$^{th}$ to create a ski trip calendar event 1635. A calendar event popup window with data fields is then presented to the user, as shown in FIG. 17.

Figure 17:
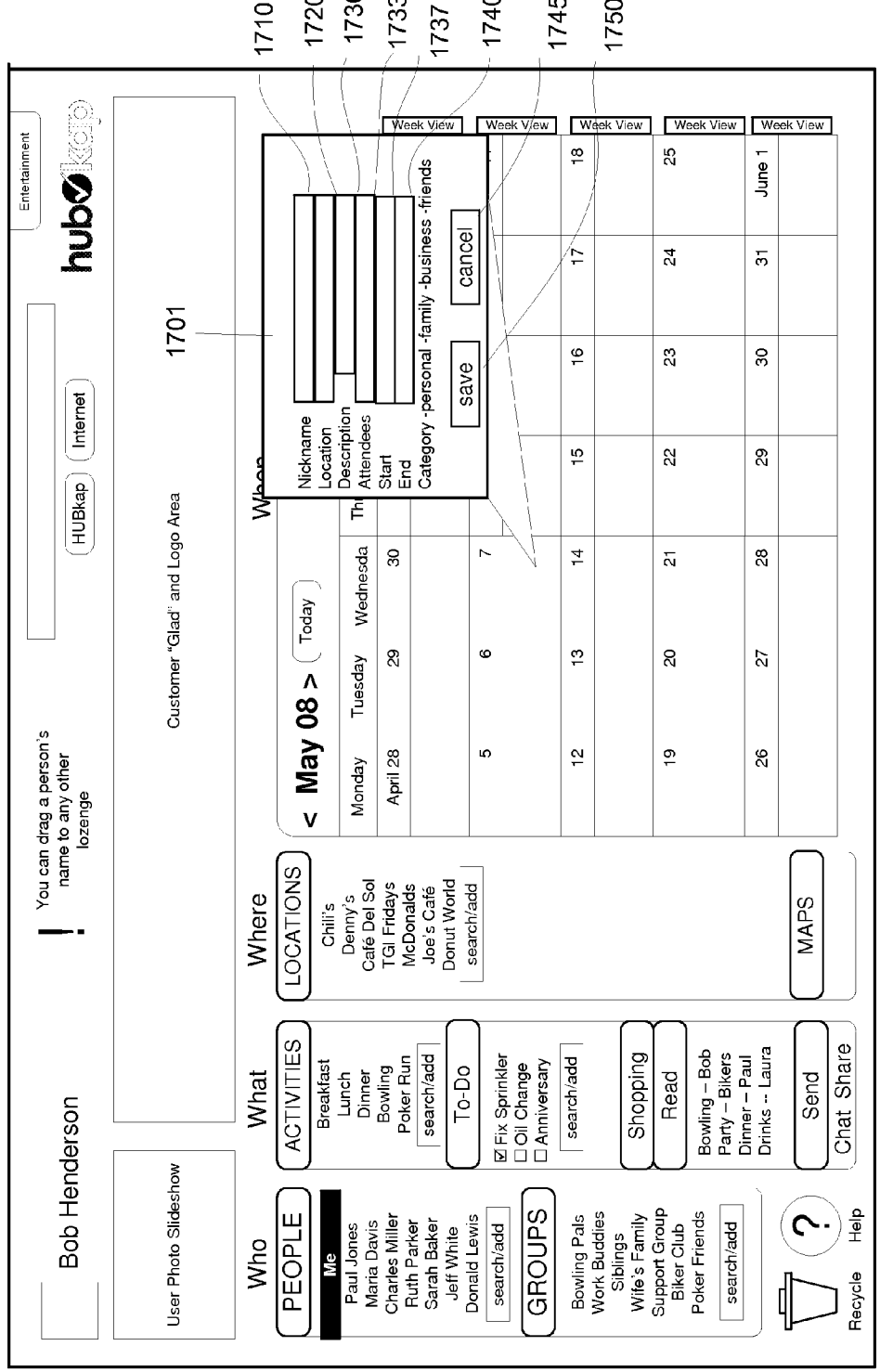
FIG. 17 is an exemplary illustration of the user interface including an event popup window.

FIG. 17 shows a user interface with the event popup window 1601. The window 1601 includes a number of data entry fields that are automatically populated with information corresponding to the items dragged onto the date (e.g., the people, the activity, and the location in this example). For example, the window 1701 may include the data entry fields nickname 1710, location 1720, description 1730, attendees 1733, start 1735, end 1737, and category 1740 (e.g., personal, family, friends, and business). Information missing from the data entry fields may then be supplied by the user. Once the information is supplied, the user may select the save button 1745 to stored information in the user database for the event and close the popup window. A cancel button 1750 may be used close the window and cancel the event. A calendar event also may be created by selecting a date and/or time directly from the calendar using a user input device causing the event popup window 1701 to be presented in which the user may enter information in any pertinent field and/or drag items from other lozenges onto the popup window.

A calendar event may be given a nickname (e.g., "Ski Trip) as the identifier displayed in the calendar for easy reading and/or identification by a user. The item name field may be used to automatically build a nickname. For example, if the nickname is left blank the system automatically picks the name of a lozenge item dragged to create the event. For example, if ski trip is dragged for the activity lozenge then the event nickname may default to ski trip. The nickname may be edited by the user to override any automatically generated nickname.

In another example, items directly dragged to a calendar date may automatically create an event. If a lozenge item is dragged to any date on the calendar in the month view, an event is automatically created at for noon on the that date with whatever content is associated with the lozenge. For example, if Bill is dragged to June 1, an event nickname Bill is provided for a 1 hour meeting with Bill at noon on June 1$^{st}$. A message is sent to invite Bill. The user may select the item on the calendar to access the event and to edit or provide further details. If a lozenge item is dragged to the expanded week view or day view, then the event is scheduled for the hour time slot the item is dragged to on the calendar as a default. The hour slot is also visual highlighted or shaded to indicate the planed time of the meeting. The user may then adjust the timing of the event using a pointing user input device to select the a border or portion of the highlighted region to expand or contract the highlighted area to increase or decrease, respectively, the time scheduled for the event.

The service provider system stores the calendar event information in the user database. The database has a number of associated fields, such as a general type (e.g., appointment, activity, entertainment, travel, and meeting). In addition, the fields also provide for time and date, start and end, attendees, invitees, a location, items needed, event category type (e.g., personal, friends, family, and business), among others. Any information associated with a lozenge that is dragged to create the event is populated in the fields. This information may be changed, deleted or supplemented by the user. In addition, the fields also may be customized for information solicited based on the type of event (e.g., a particular activity, such as "BBQ" may include additional information like catering, potluck, bring an item). The information requested by the fields may be filled in by entering information in the field using a user input device. In addition, further items may be dragged from lozenges to the popup window to continue to fill out the event information. For example, additional names may be dragged from the people lozenge, a location from the location lozenge, a shopping list from the shopping lozenge. In addition to the nickname, a descriptor, a description/notes, and an advertisement or coupon from the graphic/advertising bar may be provided.

Once the information fields are filled in and provided to the system, an event may be automatically organized by the system as described in below.

All items shown in the calendar are color coded based on an event type, such as personal, family, business, and friends. In addition, inputs 1625 are provided to filter information displayed in the calendar. For example, inputs 1625 personal, business, family, friends may be provided to filter or overlay display of calendar items of the type selected or a combination thereof. One, several, or all of the inputs 1625 may be selected at any time. Color coded identifiers for each calendar event are shown on their respective days. If there are more identifiers than may be shown in the space provided, the identifiers shown may be filtered. For example, a priority (such as importance, time of day, next occurring, events requiring user action or providing updated information or alerts) or the types of events shown (e.g., family, friends, business, personal), or a combination thereof may be used to filter the information presented. In addition, if sufficient space is unavailable the events displayed may be periodically rotated.

Figure 18:
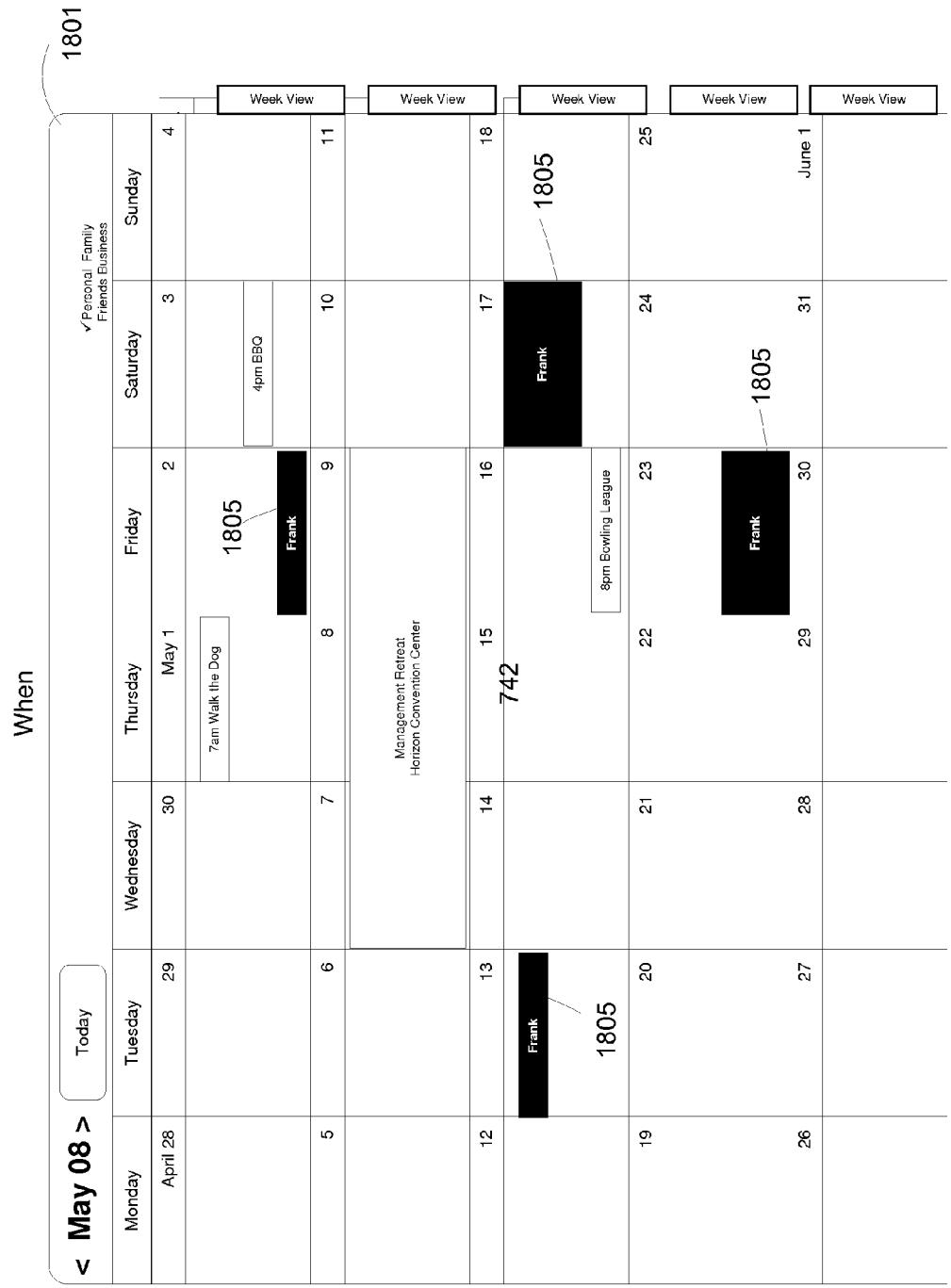
FIG. 18 is an exemplary illustration of the WHO strip with the calendar lozenge focused on a contact.

The system service provider 110 maintains calendar data for each system user. As a result, the calendar may be used to show data from other calendars which may be useful in planning events, such as meetings. For example, selecting the identifier for a system user "Frank" from a user's people lozenge causes the calendar 1601 to change to the calendar shown in FIG. 18. As shown in FIG. 18, the calendar 1801 now includes indications 1805 of periods of occupied time for which Frank has events scheduled. This is very useful for user's trying to schedule meeting. For example, looking at the calendar 1801, the user may determine the morning of May 17$^{th}$, Frank is unavailable to have a meeting. Holding a cursor/pointer over the indications 1705 causes a popup indication of the exact time period when in the month view shown in FIG. 18.

Figure 19:
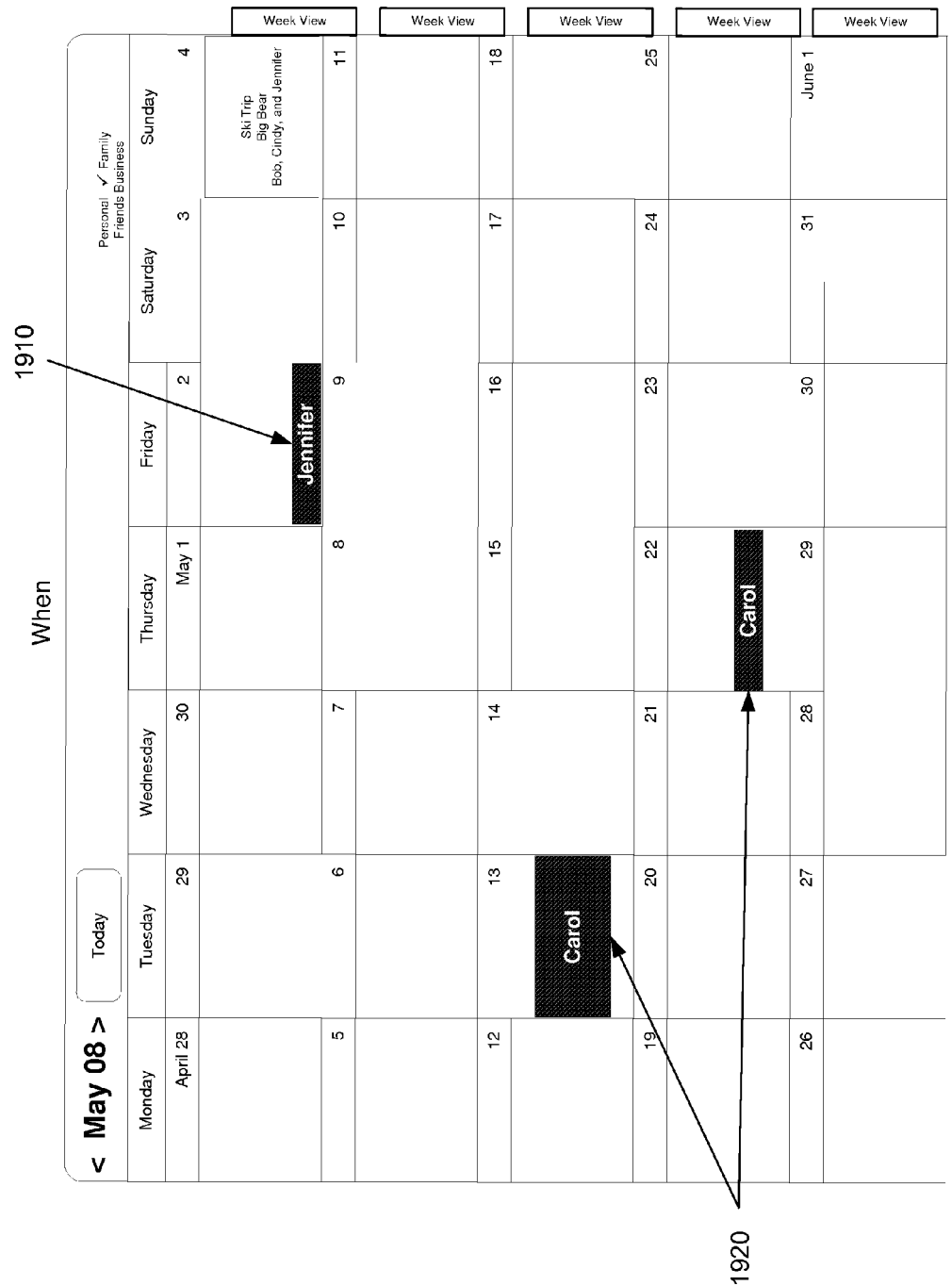
FIG. 19 is an exemplary illustration of the WHO strip with the calendar lozenge filtered for the family category.

In addition, event categories also may be used to filter/display information. For example, FIG. 19 shows the user has selected the input 1625 family to display calendar 1901. As shown, the events walk the dog, management retreat, and bowling league have been removed, family event "ski trip" is shown. In addition, family members events for Jenifer 1910 and Carol 1920 are shown.

Figure 21:
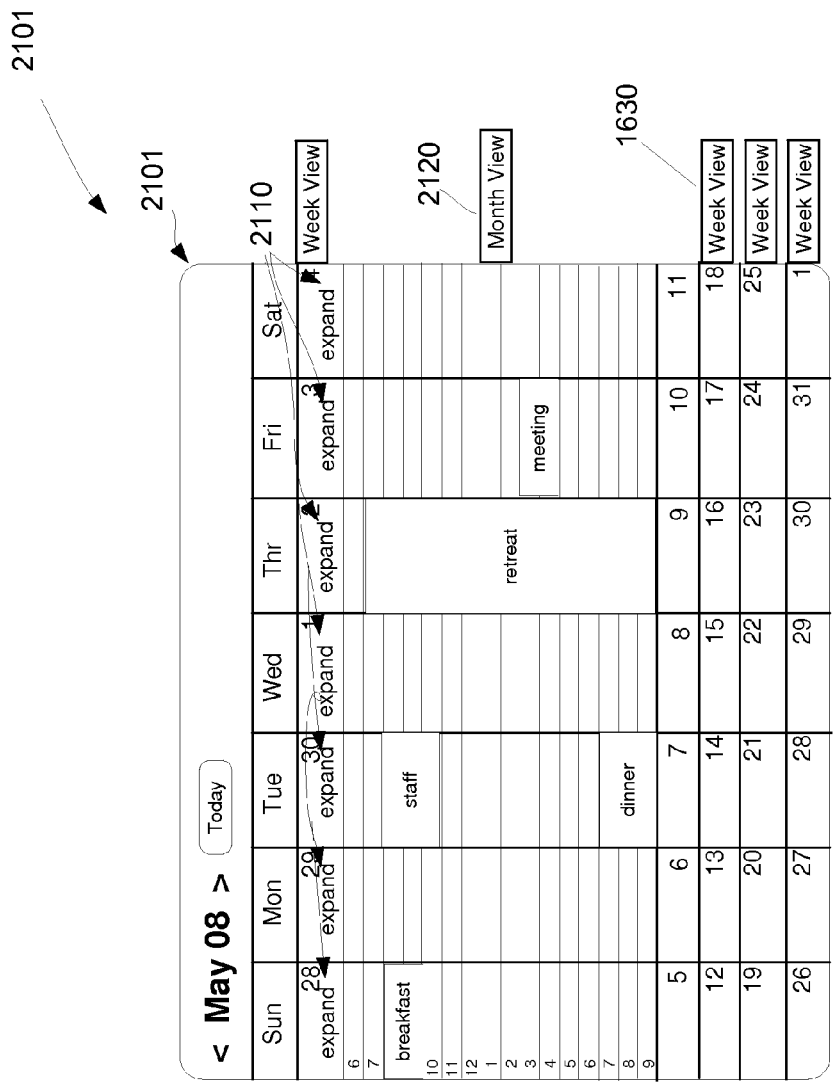
FIG. 21 is an exemplary illustration of the WHO strip with the calendar lozenge in the Expanded Week view.
Figure 22:
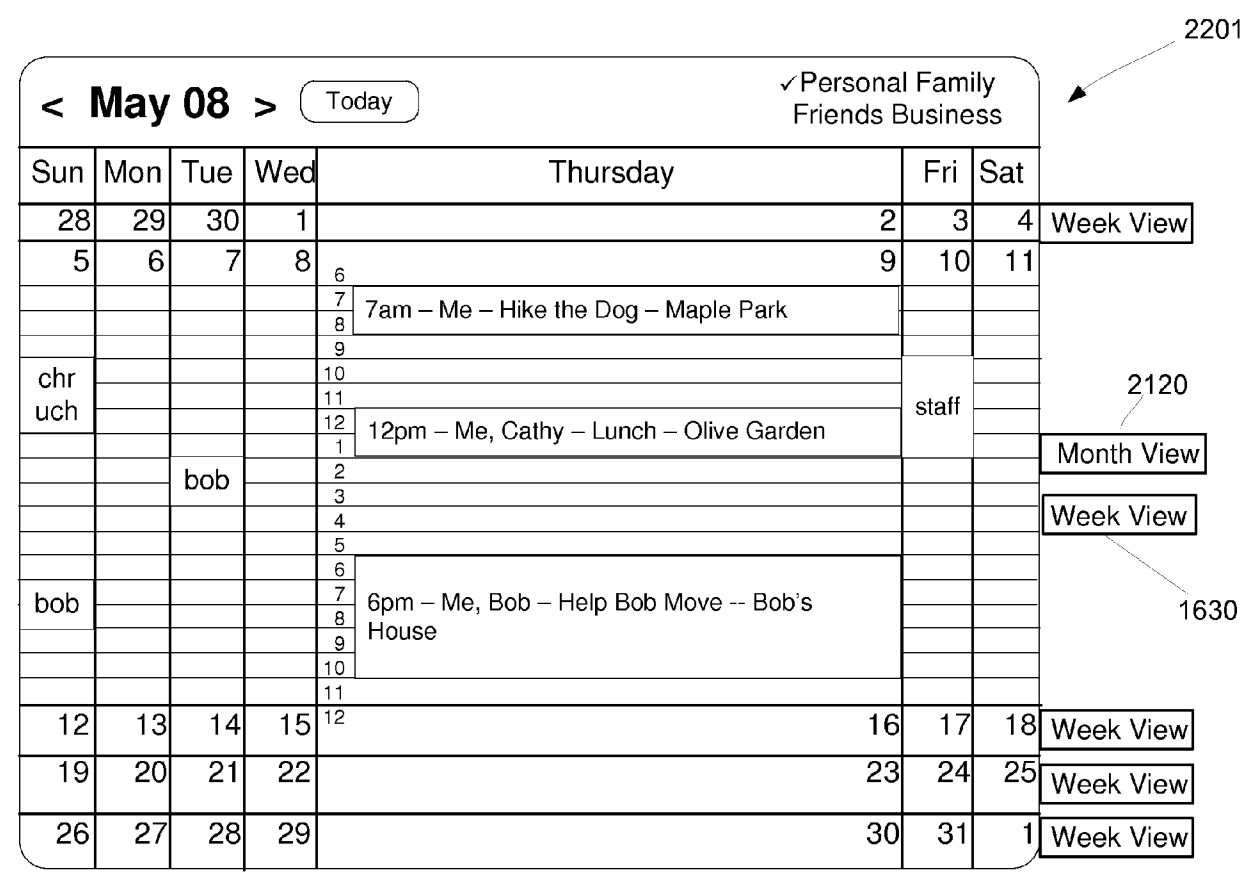

A unique feature of the calendar that it dynamically adjusts the space needed to display portions of the calendar while maintaining presentation of every day in the month displayed, as shown in FIGS. 20, 21, and 22. FIG. 20 shows a calendar lozenge with the calendar in the month view 1601. As shown, a week view input 1530 is provided for each week displayed in the month view 1601.

Selecting the week view input 1630 for the week of May 5$^{th}$ though the 11$^{th}$ expands the area used to display the selected week on the screen while reducing the other weeks presented by a corresponding amount, in the expanded week view as shown in FIG. 21. In the expanded week view 2101, more event identifiers may be displayed concurrently and other event details and information in addition to the event identifier (e.g., a time of event) may be presented. Additionally, segments for the hours during each expanded day or a timeline may be presented. At the same time, all other days outside the expanded week shrink to a smaller size. In this mode, the small days use color codes in combination with a number indicate events for that day. The color indicates the type of event that day and the number indicated the number of events of this type on that date.

Two additional inputs are also provided. An expand input 2110 is provided for each day in the expanded week and a month view input 2120 is provided for the expended week. Selection of the month view input 2120 causes the screen to return to the month view 1601 shown in FIG. 20.

Selection of the expand input 2110 for any day in the week causes the area for the selected day to expand with a corresponding reduction in the area of the remaining days in the expanded week as shown in FIG. 22. The expanded day view 2201 may include a time line, larger fonts, and addition information provided for each event (such as identifier, time, location, attendees, and notes). In addition, a today button 1620 is provided on all of the views (2001, 2101, and 2201) to automatically expand the calendar to the expanded day view 2201 open to the current date. The expanded day view 2201 also may include a week view input 1630 to return the week to the expanded week view 2101, and a month view input 2120 also is provided to cause the screen to return to the month view 1601 shown in FIG. 20.

Item Dragging

Figure 23:
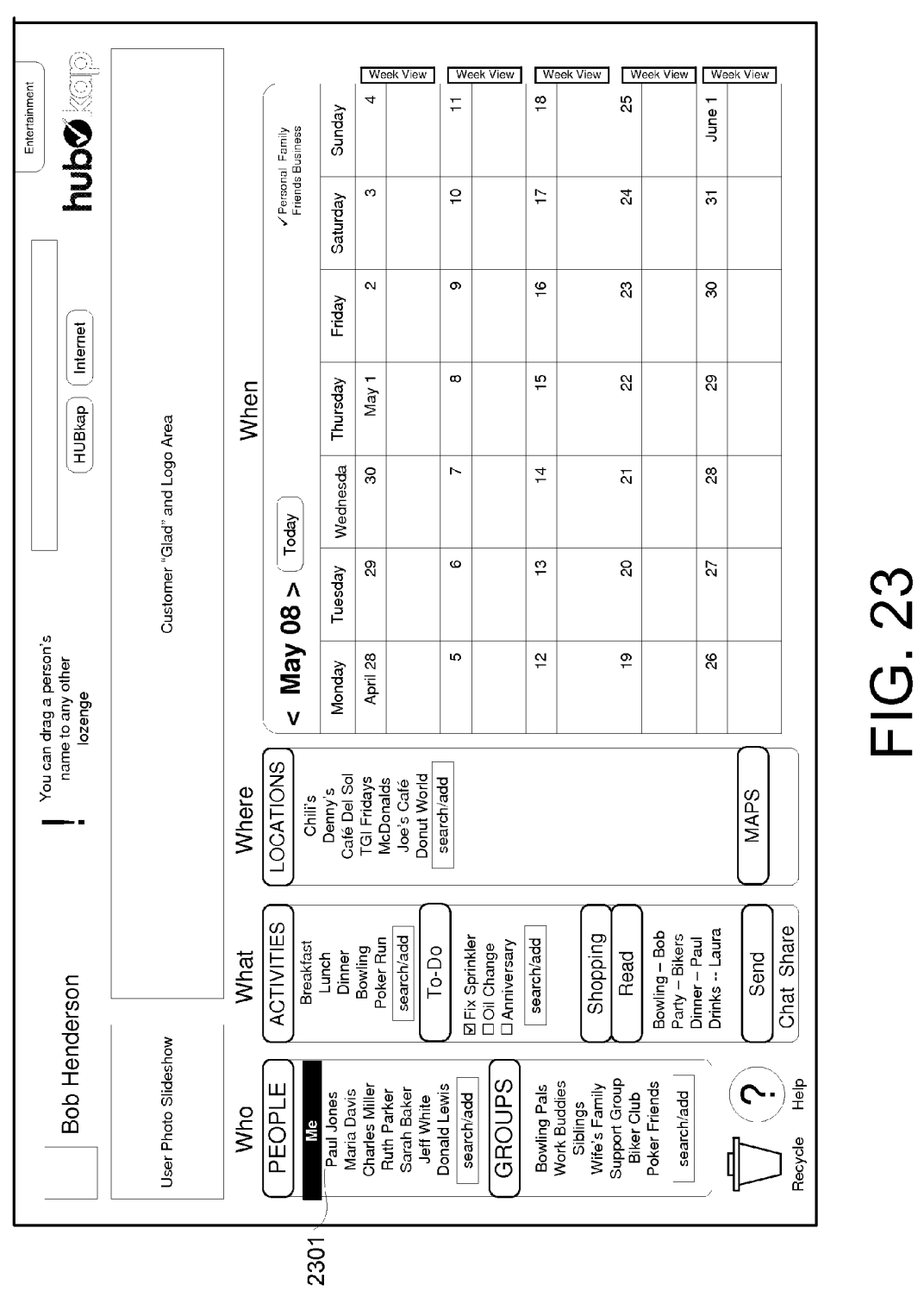
Figure 24:
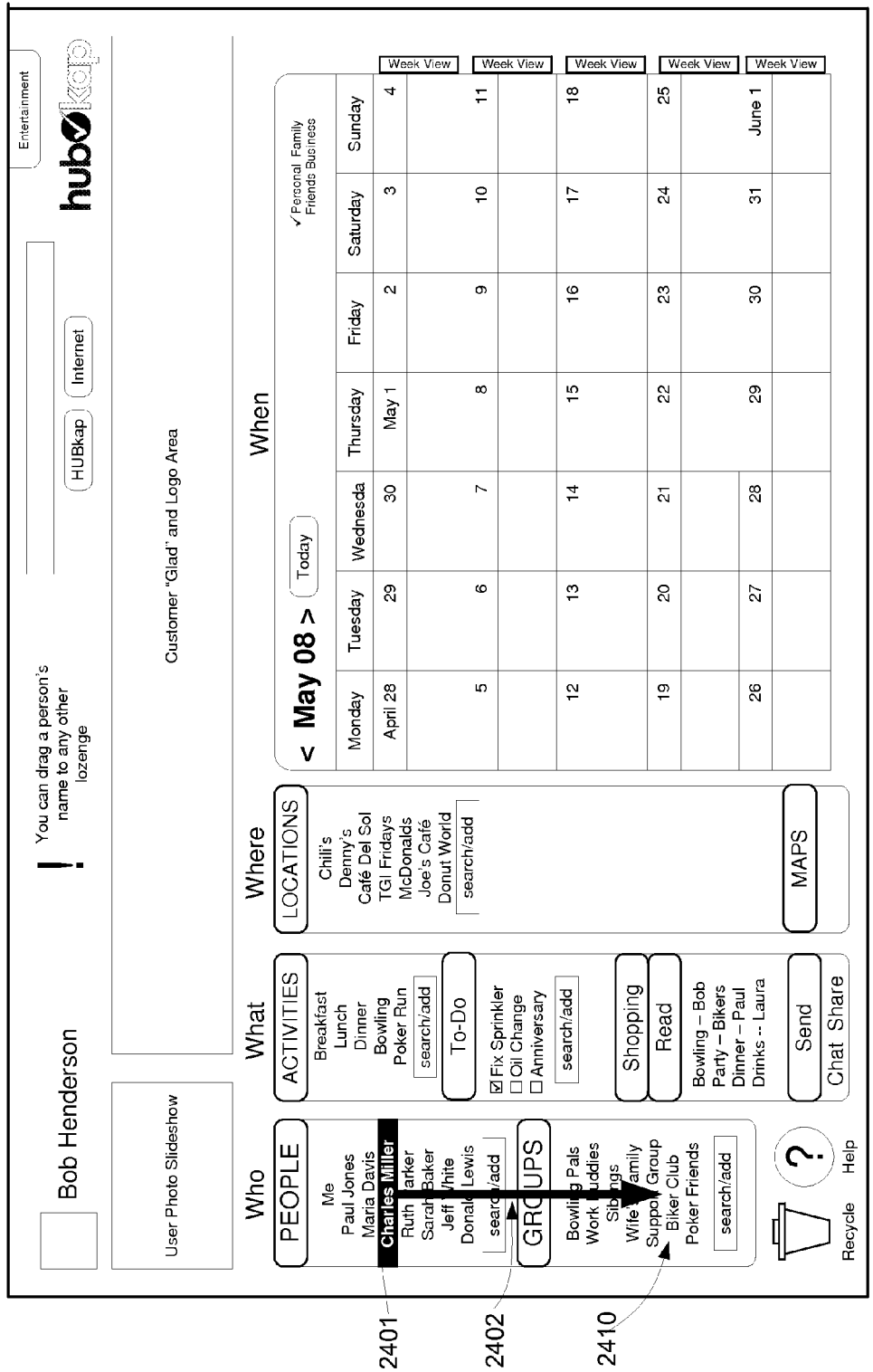
Figure 25:
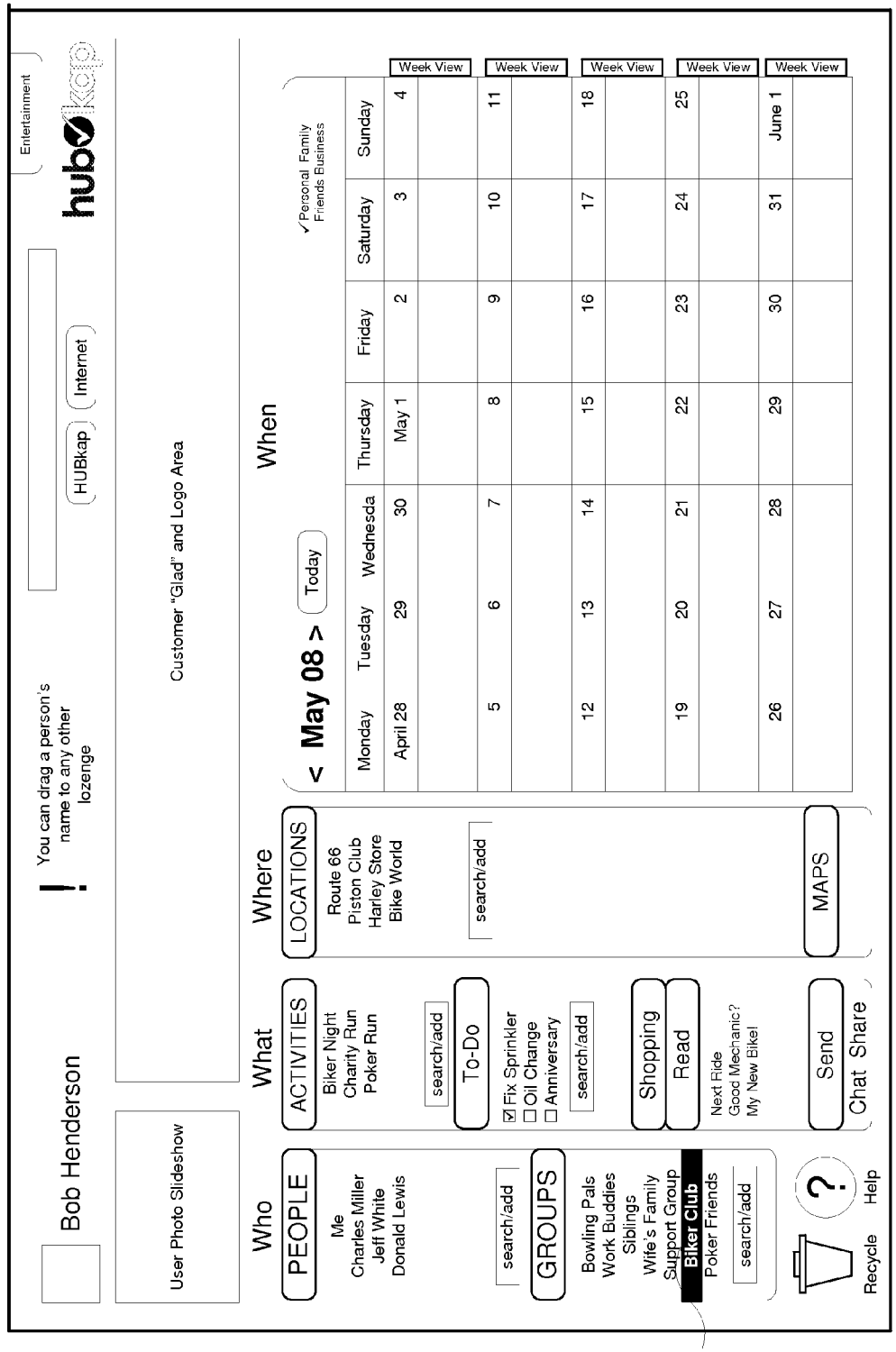

Because the service provider system 110 dynamically maintains all system user data, any item from a lozenge may be selected by a user input device and moved to another lozenge (e.g., dragging a selected item in one lozenge to the area of the user interface defining or occupied by a second lozenge) to cause the system to automatically perform an actions and services. This allows a user to harness the information stored by and the automation provided by the system to perform tasks for the user in a straight forward and easy manner. For example, a user may select and drag a person or a group from the people or groups lozenge to: the calendar to create an appointment or to the send lozenge to send a message to the person or group FIGS. 23-25 shows an example of adding a user to a group. FIG. 23 shows the user has selected "me" 2301 from the people lozenge. The selection 2301 causes the groups lozenge to focus on groups the user belongs to. FIG. 24 shows that Contact "Charles Miller" 2401 is selected from the people lozenge and dragged 2402 to the group "Biker Club" 2410. In response, the service provider system 110 automatically accesses the user database and adds an indication for "Charles Miller" to group "Biker Club." FIG. 25 shows the "Biker Club" 2510 is selected causing the people, activities, read, and locations lozenges to focus on the biker club related items. For example, people is focused to contact in the Bike Club (e.g., Me, Charles Miller, Jeff White, and Donald Lewis), activities is focused to bike activities (e.g., biker night, charity run, poker run), the read lozenge includes message sent by Bike Club members (e.g., Next Ride, Good Mechanic, and My New Bike), and locations to bike related locations (e.g., Route 66, Piston Club, Harley Dealership, Bike world).

In another example, items directly dragged to a calendar date may automatically create an event. If a lozenge item is dragged to any date on the calendar in the month view, an event is automatically created for noon on that date with whatever content is associated with the lozenge. For example, if Bill is dragged to June 1, an event nickname Bill is provided for a 1 hour meeting with Bill at noon on June 1st. A message is sent to invite Bill. The user may select the item on the calendar to access the event and to edit or provide further details. If a lozenge item is dragged to the expanded week view or day view, then the event is scheduled for the hour time slot the item is dragged to on the calendar as a default. The hour slot is also visual highlighted or shaded to indicate the planed time of the meeting. The user may then adjust the timing of the event using a pointing user input device to select a border or portion of the highlighted region to expand or contract the highlighted area to increase or decrease, respectively, the time scheduled for the event.

Figure 26:
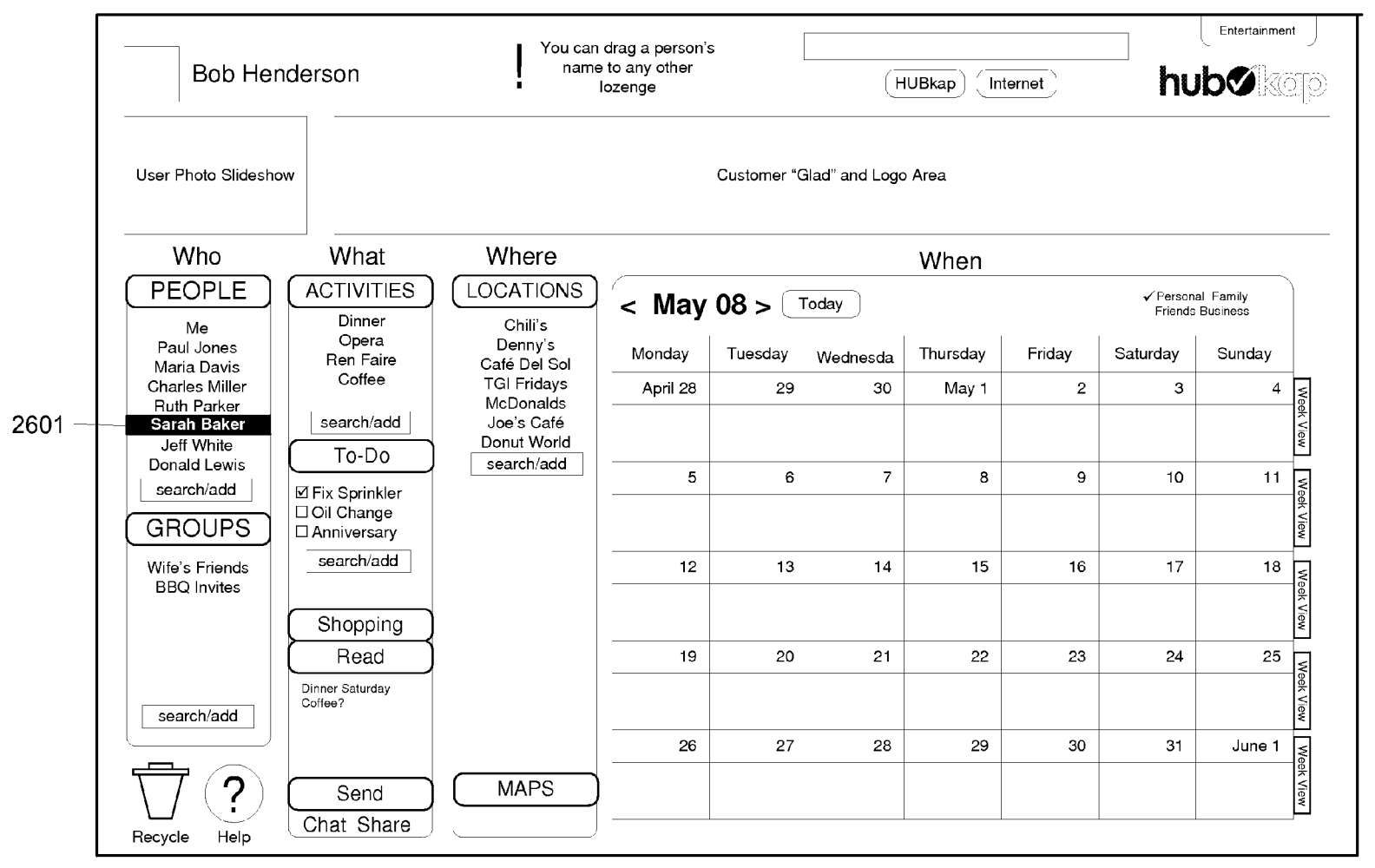
Figure 27:
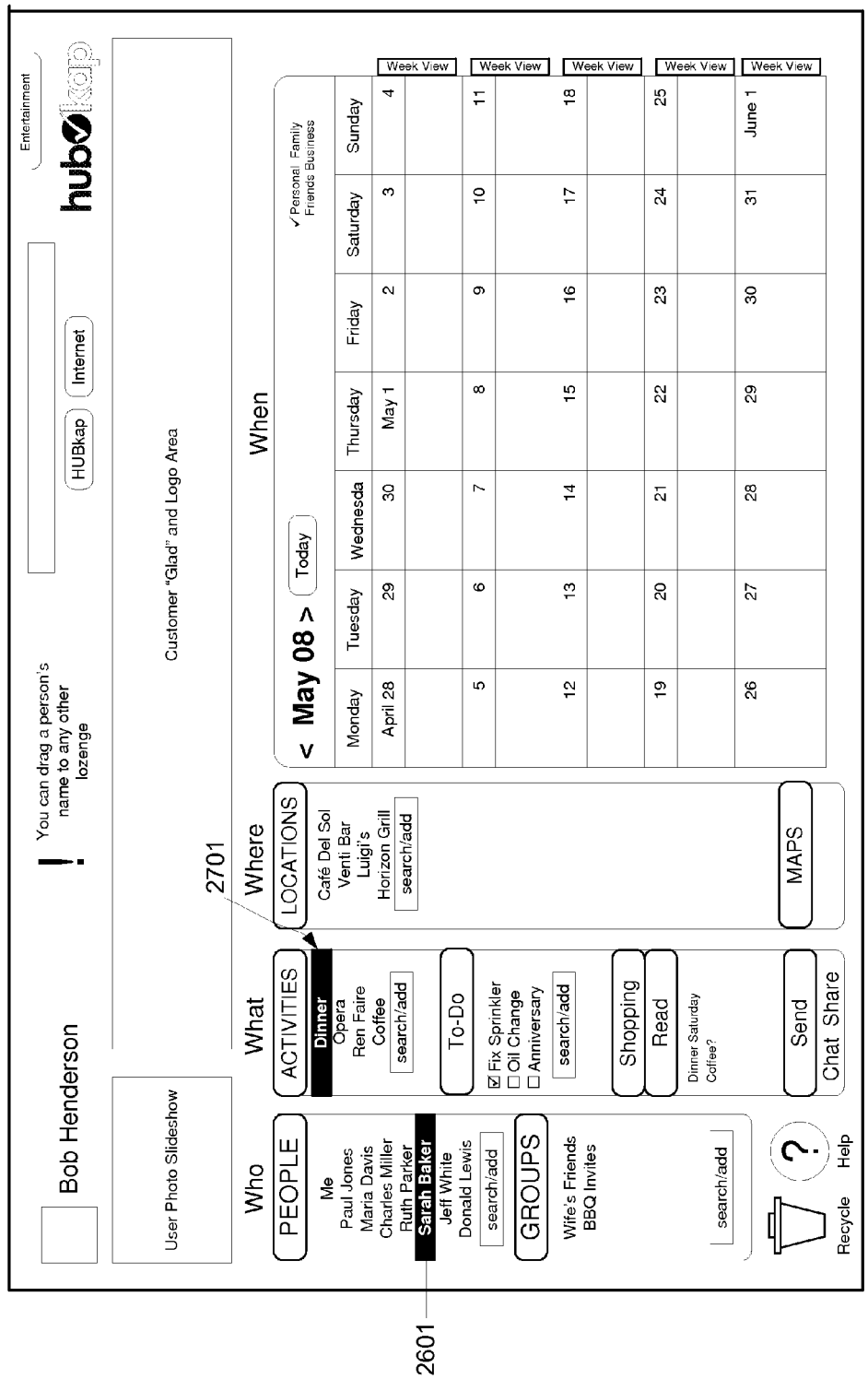
Figure 28:
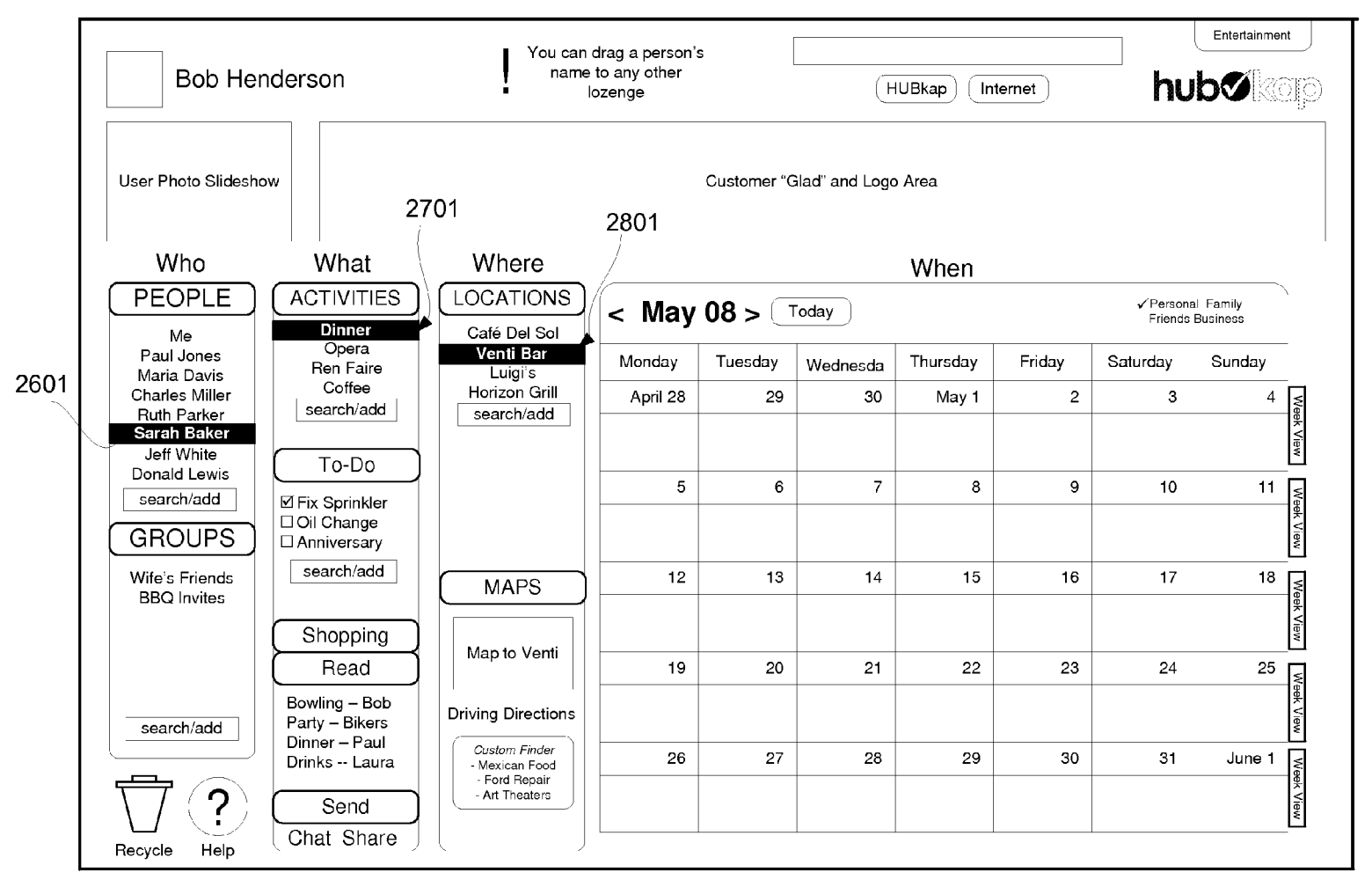
Figure 29:
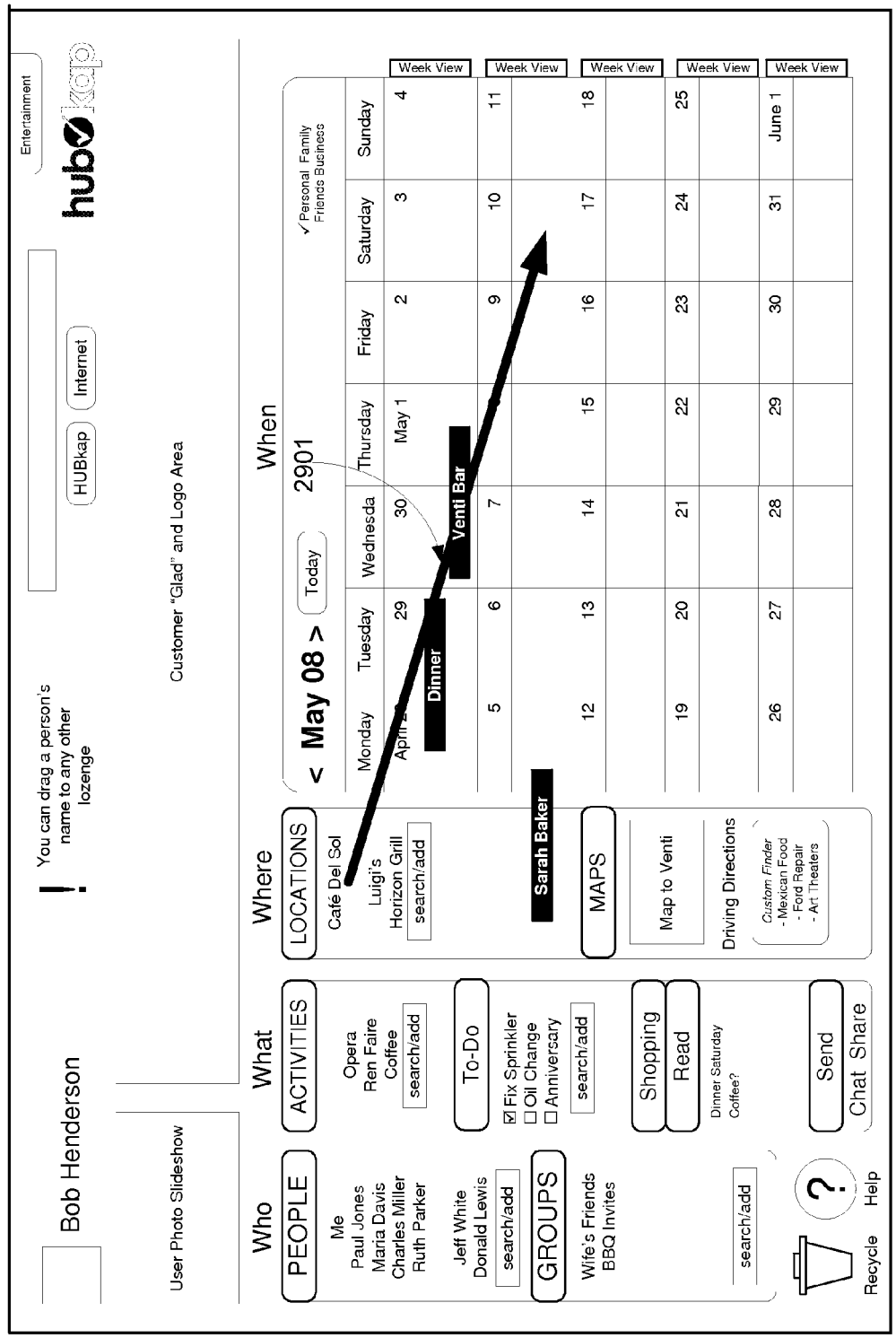
Figure 30:

Combinations of items also may be dragged and dropped as shown in FIGS. 26-30. For example, FIG. 26 shows a contact "Sarah Baker" 2601 is selected from the people lozenge causing the other lozenges to focus based on Sarah Baker. FIG. 27 shows the user has selected "dinner" 2701 from the activities lozenge causing the locations lozenge to focus on dinner locations. FIG. 28 shows the selection of a location "Venti Bar" 2801 from the locations lozenge. FIG. 29 show the user drags 2901 the selected items to Saturday May 10$^{th}$ on the calendar lozenge. The system then automatically creates an event in the calendar for dinner at the Venti Bar with Sarah on May 10$^{th}$ and displays a corresponding indicator 3001 as shown in FIG. 30. Of course, many other combinations are possible.

Figure 31:
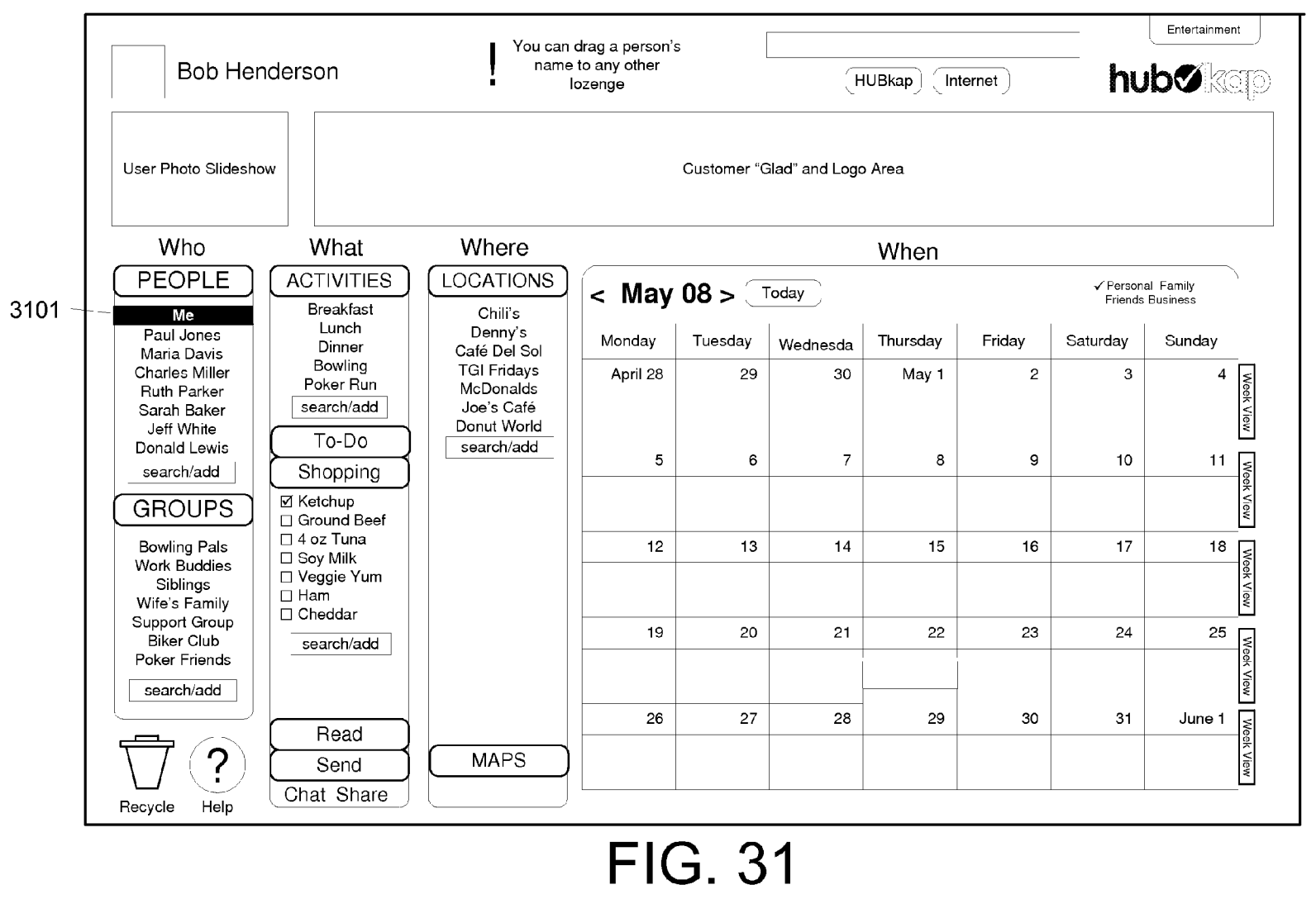
Figure 32:
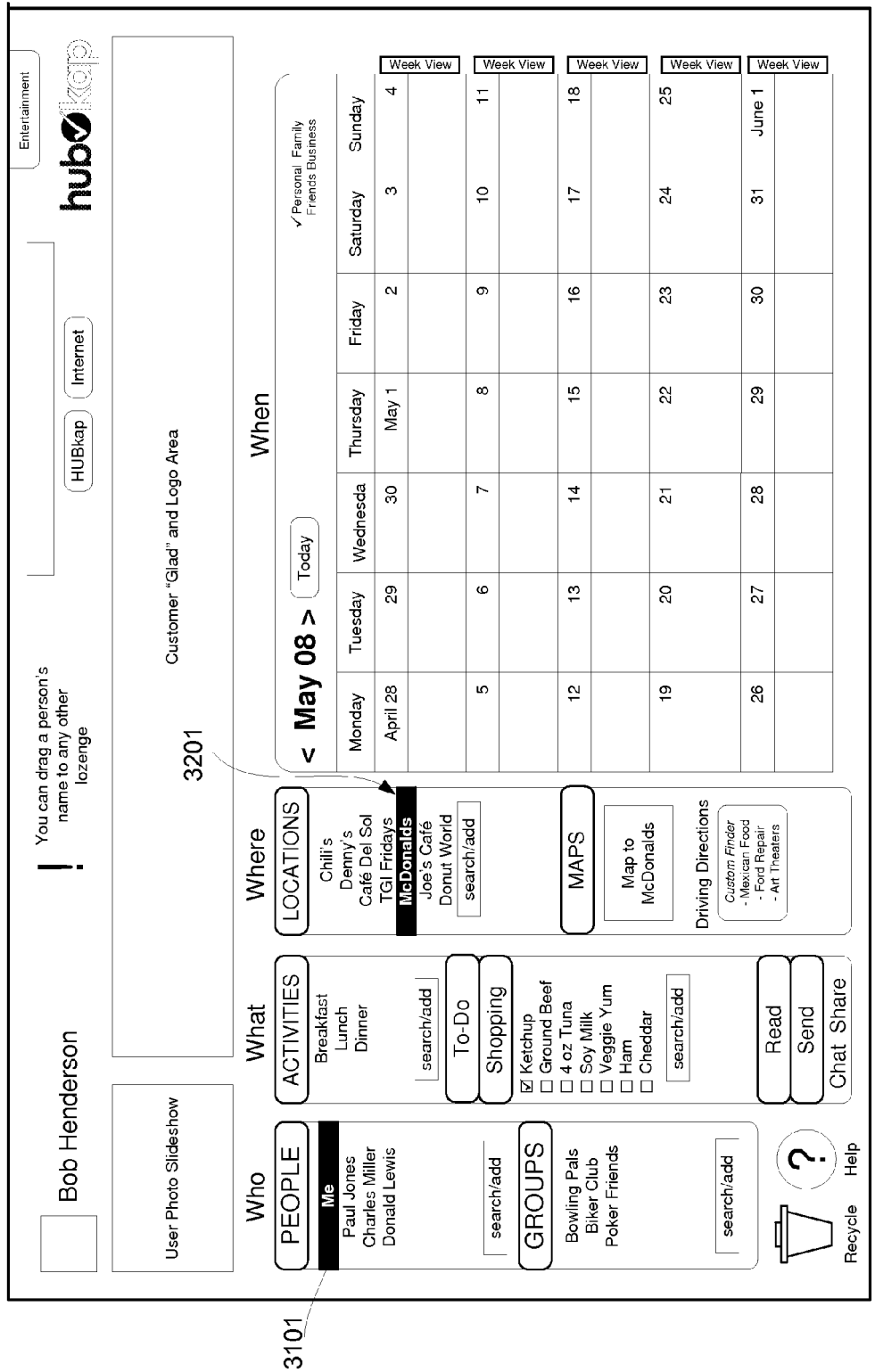
Figure 33:
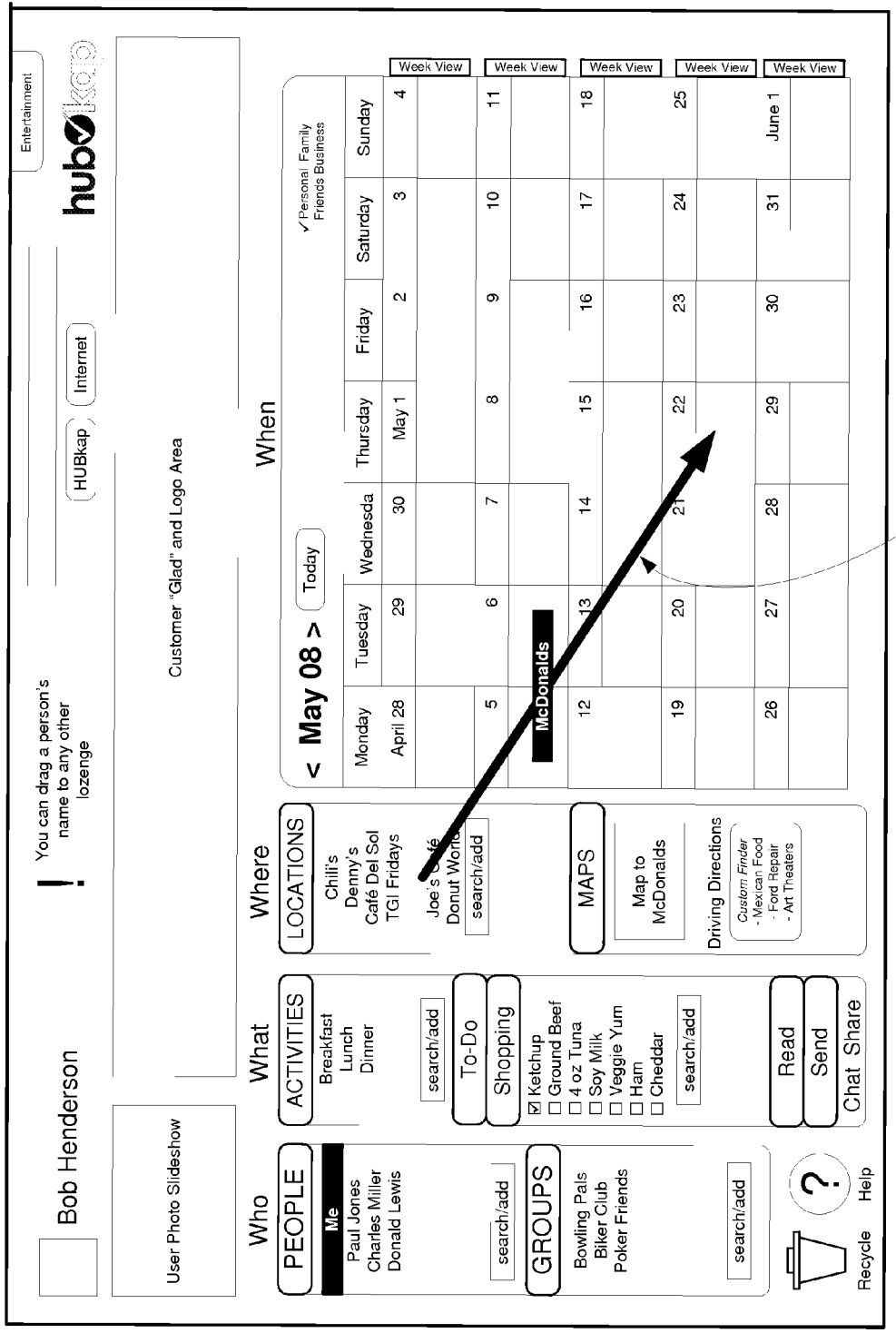

In another example shown in FIGS. 31-34 a user creates an event using a location. As shown in FIG. 31, the user selects themselves 3101 in the people lozenge to focus on the user. As shown in FIG. 32 the user then selects a location "McDonalds" 3201 from the locations lozenge causing the people lozenge to focus on people the user goes typically invites to McDonalds, groups which go to McDonalds, activities that take place at McDonalds, a map to a McDonalds. FIG. 33 shows the user drags 3301 the location to a date on the calendar lozenge (e.g., May 22$^{nd}$). FIG. 34 shows the service provider system 110 then creates an event in the user's database for the user at McDonalds on the Thursday May 22, 2008 and displays an identifier 3401 for the event on the calendar.

Table 1 table gives some examples of other actions that may be performed by selecting items displayed in the lozenges and dragging them to other lozenges.

TABLE 1

| Lozenge | Action Lozenge | Action |
|---|---|---|
| Help | any | any item dragged to help? or ? dragged to any item opens context sensitive help |
| Combos (after click to highlight) | | |
| who + what | when | creates cal event with those item fields populated |
| who + where | when | creates cal event with those item fields populated - prompts for event name |
| who + what + where | when | creates cal event with those item fields populated - prompts for event name |
| where + what | when | creates cal event with those item fields populated |
| Single Items | | |
| People | Groups | adds person to group |
| People | Blank Group | adds person to group, prompts for new group name |
| People | To Do | creates empty to do with text "with FN LN" |
| People | Shopping | creates empty shopping item with text "for FN LN" |
| People | Read | Same as select/highlight - shows all messages from the dragged/selected person's name |
| People | Send - Share | Open a "new share" box, user may drag files (using the computer's OS) or select them with a BROWSE button, then click SHARE |
| People | Send - Discuss | Open a "new message" box, user may type a message then click SEND |
| People | Calendar (blank area) | creates event that includes that person (prompts for event name, etc.) |
| People | Calendar Appointment | adds person to event attendee list |
| People | User Picture | adds contact image to slideshow |
| People | Family | changes relationship of contact to family |
| People | Business | changes relationship of contact to business |
| People | Friends | changes relationship of contact to friends |
| People | A Glad | Sends that Glad to that person via email |
| People Groups | People | adds person to group |
| Groups | To Do | creates empty to do with text "with <group name>" |
| Groups | Shopping | creates empty shopping item with text "for <group name>" |
| Groups | Read | Same as select/highlight - shows all messages from the dragged/selected group name |
| Groups | Send - Share | Open a "new share" box, user may drag files (using the computer's OS) or select them with a BROWSE button, then click SHARE to share them with that entire group |
| Groups | Send - Discuss | Open a "new message" box, user may type a message then click SEND to send that message to that entire group |
| Groups | Calendar (blank area) | creates event that includes that group (prompts for event name, etc.) |
| Groups | Calendar | adds group to event attendee list |
| Groups | A Glad | Sends that Glad to that group via email |
| Activities | To Do | creates to do item with activity name |

TABLE 1-continued

| Lozenge | Action Lozenge | Action |
|---|---|---|
| Activities | Read | Same as select/highlight - shows all messages associated with the dragged activity |
| Activities | Send - Discuss | Opens a requester "Who would you like to discuss this activity with?" |
| Activities | Calendar (blank area) | creates event (cal event name = activity) |
| Activities | Calendar Appointment | changes name of event to new activity (cal event name = activity) |
| To Do | People | appends to do item with text "with <FN LN>" |
| To Do | Groups | appends to do item with text "with <group name>" |
| To Do | Shopping | To-Do list is moved to Shopping List |
| To Do | Send - Discuss | Opens a requester "Who would you like to discuss this To-Do List item with?" |
| To Do | Calendar (blank area) | creates cal event (to do item = cal event name) |
| To Do | Calendar Appointment | changes name of event to new activity (cal event name = to do item) |
| To Do | Locations | Creates to do item "go to <location name>" |
| To Do | | |
| Shopping | People | Opens an email to that person, subject is "Shopping for <item>", then the user may continue to type a message and click the SEND button. |
| Shopping | Groups | Opens an email to that group, subject is "Shopping for <item>", then the user may continue to type a message and click the SEND button. |
| Shopping | To Do | creates to do "go shopping for <shopping list item>" |
| Shopping | Send - Discuss | Opens a requester "Who would you like to discuss this Shopping List item with?" |
| Shopping | Calendar (blank area) | create cal event "go shopping for <shopping list item>" |
| Shopping | Calendar Appointment | Changes name of event to "go shopping for <shopping list item>" |
| Read | People | Open a "new message" box, user may type a message then click SEND to send that message to that person |
| Read | Groups | Open a "new message" box, user may type a message then click SEND to send that message to that entire group |
| Read | To Do | Adds message title to To-Do list |
| Read | Shopping | Adds message title to Shopping list |
| Read | Send - Share | Open a "new share" box, user may drag files (using the computer's OS) or select them with a BROWSE button, then click SHARE to share them with that the addressee list found in that message |
| Read | Calendar (blank area) | Opens an event with the activity set to the message title, with the attendee list set to the addressee values. Missing will be a location. |
| Read | Calendar Appointment | Adds message title to "comments" section of the existing appointment |

Focusing

The user interface also provides a unique feature called "focusing." Focusing intuitively connects all of the interface's basic functionality and content to provide the features and the content that are generally the most useful to a user at any particular moment in time. For example, whenever a user selects an item provided by one of the four strips WHO 731, WHAT 733, WHERE 735, and WHEN 737, the other strips and lozenges automatically react by providing the user with the content and features within the context of each strip that the user may most likely desire based on the user's selection.

Whenever a user selects a contact name for a person or a group the other strips automatically adjust the information displayed based on the selection. For example, if the user selects "John Merk" in the People lozenge of the WHO strip 731, then the Read lozenge of the WHAT strip 733 also displays all current message threads between the user and John Merk. Similarly, the Calendar lozenge of the WHEN strip 737 displays all upcoming appointments with John Merk and all events that the user is coordinating with him; and the maps lozenge of the WHERE strip 735 displays an address and associated map for John Merk.

Focusing may be initiated by selection of content, inputs, or features from any of the strips of the user interface. For example, if the user selects a new message "John Erikson about Fishing Trip," the People lozenge displays a list of the contacts associated with the Fishing Trip, and the Calendar tab displays the event on the calendar which is being referred to, and the locations lozenge of the WHERE strip 735 displays the boat company chartered for the trip and a map of the area surrounding the boat launch. In another example, if the user selects an event "Weekend Away" from the activities lozenge, the conversational thread regarding this event opens automatically in the Read lozenge of the WHAT strip 733, and the People lozenge opens to show Sharon's contact information.

Figure 35:
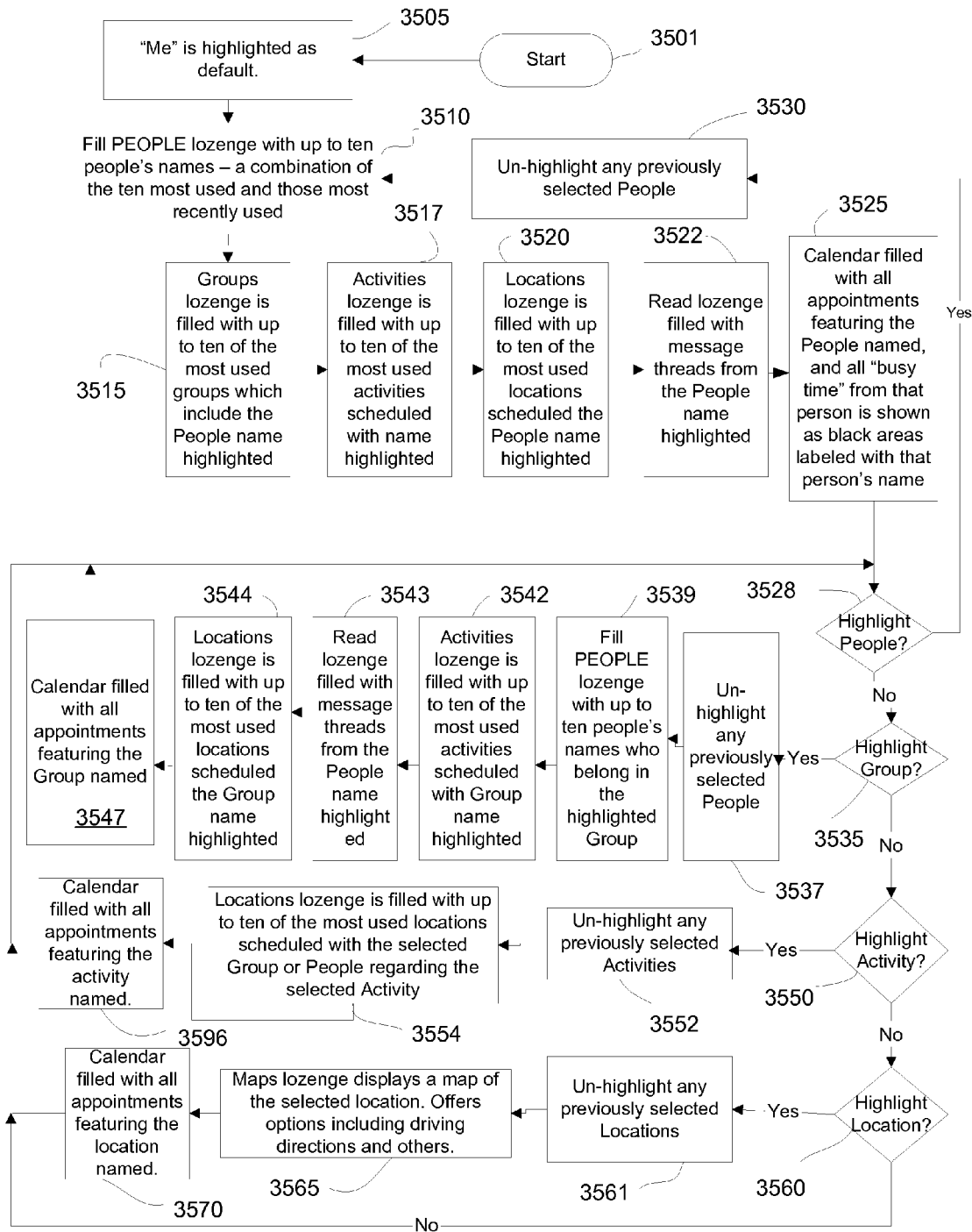
FIG. 35 shows an exemplary focusing process for items displayed in the lozenges of the WHO, WHAT, WHERE, and WHEN strips.

FIG. 35 shows an example of a process 3500 for focusing of the lozenges. The process starts 3501 when a user accesses the user interface. The server initially populates the people lozenge with "Me" which is automatically highlighted as default in the initial startup of the user interface 3505.

The applications server determines up to ten contacts from the user contact database for the highlighted name in the peoples lozenge. The server selects the contacts based on the ten most frequently used contact, the ten most recently used contacts, or a combination of both. The server uses the determined contacts to fill the contact list of the people lozenge 3510.

The applications server determines up to ten of the most used groups which include the name of the contact highlighted in the people lozenge (in the first instance it is the default "me"). The determined groups are then used to fill the group contact list of groups lozenge 3515.

The applications server determines up to ten of the most frequently used activities scheduled with name highlighted in the people lozenge. During an initial period of use, or if there are few activities the user has actually participated in, the system may select activities from a default list of activities based on the user profile in conjunction with the time of day, the weather, any nearby holidays, the user's location, and the time of year. The server uses the determined activities to populate the list of activities display in the activities lozenge 3517.

The applications server determines up to ten of the most used locations scheduled for the contact name highlighted in the people lozenge. The server uses the determined locations to populate the list of locations provided by the locations lozenge 3520.

The applications server determines message threads involving the contact highlighted in the people lozenge. The server selects up to ten message threads and populates the read lozenge with the thread identifiers of the selected message threads 3522. The server selects the newest threads over older or unanswered threads.

The applications server determines all events including the contact highlighted in the people lozenge. The server populates the calendar with the determined events including the highlighted contact and the user 3525. If the highlighted contact is not the user (i.e., "me" is not highlighted) and the contact is a user of the service provider system 110, the calendar displays any "busy time" from that person within the calendar lozenge (e.g., black areas labeled with that person's name).

The system monitors the user interaction with the user interface and determines whether any people are highlighted 3528. If a user selects a new contact from the people lozenge, the previously selected contact is un-highlighted and the processes 3510, 3515, 3517, 3520, and 3522 are repeated for the newly highlighted contact. The system also monitors the user interaction with the user interface to determine whether a group is selected from the groups lozenge 3535.

If a group is selected, any contact previously selected in the people lozenge is un-highlighted 3537. The applications server determines up to ten contacts in the group. The determined contact then use to populate the contact list of people lozenge 3539.

The applications server determines up to ten of the most frequently used activities scheduled with group highlighted in the group lozenge. The server uses the determined activities to populate the list of activities display in the activities lozenge 3542.

The applications server determines message threads involving the contact highlighted in the people lozenge. The server selects up to ten message threads and populates the read lozenge with the thread identifiers of the selected message threads 3543. The server selects the newest threads over older or unanswered threads.

The applications server also determines up to ten of the most used locations scheduled for the group name highlighted in the groups lozenge. The server uses the determined locations to populate the list of locations provided by the locations lozenge 3544.

The applications server determines all events including the group highlighted in the groups lozenge. The server populates the calendar with any of the determined group events 3547

If no group is selected, the server monitors whether any activity is selected 3550. If so, any previously selected activities are un-highlighted 3552. The server also determines up to ten of the most used locations previously scheduled with the selected group or contact regarding the selected activity 3554. In addition, the calendar is filled with all events featuring the activity named 3596.

If no activity is selected, the server determines if a location is selected by the user 3560. If so, any previous locations are un-highlighted 3561. The server determines a map of the selected location, and the server populates the maps lozenge with the determined map 3565. The server also determines options including driving directions and others appropriate for the location and provides them on the maps lozenge 3565. In addition, all events featuring the location are highlighted on the calendar 3570.

The server monitors to see if any people are selected 3528. If a user selects a new contact from the people lozenge, the processes 3530, 3510, 3515, 3517, 3520, and 3522 are repeated. If not, the server determines if any group is selected 3535. If the user selects a new group from the groups lozenge, the processes 3537, 3539, 3542, 3543, and 3544 are repeated for the newly highlighted group. If not, the server determines if any activity is selected 3550. If the user selects a new activity, the processes 3552, 3554, and 3556 are repeated for the newly highlighted activity. If not, the server determines if a location is selected 3560. If so, the processes 3561, 3565, and 3570 are performed. The server continuously monitors the user's interaction (e.g., processes 3528, 3535, 3550, and 3560) to focus the lozenges accordingly.

Mobile User Interface

A modified user interface may be supplied for mobile platforms, such as mobile phones, smart phones, and PDA that have limited processing power and/or screens. For example, WAP cell phones may be provided with an "Agenda" that allows them to see the upcoming four hours of appointments as a default screen. The interface may be provided with a number of inputs that are most useful to a user in this environment. For example, for appointments in the agenda the user may select an appointment and be provided with user inputs for specific actions with regard to those appointment. For example, the user may selection the options: running late, can't make it, and cancel meeting (with verification). Selection of any of these options causes an automatic message to be sent all contacts associated with the appointment indicating the user is running late, can't make it, or needs to cancel. The automated message is created by the system service provider and sent to the contacts associated with the appointment. The message may be an instant message, email, automated phone message, or an alert or popup window of a system user's user interface. The user interface also may display the user's shopping list listing the user's items. A check box or other indicator may be provided to allow the user to check items off the list. In addition, the To-Do list may be provided allowing a user to see items on the list, add items to the list, and check items off the list. Conflict resolution "alerts" and resolution System wide-12 hr email and SMS notification on event change.

In addition to the features provided for WAP cell phones, smart phones may provide the additional functionality. For example, the user's agenda may also provide action notices.

The smart phone also may allow a user to reorder their To-Do List. The smart phone PDA includes the dynamic calendar. The dynamic calendar also the user to filter information via persona/family/business categories. In addition, the user may be presented with day/week views. The user may add an appointment, delete Appointment, and re-order appointments in a list.

Search Tool

Figure 36:
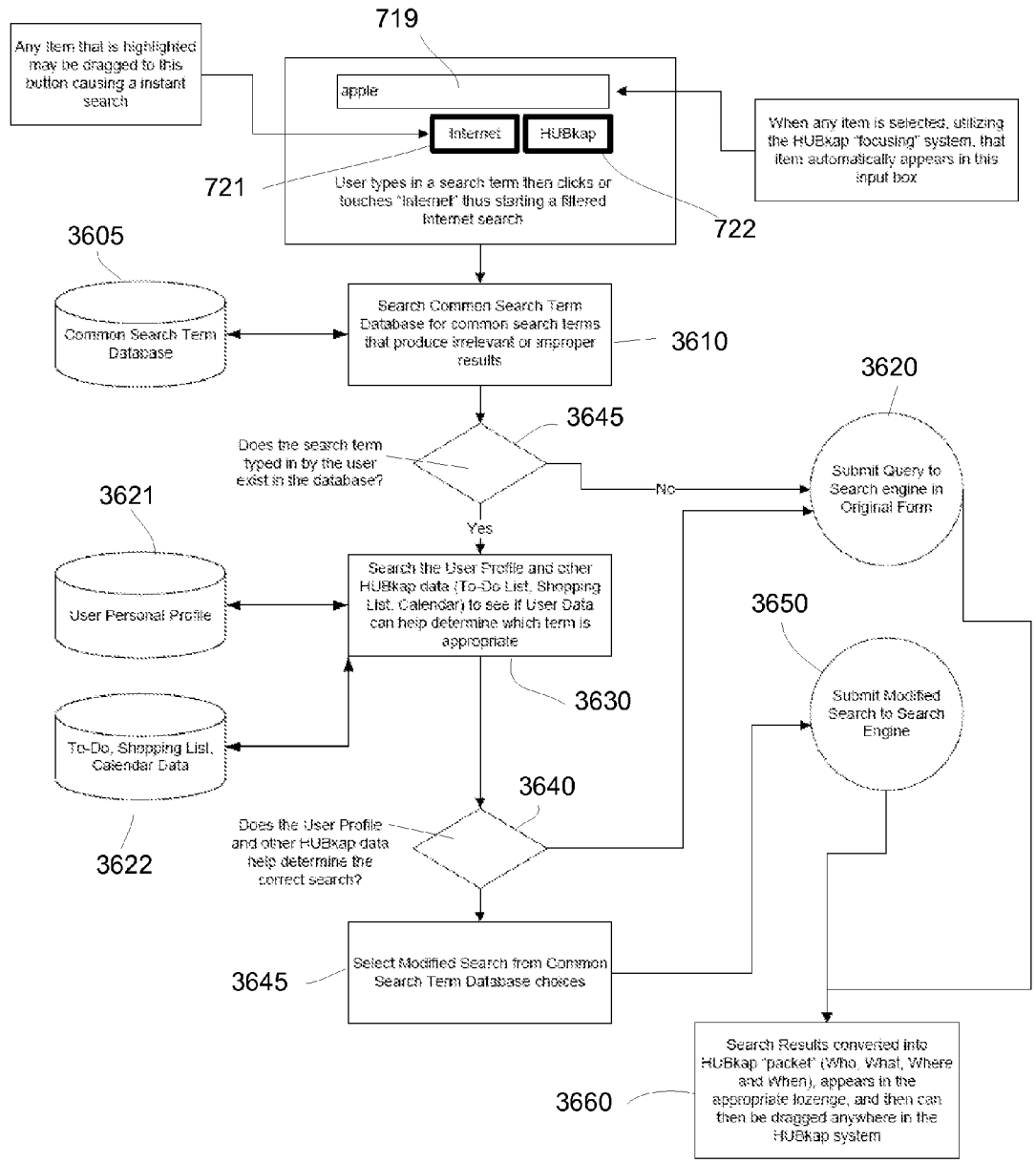
FIG. 36 shows an exemplary focused search process.

FIG. 36 shows an example of an improved search tool for use with the system. The system service provider includes a lot of information that may be harnessed to facilitate user searches. As pointed out above, items within lozenges may be focused for users depending on the actions with the user interface. Similarly, user search of the web and system data may be focused. The user interface may provide a search tool. The search tool includes a word entry field 719 to enter key words. Two inputs are provided to search the key words on the Internet 721 and within the system 722. In addition, any item may be dragged to the entry field 719 to create a search term.

The user enters a search term 3601 and selects the Internet input 721 to start a filtered Internet search. The service provider system accesses a common search term database 3605 to search 3610 for common search terms that may produce irrelevant or unwanted search results. The common term database 3605 includes a database of terms that may have common different meanings which may lead to ambiguity. For example, the term apple may be related to a fruit, a computer, a tree, bowling term, slang for drug, and a mollusk. The system determines whether the search term appears in the database 3615. If the term does not appear, the system submits the term to a search engine in its original form 3620. If the term is found in the common term database, the system searches the user profile 3621 and other db items 3622 associated with the user (e.g., the to-do list, shopping list, calendar) to see if user data provides additional information that indicates what context of the search the user actually intended 3630.

The system determines whether the user data indicates a particular meaning from among the common terms determined 3640. If the system determines a particular meaning, the system selects the modified search term 3645 and submits the modify search to the search engine 3650. For example, if user profile indicates a user is 60 year woman, shopping list includes pie crust, and has visit from arborist, terms computer company, mollusk, slang and bowling may be eliminated and a refined search of apple fruit and apple tree is provided to the search engine. Regardless of which search is performed (i.e., 3620 or 3660), the search results are converted to a system packet that appears in the appropriate lozenge which may be dragged anywhere in the system 3660.

Dynamic Organization and Calendar

The system databases keep track of all of the user's information and data including: timing, activity, content, and location, a list of events, event times, invitees, and holidays, among other information. This information also is continuously updated by the service provider system 110. As a result, the system is able to use the information to provide dynamic services in real time to a user. The services are automated which relieves the user of the burden of managing their data. For example, the system automatically focuses information provided to a user, schedules events for a user, focuses search terms and refines search results, anticipates users need of data, stores files, manages groups and activities, and provides advertisement that are truly customized to a user's needs.

As the system provides benefits to the user in organizing information with other system users, the system also facilitates adding contacts of a user to the system. As explained above, each user has an account associated with their data. The user may access the system service provider to sign up for and/or create an account. System accounts also may be activated via a unique activation code which may be imprinted on a physical medium, such as a "gift card." The unique code may be implemented as a multi-character alpha-numeric code, at least at least ten characters in length. To create an account, the user logs on to a website provided by the system service provider, provides the activation code along with the user information used for the user personal profile, and activates the account. Regardless of the whether the user purchases an account or receives a free or sponsored account, each user account comes with a number of free or "bonus" accounts that the user can give away at no charge to other people.

When a user invites another person to an appointment/event who is not a system user, the system service provider checks to see if the user has any remaining bonus accounts. If bonus accounts remain, the system asks the user "Would you like to give away one of your remaining x bonus accounts?" If the user answers "yes" to this question, the system generates an e-mail to the invitee with a link to the system registration website. Once the email is received, the invitee may select the link causing a web browser to automatically open to the website registration page. The invitee is asked to input information for their personal user profile and receives a limited-time free membership to access the system service provider. In addition, invitee's account includes the contact information of the user who invited them, a first message with the invitation to the meeting, and an indication of to pending meeting in their calendar. The invitee's user interface also includes the identifier of the person who invited them in their people lozenge, a message from user in the read lozenge with the invitation for the meeting, and an indication in their calendar lozenge for the date of the proposed meeting showing a pending meeting needing confirmation. The new user does not receive any additional accounts.

This process allows non-computer literate computer users to easily adopt an on-line calendar and organizer without fear or intimidation of having to endure a long and complicated account creation and verification process. In addition, the relationship between the user and the invitee is automatically established in the new account. If Bob Henderson invites his wife Carol to become a user, the system uses the category (friend, family, business) set in Bob's calendar so that all future appointments are categorized correctly.

As mentioned above with regard to the user interface, the dynamic calendar has the ability to focus the calendar, adjust the size of the calendar, and determine availability of other system users. A user may focus calendar information by selecting one or more of the calendar inputs (e.g., personal, family, friends, and business) or by selecting a person or group from the who strip to show events or pending events with those users on the calendar. In addition, if the person selected is a system user (or a group is selected), the calendar shows any times the person or group is unavailable (e.g., times when a person already has a calendar event scheduled) for the month displayed. This is helpful in determining when others are available to facilitate scheduling or picking out times when everyone is available for an appointment.

Figure 37:
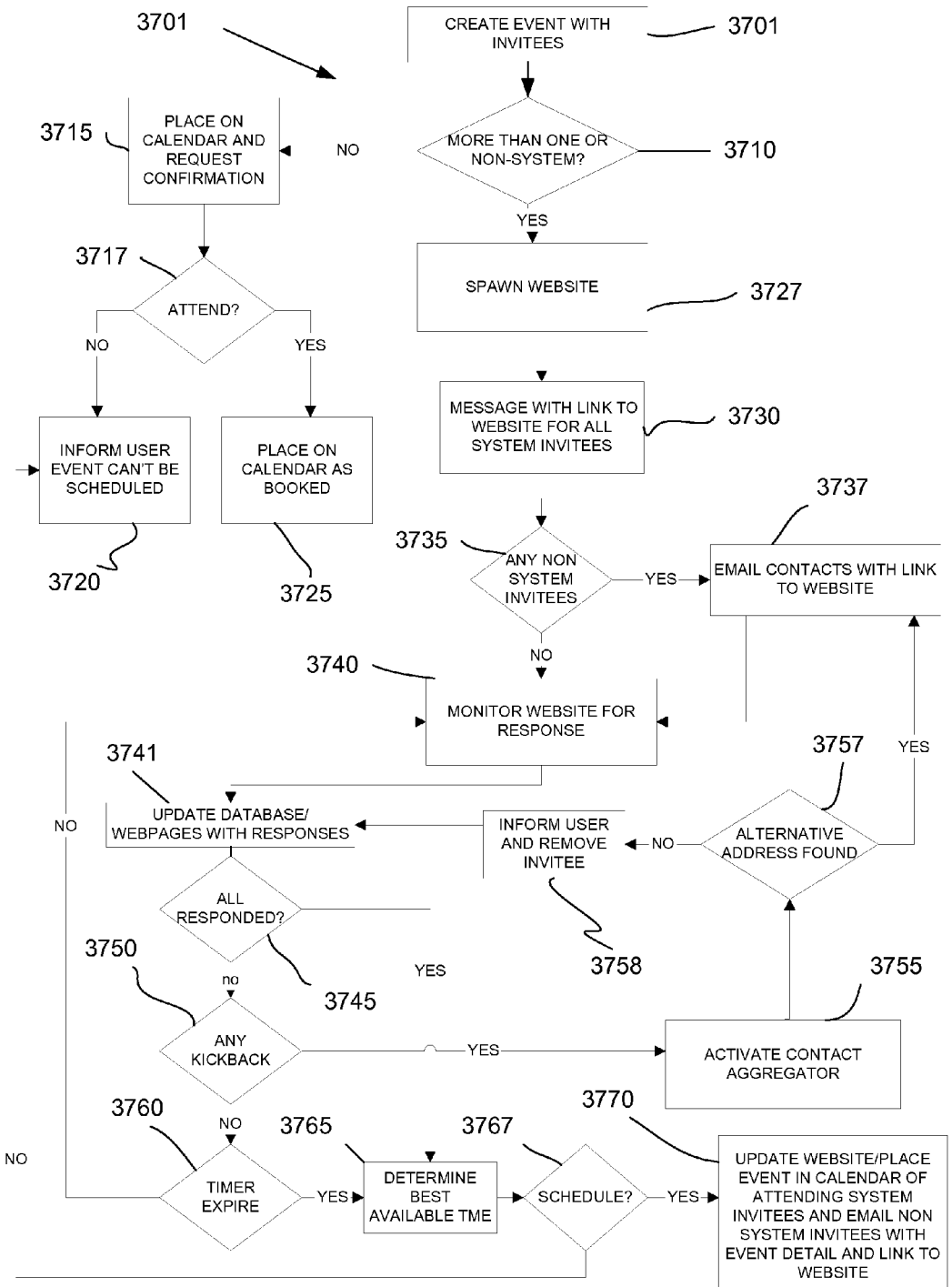
FIG. 37 shows an exemplary process for organizing events with invitees.

A user may automatically schedule/organize an event, such as meetings, appointments, and other gatherings using the dynamic calendar provided by the calendar lozenge of the user interface. FIG. 37 shows one example 3700 of a process for scheduling an event with invitees using the dynamic calendar. To schedule an event, a user sends an invitation by selecting a person, persons, a group, or groups from the people or groups lozenge and dragging the selection to a date on the calendar they want to make an event/appointment 3701. This may be done in two ways.

First, the user may select a date on the calendar, and the system provides a popup window (e.g., 1701) allowing a user to provide additional information about the event if desired. The service provider system stores the calendar event information in the user database. The database has a number of associated fields, such as a general type (e.g., appointment, activity, entertainment, travel, and meeting). In addition, the fields also provide for time and date, start and end, attendees, invitees, a location, items needed, event category type (e.g., personal, friends, family, and business), among others. Any information associated with a lozenge that is dragged to create the event is populated in the fields of the pop window. This information may be changed, deleted or supplemented by the user. In addition, the fields also may be customized for information solicited based on the type of event (e.g., a particular activity, such as "BBQ" may include additional information like catering, potluck, bring an item). The information requested by the fields may be filled in by entering information in the field using a user input device. Further items may be dragged from lozenges to the popup window to continue to fill out the event information. For example, additional names may be dragged from the people lozenge, a location from the location lozenge, a shopping list from the shopping lozenge. In addition to the nickname, a descriptor, a description/notes, and an advertisement or coupon from the graphic/advertising bar may be provided, if the use does not provide a nickname whatever item form a lozenge was used to create the event is used and the nickname. The user does not need to specify a specific time and may leave the time open, suggest a time, or provide a time range. The user also may specify if the event is an RSVP event. If the user indicates the event is an RSVP event, then any invitees designated mandatory or RSVP must confirm attendance or the event may not be scheduled. The user also provides a time for response although a default may be provided (e.g. 1 hour before the designated meeting).

Secondly, a user may drag one or more contacts and a group directly to a date (in the month view) and/or time (in the expanded calendar week view and day view). In this case, an event is automatically created for the people and time indicated. Selecting the event on the calendar may be used to supply addition information or change/edit information about the event. Additional items may be dragged from item on the lozenges to the event supplement, edit, or modify the event.

After the information about the event is provided to the service provider system 110, the system provider organizes the event. The system determines if there is more than one invitee to the event or any non system invitees 3710. If there is only one system invitee, the event is placed on both the user's and invitees calendars indicated as pending 3715. In addition, a message is provided to the read lozenge of the invitee asking for confirmation of the meeting. The invitee may respond to the message as accepting or decline. The system determines whether the invitee may attend 3717. If the invitee cannot attend, the event is removed and a message is sent to the read lozenge of the user indicating a meeting could not be scheduled 3720. If the invitee accepts, the status of the event on the calendar is changed from pending to booked 3725.

If there are multiple invitees or at least one non-system invitee, the system spawns a website for the event 3727. The website may provide any necessary information, such as location, time, date, or range of times or dates, type of event, special instructions (e.g., items to bring), messages, among other things, base on the information provided by the user. A link to the website is automatically provided in the read lozenge to all invitees that have an account with the service system provider 3730. In addition, the person scheduling the event all system invitees are provided with an indication of a pending event in their calendar lozenge for the date and time in question. The system service provider then determines if there are any non-system invitees 3735.

If there are non-system invitees, the system creates an e-mail with a link to the website and transmits the email to any non-system invitees 3737. The system monitors the spawned website for user response 3740. Invitees may select the link in the message or email to access the website using their browser. Once accessing the website the invitees may provide any requested information, such as if they can attend, what they are bringing, a desired time if a range is available, an available time. Each time someone responds an indication is stored in the system database and an indication of the invitees ability to attend is stored presented on the website (e.g., can attend, can't attend, not sure, most likely, and not likely) 3741. The system determines if all invitees have responded 3745. If all invitees have not responded, the system also determines if any of the communications to non-system invitees is kicked back as undeliverable 3759. If so, the system activates the contact aggregator 3755. The system determines if any alternative addresses are found 3757. If not, the system informs the user of the bad address for the contact and removes the invitee 3758. If a new address is determined, a new email with the link to the spawned website is created and sent to the invitee 3737.

If there are no kickbacks, the system determines if a time for response has expired 3760. If not, the system continues to monitor the website, update the database and monitor for kickbacks 3740, 3741, 3745 and 3750. Once all invitees respond 3750 or the timer expires 3760, the system determines if the meeting can be scheduled 3767. The system determines a meeting cannot be scheduled if a common time between the user and invitees unavailable, zero invitees can attend, a minimum number of invitees are not met, or a mandatory invitee (i.e., an RSVP invitee) cannot attend and informs the user a meeting cannot be scheduled 3720. If a meeting can be schedule, the system determines the best available time from the attendees responses if a range was provided or books the event for the time provided if no option was given. For all invitees who can attend, the event is booked and all system invitees and the user calendars lozenge present a booked event on the date and time specified. In addition, an email with the booked appointment can be sent to non system invitees or they may check the website.

Figure 38:
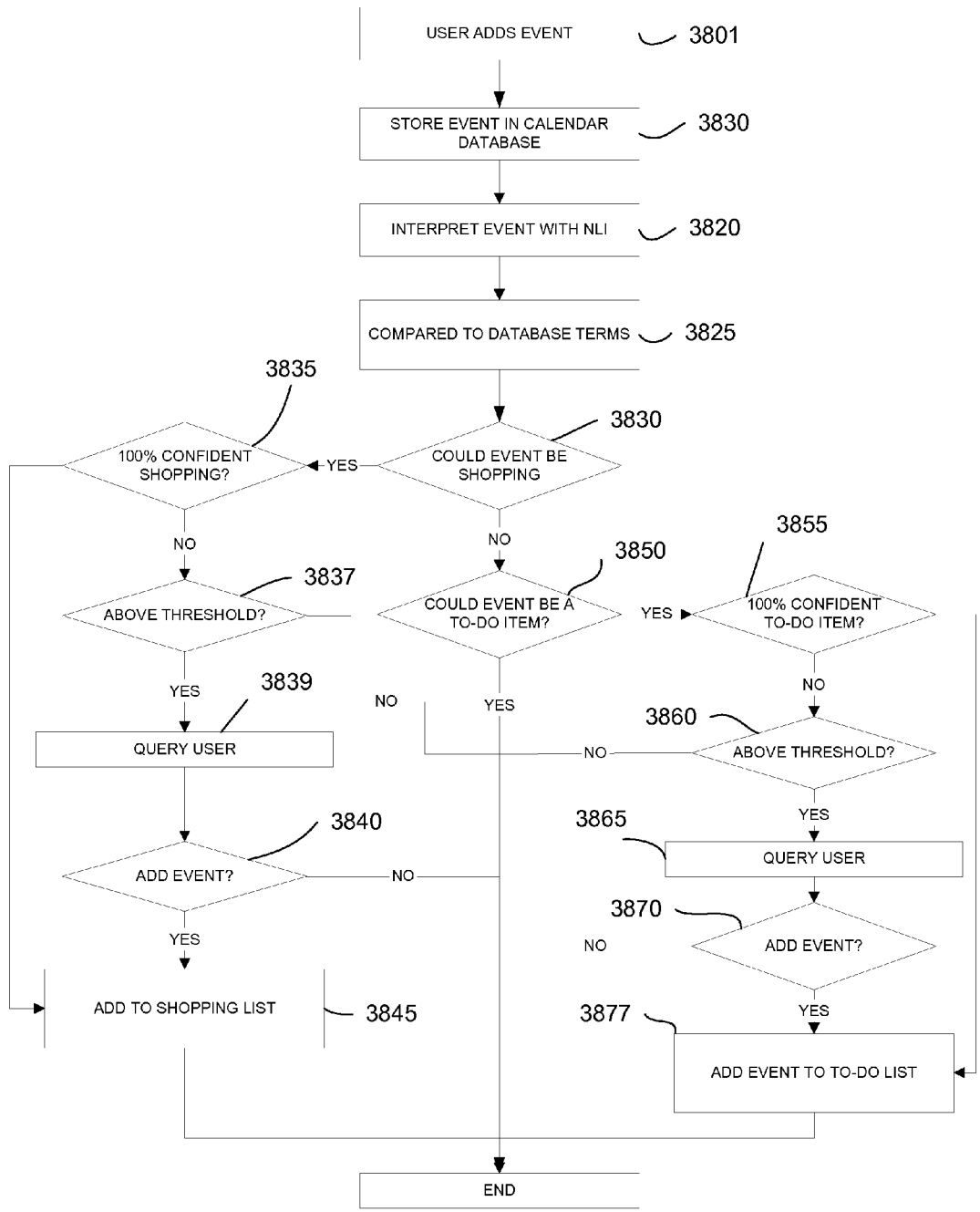
FIG. 38 shows an exemplary process for interpreting events on the calendar.

As shown in FIG. 38, the system may dynamically organize a user data and information based on events created by the user in the dynamic calendar. For example, the user may add an event to the calendar via the user interface 3801. When the user adds an event to the calendar, the system pushes that data into the calendar database 3830. A natural language interpreter (NLI) reads through the words entered by the user 3820, and in particular the NAME OF EVENT, and breaks those words up into distinct words and/or phrases. The NLI does this via a built-in dictionary and information specific to the user (e.g., from the user profile data) 3825 plus special pre-program terms (e.g., from the system item database). Different dictionaries may be used by the system based on the language associated with the user's account. The user profile also provides details of what is important to the user which may be used by the NLI in its determination. For example, if the user has interest in or works with computers, the NLI gives weight to the word "apple" as a computer term rather than a fruit.

When the comparison of the words and phrases in the NAME OF EVENT to the information in the databases is complete, then the NLI makes an evaluation as to whether the event name is a SHOPPING LIST ITEM and/or a TO-DO LIST ITEM. In addition, the system keeps track of the certainty of this evaluation (e.g., 0 to 100%). The system item database includes thousands of words and phrases listed and the likelihood that those words might belong in a SHOPPING LIST ITEM and/or a TO-DO LIST ITEM. For example, the words "lasagna," "Pop Tarts," and "eggs" are strongly associated as SHOPPING LIST ITEMS; whereas, the words "oil change," "fix toilet," and "plan vacation" are strongly associated as TO-DO ITEMS. However, many words fall in the grey area and are evaluated accordingly.

The user profile data is gathered based on the result of the profile questionnaire that a user completes during their initial log on to the service provider system 110. The user profile includes information specific to the user, such as user location, interests, habits, and family, among other things.

The system determines if the event could be a shopping item 3830. If the system has determined that the calendar event could be a shopping item, it determines the confidence of the determination 3835. If the system found the event to be a shopping list item with a 100% confidence, the system copies the calendar event to the shopping list automatically (without user query) 3845. If the system determines the event should be added to the shopping list with a confidence level that is only 80-90% 3837, the user is queried 3839. For example, "You created CHANGE OIL on the calendar for Sunday—shall I move the item OIL to the shopping list for you?" The system determines the user response 3840. If the use confirms, the event is added to the shopping list 3845.

The system determines if the event could be a to-do item 3850. If the system has determined that the calendar event could be a to-do item, it determines the confidence of the determination 3855. If the system found the event to be a to-do list item with a 100% confidence, the system copies the calendar event to the to-do list automatically (without user query) 3877. If the system determines the event should be added to the to-do list with a confidence level that is only 80-90% 3860, the user is queried 3865. For example, "You created CHANGE OIL on the calendar for Sunday—shall I move CHANGE OIL to the To-Do list for you?" The system determines the user response 3870. If the use confirms, the event is added to the shopping list 3845.

Dynamic Social Networking

Figure 39:
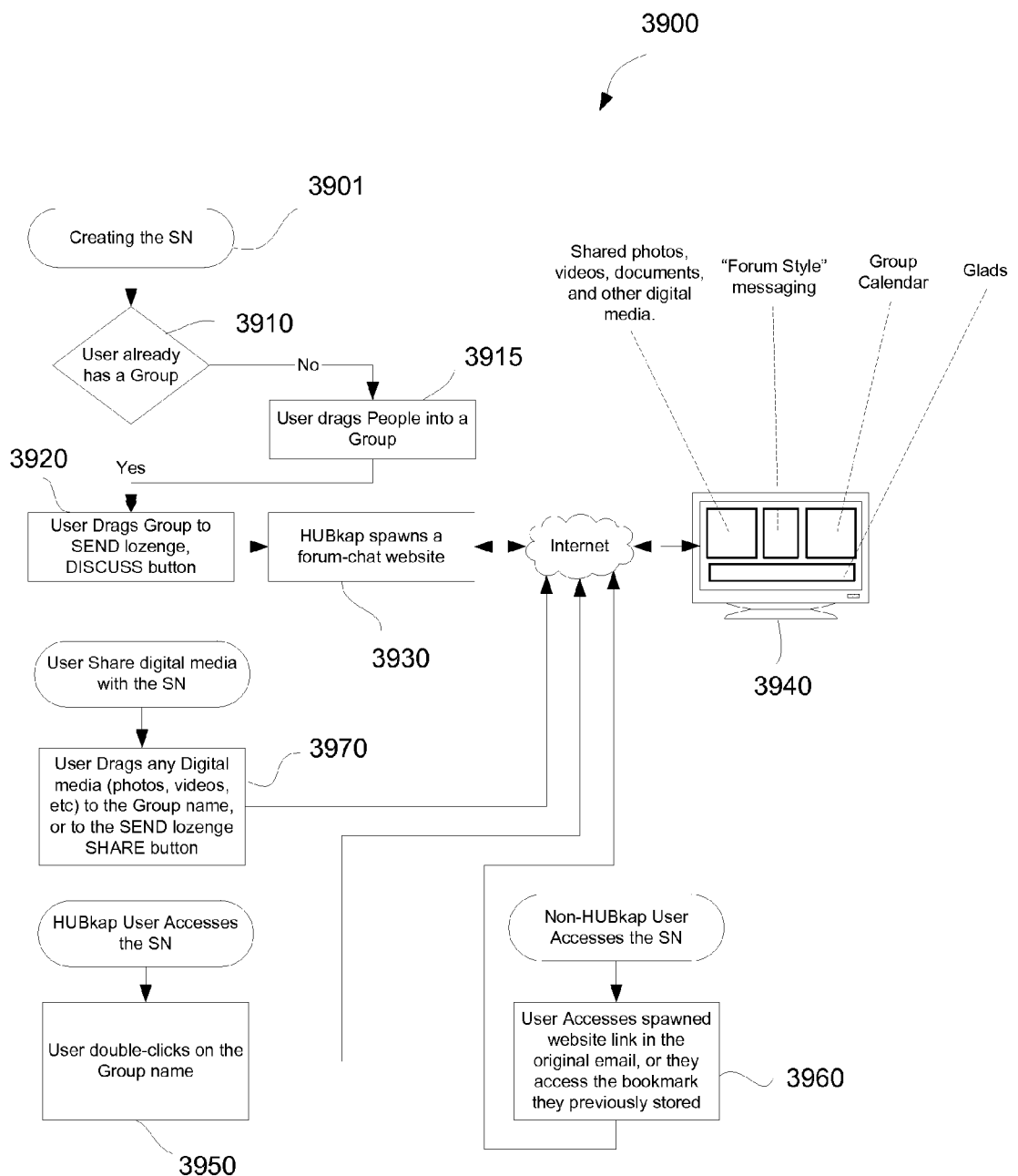
FIG. 39 shows an exemplary process for social networking.

FIG. 39 shows a process 3900 for creating a social network. When a user decides to create a social network 3901, they must first create a group 3910. A group includes a set of associated contacts stored in the system database under a common identifier. The group name is listed under the groups lozenge of each system user who is a member of the group. If a group does not exist, a user must first form a group before creating the social network 3915. As described above, a group may be formed simply by adding a group name to the group lozenge and dragging names of contacts from the people lozenge to 5 the group name. As names are dragged to the group name on the group lozenge, the service provider system 110 automatically adds those names to the group and stores the names associated with the group in the user database. When the group is being formed, or whenever a new member is added, the service provider system then creates and sends a message to each invited system user, such 10 as, for example, "Bob Henderson has invited you to join the Boating group. Do you accept?" Two buttons are provided to accept or decline the invitation. The message appears in each potential group members read lozenge. Non system users are sent an e-mail with the invitation.

Once a group is formed, any user in the group may utilize the social networking feature by selecting the group name from the group lozenge and dragging the name to the discuss input on the send lozenge of the user interface 3920. In response, the system service provider spawns a website specific for the group 3930.

The spawned website 3940 is a custom webpage just for members of the group to facilitate communications and exchange of data between group members. When a group name is dragged to the discuss input, the application server 144 of the service provider system 110 creates a new instance in a server directory that is unique for the group. In one example, there may be only one instance of the webpage per group. A corresponding link, address, or identifier (e.g., a URL) is provided to all group members. All group members who are system users are notified of the creation of the group webpage via a message delivered to their read lozenge. If any group members are non-system users, the server automatically generates an e-mail that includes a link to access the system server, such as the groups unique URL. The non-system user may select the link or cut and pastes the link a standard web browser of their client device to access the group webpage via a communication link.

Selecting the link to the group webpage causes a browser to access the web page. Once a group webpage 3940 is created, the instance may be maintained as long as the group exists and/or the webpage is used. In one example, the system server 144 monitors access of the website to determine whether to maintain the instance of the group web page 3940 for access by the group members. In this example, the entry in the server directory may be removed after a predetermined period of time without access by any member of the group. For example, if no member of the group has accessed the group webpage for a predetermined period of time (e.g., 1 day, a week, or 30 days), the directory may be cleared and the link deleted.

Once the custom group website has been spawned, a user who is a member of the group may access the webpage using the group name from the group lozenge 3950. For example, the user may select the group name (e.g., using a cursor or pointer the user double click on the name with a user input device) to cause a browser to display the group webpage. Alternatively, a group member may select the link provided in the thread of the original invitation message provided in the read lozenge. A non-system user group member may access the group website by activating the link provided in the invitation e-mail sent to their email address, pasting the link in a browser address field, or by selecting a bookmark created by the non-system user during a previous viewing of the group webpage 3960. Once created, group members may access the group webpage to exchange digital content, engage in a chat with other members via a forum style messaging window, and access a group calendar, among other things 3970.

Figure 40:
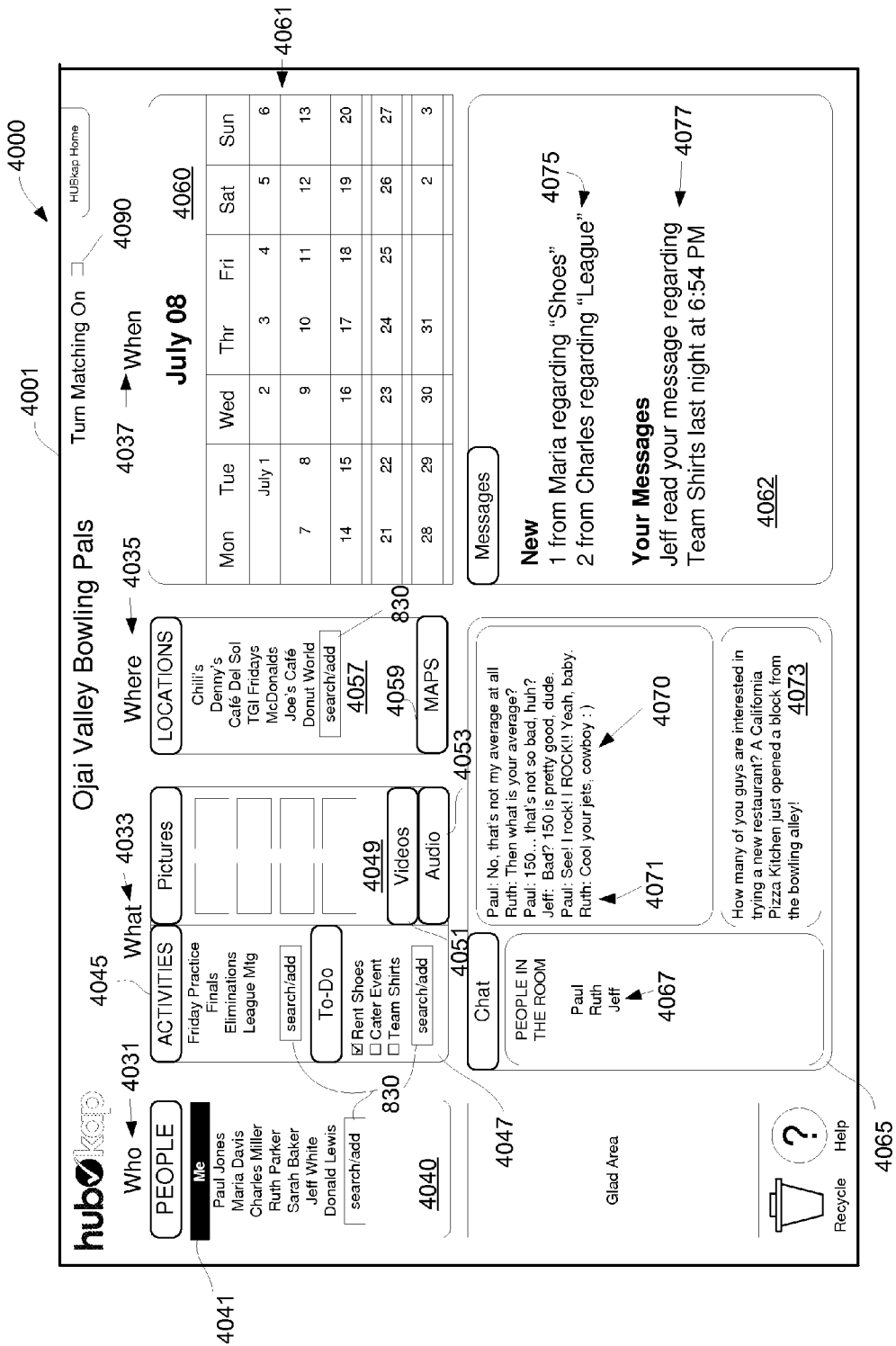
FIG. 40 shows an exemplary spawned website for social networking.

FIG. 40 shows an example 4000 of the user interface provided by the group webpage. The group webpage may be a modified version of the system user interface that is customized for the group. The webpage includes the group name 4001. The webpage also includes a group WHO 4031, a group WHAT 4033, a group WHERE 4035, and a group WHEN 4037 strip, as shown in FIG. 40.

The group WHO strip 4031 includes a people lozenge 4040 listing all members of the group. A me identifier 4041 is provided for the user viewing the group webpage 4001.

The group WHAT strip 4033 includes an activities lozenge 4045, a to-do lozenge 4047, a pictures lozenge 4049, a videos lozenge 4051, and an audio lozenge 4053. The activities lozenge 4045 is the same as described above with reference to the system user interface except that the lozenge only lists activities for the group. Similarly, the To-Do lozenge 4047 is the same as described above with reference to the system user interface except that the lozenge only lists to-do items of the group. Any group member may add to the lists using the search/add data entry fields as described above. The pictures lozenge 4049 includes identifiers 4055, such as a name, a thumbnail, an icon, or other indicators to identify pictures from group members. A user may select an identifier 4055 to cause a popup window to appear showing the picture. A user may select all or multiple identifiers 4055 to cause a popup window to engage in a slide show display of the pictures. A user may add photos for members of the group to view by dragging an identifier or file name of a picture stored in the user device to the picture lozenge 4049 causing a plugin of the user browser to access the picture file on the user device and automatically upload it to the service provider system 110 using any one of the existing automated file transfer protocols. If the picture file is already stored in the user database of the service provider system 110, a group link to the picture file is created for access via the group webpage 4001. Similarly, the video lozenge 4051 and audio lozenge 4053 may be used to provide and access video files and audio files. Of course a lozenge may be provided for any type of digital content, such as documents.

The group WHERE strip 4035 includes a locations lozenge 4057 and a maps lozenge 4059. These lozenges are the same as those described above except that they list locations and maps for the group.

The group WHEN strip 4037 includes a calendar lozenge 4060. The calendar lozenge 4060 provides a mini-calendar 4061 showing indications for all group events. The user may hold a cursor over any event indicator (not shown) to cause a popup window (not shown) to show more detailed information about the event or the user may select the calendar lozenge 4060 to expand over the message area 4062 to increase the size of the calendar. The user can schedule a group event by dragging an item from a lozenge to the calendar or selecting a date on the calendar.

The group webpage 4001 also includes a chat area 4065. The chat area 4065 includes a window 4067 displaying an indicator for each group member currently participating in a group chat. The chat area 4065 includes a dialog window showing a chat text communication 4070 and the originating group member 4071. A dialog window 4073 is provided. The dialog window 4073 may be used to enter characters for a chat communication to be displayed in the dialog window.

The group webpage 4001 also includes a message area 4062. The message area 4062 includes indicators 4075 of any new messages from group members to the user and the status 4077 of any messages sent to group members from the user. A user may select a message indicator causing a popup box with the message thread to be displayed.

A products and services branding area 4080 to display advertising (i.e., glads) and logos for business clients 120 (e.g. a system sponsor). This area 4080 also may be customized or used to promote a business for a sponsored user interface. The area may include identification of the business, such as a name, symbol, or logo. Selecting the business logo causes the user interface to open an additional browser to present the user with a website or other online content associated with the business. This area 4080 of the user interface also may provide advertising content including coupons.

The webpage 4000 also include an input 4090, such as a check or tick box, to activate or deactivate a social matching service. A user may select the box to activate social matching or deselect the box to deactivate the social matching service.

The system also has the ability to bring people together with a social matching service. As described above, each system user has an associated user profile. Included in the user profile are indications of various user interests, such as likes, activities, and hobbies. For each user interest the user is given the option of turning on a matching service for each specific interest. For example, a user "Bob Henderson" in his questionnaire may indicate user interest of bowling, square dancing, gospel music/choirs, and Mexican food. When answering the questionnaire or editing the user profile, a user may indicate for each interest whether to activate the matching service for each individual interest. In this example, Bob indicates matching for square dancing. To continue, Bob Henderson moves to Nampa, Id. Bob is really into square dancing, so he creates a group named "Nampa Square Dancing" and the drags all of his dancing buddies and partners into the group. Eager to find new square dancing buddies, Bob activates the matching service when creating the group. The service provider system determines that a group interest is dancing and searches the personal profile database of users within a vicinity of Bob. If the system determines any matches exist, the system introduces each match via a message. If both users select an affirmative answer, the system automatically adds the contact information of each user to the people lozenge of the other user. In addition, the newly identified user is added to the "Nampa Square Dancing" group.

Figure 41:
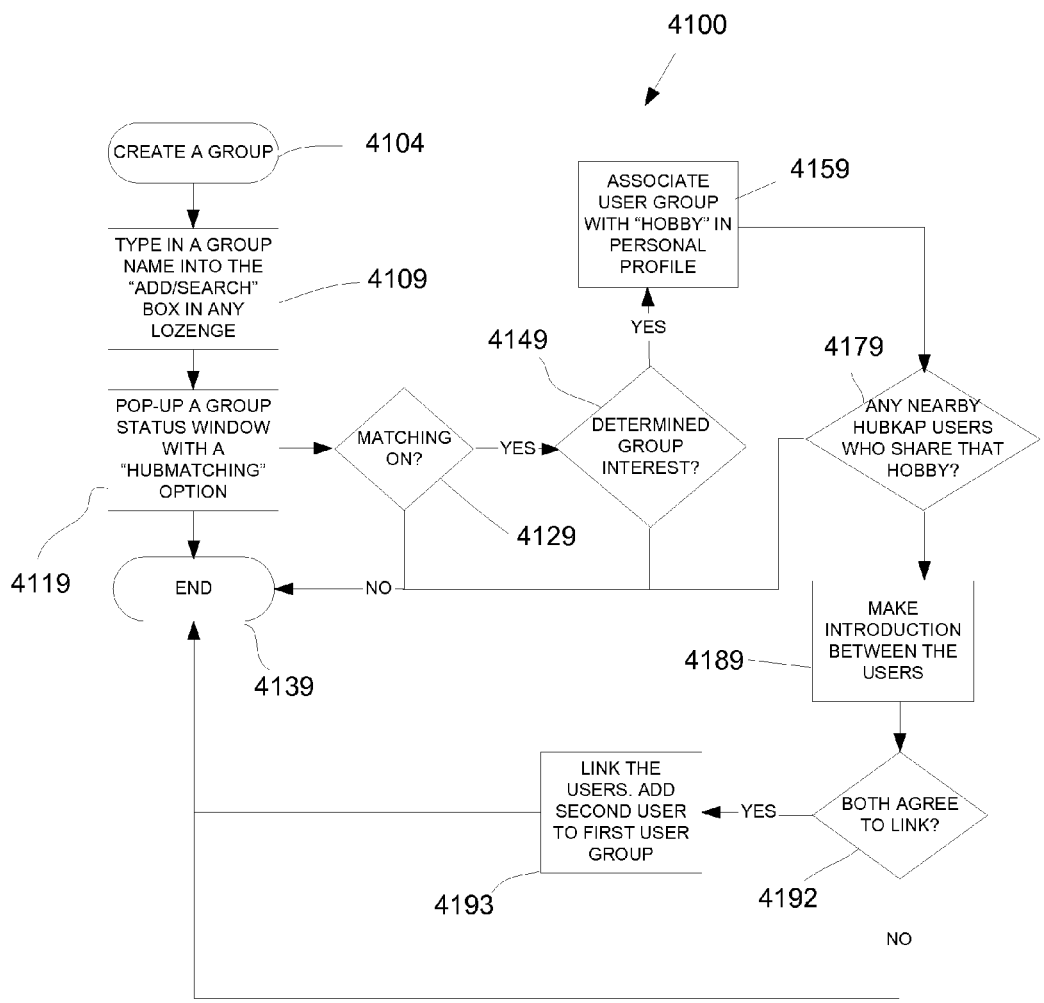
FIG. 41 shows an exemplary process for social matching.

FIG. 41 shows one exemplary process 4100 for the social matching service. In order to utilize the matching service the user creates a group 4101. The user types in the name of the group in the add/search box of the group lozenge 4109. The system responds by providing a group pop-up window providing an option to activate the matching service for the group 4119. The user decides whether or not to activate the matching service and creates the group 4129. If the user does not activate the matching service, the group is created as described above and the social matching process ends 4139.

If the user activates the matching service, the system attempts to determine a group interest 4149. For example, the system search for any interests of the users in the group for which matching is activated. The system also examines group data, such as the name of the group and any other data specific to the group that may identify interests of the group (e.g., listed activities, to-do items, and/or locations). The system may use an automated natural language interpreter and/or search tool to compare any identified group interest data with the identified interests of any user in the group. The system determines if a correlation was found. If a correlation between the group interest and a member interest is determined, the system stores one or more social identifiers associated with the group as the correlated interest 4169. If not, the social matching service ends 4139.

For example, a group with the name "Roath Racquet Club" has members listed with the interest tennis identified for matching. The system may determine that tennis and racquet correlate and store "tennis" as the club's social interest. In another example, a group with the name "Roath Bashers" may have members with the interest "tennis" identified for social matching. In the club's list of to-do items, the club may have an entry "buy tennis balls for practice" and/or the club locations may list "Roath Tennis Club" and "Pendleton Racquet Club." The system may determine that "tennis" for members interests combined with "buy tennis balls" and/or "Tennis club" or "Racquet Club" indicates the group social interest is "tennis," and stores "tennis" as the club's social interest. If the system is unable to determine a social interest, the process may end. Alternatively, if the system determines a correlation may exist and/or is unable to identify a correlation with certainty, the system may present a list of suspected interest for verification or selection by the group.

The system searches through the user profile database for users within a predetermined vicinity associated with the clubs determined social interest 4179. For example, the vicinity may be stored as a distance, a locality, a community, a state, a region, a nationality, or global. Virtual locations also may be specified. The system searches the profile database for system users with social interests matching the group social interest within the specified vicinity. For each identified user who is not already a group member, the system makes an introduction between the identified user and the group users through a message provided to each user 4189. If both users select an affirmative answer 4192, the system automatically adds the contact information of each user to the people lozenge of the other user 4193. In addition, the newly identified user is added to the list of users in the group. If not, the social matching process ends.

Figure 42:
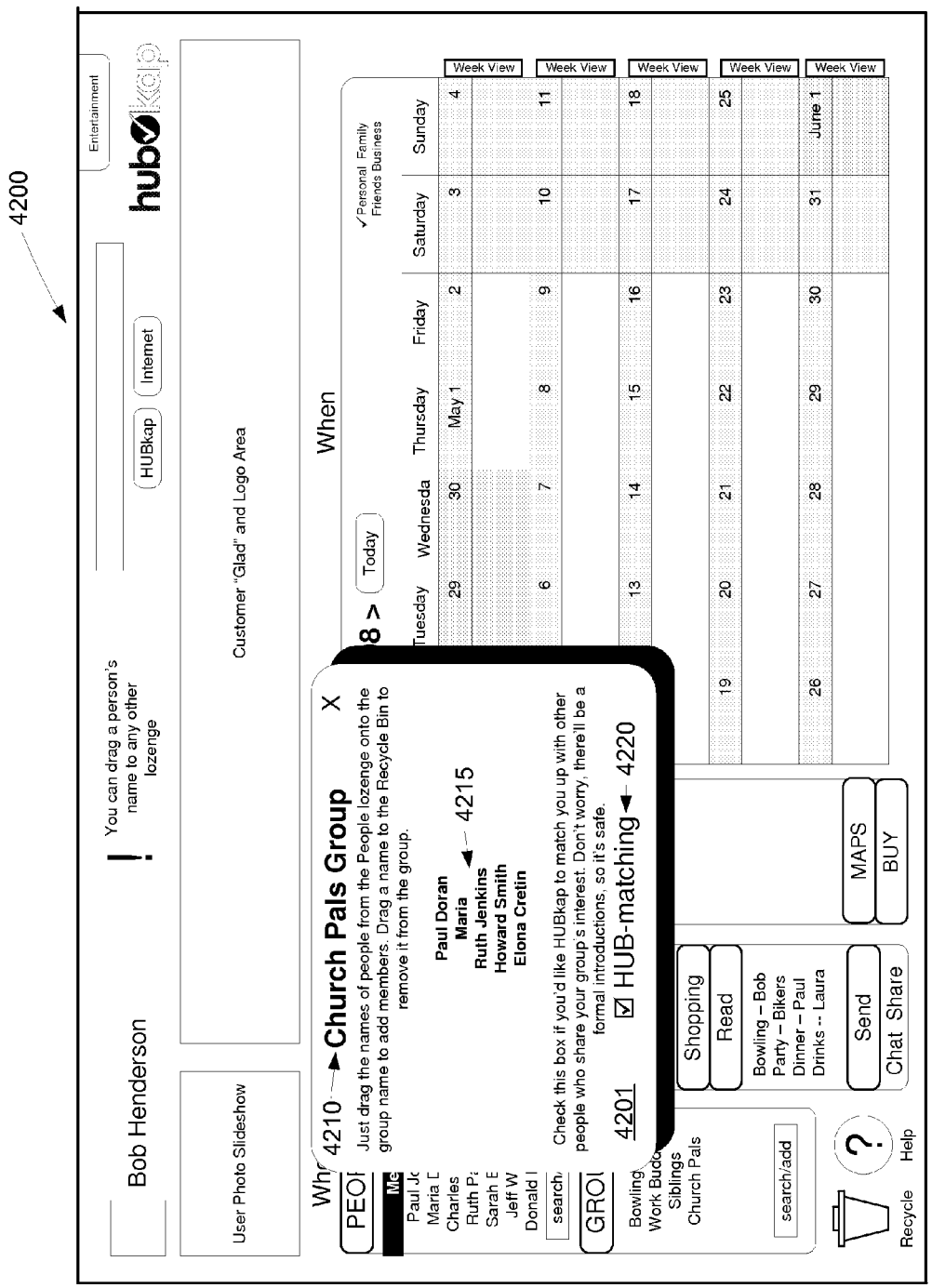
FIG. 42 shows an example of a popup window for social matching.

FIG. 42 shows an example 4200 of the pop-window 4201 that is presented to the user when first creating the group. The window 4201 lists the group name 4210 and members of the group 4215. An input 4220 is provided to activate the matching service. If the user selects the input with a user input device, the matching service is activated and the system attempts to identify a social interest for the group.

The service provider system described herein avoids problems associated with conventional social network sites by providing the user with greater control of their information and who they share information with. Since the system service provider maintains a contact list for each user within the system, the user is free to create groups at any time by simply making collections of those people.

The system service provider automatically spawns a custom website for any group created using the system. The group may be created from the user interface and the groups lozenge. Messages may be sent between group members using the multi-user chat interface provided by the custom website. In addition, video and images and other digital content may be shared between group members. The custom website associated with the group provide access to any messages sent to the group, any multi-user chat between group members, any shared videos or images, and any shared files. As a result, group members may access this information at any time; however, others people beyond the group are unable to access this information.

The group spawned website and social matching system provided herein has many advantages over conventional social networking websites. For example, fear about harassment, stalking, propositioning, molestation, and hassling is reduced because the group is hand-selected by a system service provider user. This is particularly valuable when kids are involved. Since groups are selected from among system users, concerns about shared images, videos, or files from becoming "public domain" or spread without authorization are minimized. Groups can be used by companies to share information in a free and open environment without worry about confidential information being exposed to the wrong eyes. Groups can be temporary and highly task based. For example, a group can be quickly created to organize a family reunion and share information. As a result, a social networking site may be spawned when needed, exist exactly until it is no longer needed, then be pulled down by system service provider so that the data is removed from the web. Because system service provider already has a personal profile on file for all users, participants in groups don't need to bother creating profiles. As a result, starting new groups is facilitated because of personal profile information already stored in the user database. For example, a person that wants to form a bowling league in Burbank Calif. can form a group Burbank Bowling. Invitations may then be sent to other users who list bowling as an interest and live in Burbank.

Groups are useful for many uses, including organizing, sharing images and videos, chatting and collaborating for: organizations such as soccer teams, bowling teams, school clubs, and church social groups; work related project teams; home projects, such as "remodel kitchen" or "clean out garage;" special events like "plan wedding," "organize Dad's surprise party," and "Bob's retirement party."

In addition, conventional sites often have problems associated with stalking because there is no way to ban "bad" or unwanted users. For example, if the user's account is closed, they just open another. Because the dynamic social system collects a lot of user data and if users are a paying customers in good stranding, system administrators can close an account of a misbehaving user, and, utilizing a user's personal information (e.g., a person's home phone number), not allow the user to open another account.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. An automated method implemented by one or more processing devices of an online dynamic user social network system, the method comprising:

storing, in one or more storage devices, a database of the online dynamic user social network system including contact data associated with a first user of the online dynamic user social network system, the contact data of the first user indicating contact information identifying a plurality of individuals or contacts of the first user of the online dynamic user social network system including contact information identifying a second user who is one of a plurality of users of the online dynamic social network and contact information identifying a third user who is not one of the plurality of users of the online dynamic social network system, the contact data also including an identifier or name associated with each of the plurality of individuals or contacts of the first user, the identifier or name configured in the database to populate a contact list of a user interface accessed by the first user of the online dynamic user social network system;

transmitting, from the online dynamic user social network system, data operative to populate the contact list of the user interface accessed by the first user of the online dynamic user social network system;

receiving data in response to the first user interacting with the user interface accessed by the first user, the received data including data indicating a selection of an identifier of the second user who is one of the plurality of users of the online dynamic social network system populated in the contact list of the user interface from the transmitted data, a selection of an identifier of the third user who is not one of the plurality of users of the dynamic social network system populated in the contact list of the user interface from the transmitted data, and a group name generated in response to interaction with the user interface by the first user;

automatically creating, by at least one of the one or more processing devices, and storing, in at least one of the one or more storage devices, of the online dynamic social network system, a group data structure in response to receiving the received data, the data structure including the group name identifying the group data structure, data indicating members of a group derived by the online dynamic social network system from a subset of the names or identifiers associated with the plurality of individuals or contacts previously stored in association with the user in the database of the online dynamic user social network system including the identifier of the second user who is one of the plurality of users of the online dynamic social network system populated in the contact list of the user interface and the identifier of the third user who is not one of the plurality of users of the dynamic social network system populated in the contact list of the user interface;

receiving, by the online dynamic social network system, data input from a user device communicating with the online dynamic user social network system indicating selection of the group name by the first user interacting with the user interface;

creating, by the online dynamic social network system, the online dynamic social network for the group including:

automatically spawning, by at least one of the one or more processing devices of the online dynamic social network system, a new unique instance of an online social network web page customized specifically for the members of the group, indicated by the group data structure, hosted on a web server directly in response to receiving the data input received from the user device communicating with the online dynamic user social network system indicating selection of the group name;

creating, by at least one of the one or more processing devices of the online dynamic social network system, a dynamic link providing a user device access to the newly spawned instance of the online social network web page customized specifically for the group on the web server;

providing the dynamic link providing access to the newly spawned instance of the online social network web page specifically customized for the group directed to a location associated with each member of the group stored by the database including a location accessible by a user device associated with the second user who is one of the plurality of users of the online dynamic social network system and a location accessible by a user device associated with the third user who is not one of the plurality of users of the dynamic social network system; and providing, by at least one processing device implementing the web server, at least initial access to the instance of the online social network web page customized for the group on the web server in response to activation of the dynamic link by a user device.

2. The method of claim 1 wherein receiving data input from a user device to create an online social network only for the group and its members comprises receiving data indicating selection of the group name identifying the group data structure from one or more group names presented by the user interface in conjunction with a user input to create the online social network.

3. The method of claim 1 wherein automatically creating the group data structure by the online dynamic user social network system includes receiving data indicating the group name has been selected by a user input device from the one or more group names presented by the user interface; providing data to the user interface configured to present the group name within a first area of the user interface presenting group names, providing data to the user interface configured to present a list of names or identifiers identifying contacts from the plurality of contacts of the user of the dynamical social network stored in the database within second area of the user interface presenting a contact list, and receiving an indication generated by the user input device to add names or identifiers selected by the input device from the names or identifiers presented in the contact list to the group, wherein the indication to add includes receiving data generated from a user input device by dragging of one or more names or identifiers presented in the list of names in the second area of the user interface to the group name presented in the first area of the user interface.

4. The method of claim 3 further comprising: automatically storing an association by the online dynamic user social network system between the contact data corresponding to the names or identifiers presented in the contact list and selected by the input device for adding to the group with the group data structure in the database of the online dynamic user social network system in response to receiving the indication to add the names or identifiers selected by the input device.

5. The method of claim 1 further comprising: creating a message including the dynamic link for a member of the group and providing an indication of the message configured for presentation in an area of the user interface of a user device operated by the member.

6. The method of claim 1 further comprising: notifying each member of the group who is a user of the online dynamic user social network system of the creation of the custom online social network web page by providing an indication of a message including the dynamic link in an area of their user interface.

7. The method of claim 1, further comprising: automatically generating an electronic communication directed to each member of the group who is not a user of the online dynamic user social network system that includes the dynamic link providing access to the web server hosting the instance of the online social network web page; and sending the electronic communication directed to each member of the group who is not a user of the online dynamic user social network system.

8. The method of claim 1 further comprising maintaining the instance of the online social network web page as long as the group exists.

9. The method of claim 1 further comprising: maintaining access to the instance of the online social network web page for each member of the group; monitoring access of the instance of the online social network web page; determining whether to maintain the instance of the online social network web page based on the monitoring; and eliminating the instance after a predetermined period of time without access of the instance of the online social network web page by any member of the group.

10. The method of claim 1 further comprising: receiving digital content from a member of the group; storing the digital content; granting any member of the group access to the instance of the online social network web page; and providing access to the digital content via the granted access to the instance of the online social network web page.

11. The method of claim 1 further comprising: granting any member of the group access to the instance of the online social network web page; and providing a forum style messaging window for any member to engage in a chat session with other members of the group via the instance of the online social network web page.

12. The method of claim 1 further comprising: granting any member of the group access to the instance of the online social network web page; and providing access to a group calendar presented by the instance of the online social network web page.

13. The method of claim 1 further comprising:
receiving, by the online dynamic social network system data generated by a user input device indicating activation of a matching service provided by the social network system for the group;
automatically determining by the online dynamic social network system a social interest associated with the group or its members by examining data associated with the group or contact data associated with members of the group stored by the database;
searching a profile database of the users of the online dynamic social network system to identify one or more users with a social interest associated with their profile that matches or is similar to the determined social interest associated with the group and;
introducing an identified user of the online dynamic social network system who is not a member of the group to the group via a notification provided to the user interface or an electronic message directed to the identified user.

14. An online dynamic user social network system, the system comprising:
one or more storage devices storing a database including contact data associated with a first user of the online dynamic social network system, the contact data of the first user indicating contact information identifying a plurality of individuals or contacts of the first user of the online dynamic user social network system including contact information identifying a second user who is one of a plurality of users of the online dynamic social network and contact information identifying a third user who is not one of the plurality of users of the online dynamic social network system, the contact data also including an identifier or name associated with each of the plurality of individuals or contacts of the first user, the identifier or name configured in the database to populate a contact list of a user interface accessed by the first user of the online dynamic user social network system; and
a service provider system including one or more processing devices, the one or more processing devices:
transmitting from the online dynamic user social network system data operative to populate the contact list of the user interface accessed by the first user of the online dynamic user social network system;
receiving data in response to the first user interacting with the user interface accessed by the first user, the received data including data indicating a selection of an identifier of the second user who is one of the plurality of users of the online dynamic social network system populated in the contact list of the user interface from the transmitted data, a selection of an identifier of the third user who is not one of the plurality of users of the dynamic social network system populated in the contact list of the user interface from the transmitted data, and a group name generated in response to interaction with the user interface by the first user;
automatically creating and storing a group data structure in the database in response to receiving the received data, the data structure including the group name identifying the group data structure, data indicating members of a group derived by the service provider system from a subset of the names or identifiers associated with the plurality of individuals or contacts previously stored in association the user of the online dynamic user social network system including the identifier of the second user who is one of the plurality of users of the online dynamic social network system populated in the contact list of the user interface and the identifier of the third user who is not one of the plurality of users of the dynamic social network system populated in the contact list of the user interface;
receiving data input from a user device communicating with the service provider system indicating selection of the group name by the first user interacting with the user interface; and
creating the online dynamic social network for the group including:
automatically spawning, by at least one of the one or more processing devices of the service provider system, a new unique instance of an online social network web page customized specifically for the members of the group, indicated by the group data structure, hosted on a web server directly in response to receiving the data input received from the user device communicating with the online dynamic user social network system indicating selection of the group name;
creating, by at least one of the one or processing devices of the service provider system, a dynamic link providing access via a user device to the newly spawned instance of the online social network web page customized specifically for the group on the web server;
providing the dynamic link providing access to the newly spawned instance of the online social network web page specifically customized for the group directed to a location associated with each member of the group stored by the database including a location accessible by a user device associated with the second user who is one of the plurality of users of the online dynamic social network system and a location accessible by a user device associated with the third user who is not one of the plurality of users of the dynamic social network system; and
providing at least initial access to the instance of the online social network web page customized for the group on the web server in response to activation of the dynamic link by a user device associated with a user who is a member of the group.

15. The network of claim 14 further comprising:
a user device communicating with the service provider system providing the user interface to the first user and transmitting the indicating selection of the group name for creation of the online dynamic social network.

16. The network of claim 14 further comprising:
a user device receiving the dynamic link, activating the dynamic link, accessing the web server via activation of the dynamic link, and presenting the instance of the spawned online social network web page customized specifically for the group.

17. An automated method implemented by one or more processing devices of an online dynamic user social network system, the method comprising:

- storing, in one or more storage devices of the online dynamic user social network system, a database including contact data associated with a first user of the online dynamic user social network system, the contact data indicating contact information identifying a plurality of individuals or contacts of the first user of the online dynamic user social network system, including an identifier or name associated with each of the plurality of individuals or contacts, the identifier or name configured in the database to populate a contact list of a user interface accessed by the first user of the online dynamic user social network system;
- storing, in at least one of the one or more storage devices of the online dynamic user social network system, a group data structure including a group name identifying the group data structure, the group data structure indicating members of a group derived by the online dynamic user social network system from a subset of the names or identifiers associated with the plurality of individuals or contacts previously stored in association with the user in the database of the online dynamic user social network system including the identifier of a second user who is one of the plurality of users of the online dynamic social network system populated in the contact list of the user interface and the identifier of a third user who is not one of the plurality of users of the dynamic social network system populated in the contact list of the user interface;
- receiving, by the online dynamic social network system, data input from a user device communicating with the online dynamic user social network system indicating selection of the group name by the first user interacting with the user interface;
- creating, by the online dynamic social network system, the online dynamic social network for the group including:
  - automatically spawning, by at least one of the one or processing devices the online dynamic social network system, a new unique instance of an online social network web page customized specifically for the members of the group, indicated by the group data structure, hosted on a web server directly in response to receiving the data input received from the user device communicating with the online dynamic user social network system indicating selection of the group name;
  - creating, by at least one of the one or more processing devices of the online dynamic social network system, a dynamic link providing a user device access to the newly spawned instance of the online social network web page customized specifically for the group on the web server;
  - providing the dynamic link providing access to the newly spawned instance of the online social network web page specifically customized for the group to a location associated with each member of the group including a location associated with the second user and a location associated with the third user; and
  - providing, by at least one processing device implementing the web server, at least initial access to the instance of the online social network web page customized for the group on the web server in response to activation of the dynamic link by a user device.

\* \* \* \* \*